(12) United States Patent
Jeong et al.

(10) Patent No.: US 12,231,697 B2
(45) Date of Patent: *Feb. 18, 2025

(54) METHOD FOR ENCODING AND DECODING IMAGE USING ADAPTIVE DEBLOCKING FILTERING, AND APPARATUS THEREFOR

(71) Applicant: Dolby Laboratories Licensing Corporation, San Francisco, CA (US)

(72) Inventors: Je Chang Jeong, Seoul (KR); Ki Baek Kim, Seoul (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,447

(22) Filed: Oct. 24, 2023

(65) Prior Publication Data

US 2024/0056613 A1   Feb. 15, 2024

Related U.S. Application Data

(63) Continuation of application No. 18/152,704, filed on Jan. 10, 2023, now Pat. No. 11,849,152, which is a
(Continued)

(30) Foreign Application Priority Data

Jun. 11, 2015   (KR) ........................ 10-2015-0082702
Jun. 11, 2015   (KR) ........................ 10-2015-0082714

(51) Int. Cl.
*H04N 19/82*   (2014.01)
*H04N 19/107*  (2014.01)
(Continued)

(52) U.S. Cl.
CPC ........... *H04N 19/82* (2014.11); *H04N 19/107* (2014.11); *H04N 19/117* (2014.11);
(Continued)

(58) Field of Classification Search
None
See application file for complete search history.

(56) References Cited

U.S. PATENT DOCUMENTS 9,060,181 B1   6/2015   Lee et al.
2006/0227881 A1   10/2006   Gordon
(Continued)

FOREIGN PATENT DOCUMENTS

| CN | 1812580 A | 8/2006 |
|----|-----------|--------|
| CN | 101472176 A | 7/2009 |

(Continued)

OTHER PUBLICATIONS

International Search Report dated Sep. 1, 2016 in corresponding International Patent Application No. PCT/KR2016/006273 (4 pages in English and 4 pages in Korean).
(Continued)

*Primary Examiner* — Rebecca A Volentine
(74) *Attorney, Agent, or Firm* — Michael Best & Friedrich LLP

(57) ABSTRACT

Disclosed is an encoding/decoding method and apparatus related to adaptive deblocking filtering. There is provided an image decoding method performing adaptive filtering in inter-prediction, the method including: reconstructing, from a bitstream, an image signal including a reference block on which block matching is performed in inter-prediction of a current block to be encoded; obtaining, from the bitstream, a flag indicating whether the reference block exists within a current picture where the current block is positioned; reconstructing the current block by using the reference block; adaptively applying an in-loop filter for the reconstructed current block based on the obtained flag; and storing the current block to which the in-loop filter is or is not applied in a decoded picture buffer (DPB).

7 Claims, 27 Drawing Sheets

Related U.S. Application Data continuation of application No. 15/579,909, filed as application No. PCT/KR2016/006273 on Jun. 13, 2016, now Pat. No. 11,616,987.

(51) Int. Cl.
| | |
|---|---|
| *H04N 19/117* | (2014.01) |
| *H04N 19/124* | (2014.01) |
| *H04N 19/137* | (2014.01) |
| *H04N 19/172* | (2014.01) |
| *H04N 19/176* | (2014.01) |
| *H04N 19/184* | (2014.01) |
| *H04N 19/50* | (2014.01) |
| *H04N 19/51* | (2014.01) |
| *H04N 19/577* | (2014.01) |
| *H04N 19/58* | (2014.01) |
| *H04N 19/593* | (2014.01) |
| *H04N 19/60* | (2014.01) |
| *H04N 19/70* | (2014.01) |
| *H04N 19/91* | (2014.01) |

(52) U.S. Cl.
CPC ......... *H04N 19/124* (2014.11); *H04N 19/137* (2014.11); *H04N 19/172* (2014.11); *H04N 19/176* (2014.11); *H04N 19/184* (2014.11); *H04N 19/50* (2014.11); *H04N 19/51* (2014.11); *H04N 19/577* (2014.11); *H04N 19/58* (2014.11); *H04N 19/593* (2014.11); *H04N 19/60* (2014.11); *H04N 19/70* (2014.11); *H04N 19/91* (2014.11)

(56) References Cited

U.S. PATENT DOCUMENTS

| | | | |
|---|---|---|---|
| 2009/0190660 | A1 | 7/2009 | Kusakabe et al. |
| 2010/0034268 | A1 | 2/2010 | Kusakabe et al. |
| 2010/0135389 | A1 | 6/2010 | Tanizawa et al. |
| 2011/0222792 | A1 | 9/2011 | Kusakabe et al. |
| 2012/0170662 | A1 | 7/2012 | Karczewicz et al. |
| 2012/0213276 | A1 | 8/2012 | Hagai et al. |
| 2012/0213293 | A1 | 8/2012 | Chong et al. |
| 2013/0022124 | A1 | 1/2013 | Sekiguchi et al. |
| 2013/0028322 | A1 | 1/2013 | Fujibayashi et al. |
| 2013/0177076 | A1 | 7/2013 | Itani et al. |
| 2013/0188706 | A1 | 7/2013 | Minezawa et al. |
| 2013/0188732 | A1 | 7/2013 | Zhou et al. |
| 2013/0208794 | A1 | 8/2013 | Jeong et al. |
| 2013/0272624 | A1 | 10/2013 | Budagavi |
| 2013/0301714 | A1 | 11/2013 | Song et al. |
| 2013/0322548 | A1 | 12/2013 | Narroschke et al. |
| 2013/0336393 | A1 | 12/2013 | Matsumura et al. |
| 2014/0198842 | A1 | 7/2014 | He et al. |
| 2014/0286416 | A1 | 9/2014 | Jeon et al. |
| 2014/0369428 | A1 | 12/2014 | Park et al. |
| 2015/0049821 | A1 | 2/2015 | Chen et al. |
| 2015/0085935 | A1 | 3/2015 | Chen et al. |
| 2015/0195559 | A1 | 7/2015 | Chen et al. |
| 2015/0271487 | A1 | 9/2015 | Li et al. |
| 2015/0296213 | A1 | 10/2015 | Hellman |
| 2015/0350687 | A1 | 12/2015 | Zhai et al. |
| 2015/0365666 | A1 | 12/2015 | Dong et al. |
| 2016/0100163 | A1 | 4/2016 | Rapaka et al. |
| 2016/0353117 | A1 | 12/2016 | Seregin et al. |
| 2017/0127090 | A1* | 5/2017 | Rosewarne .......... H04N 19/159 |
| 2017/0142418 | A1 | 5/2017 | Li et al. |
| 2017/0295369 | A1 | 10/2017 | Nakagami |
| 2017/0302966 | A1 | 10/2017 | Xu et al. |
| 2018/0124420 | A1 | 5/2018 | Lee et al. |
| 2018/0160122 | A1 | 6/2018 | Xu et al. |

FOREIGN PATENT DOCUMENTS

| | | |
|---|---|---|
| CN | 102598670 A | 7/2012 |
| CN | 102884791 A | 1/2013 |
| CN | 102986219 A | 3/2013 |
| CN | 103155555 A | 6/2013 |
| CN | 103283234 A | 9/2013 |
| CN | 103460699 A | 12/2013 |
| CN | 103460700 A | 12/2013 |
| CN | 103780914 A | 5/2014 |
| CN | 103814575 A | 5/2014 |
| CN | 103916676 A | 7/2014 |
| CN | 103931180 A | 7/2014 |
| CN | 103931186 A | 7/2014 |
| CN | 103947203 A | 7/2014 |
| CN | 104025601 A | 9/2014 |
| CN | 104067245 A | 9/2014 |
| CN | 104126301 A | 10/2014 |
| CN | 104602023 A | 5/2015 |
| KR | 20120120091 A | 11/2012 |
| KR | 1020140129632 A | 11/2014 |
| KR | 1020140140000 A | 12/2014 |
| RU | 2446560 C1 | 3/2012 |
| WO | 2012060663 A2 | 5/2012 |
| WO | 2013048630 A1 | 4/2013 |
| WO | 2013077714 A1 | 5/2013 |
| WO | 2014014276 A1 | 1/2014 |
| WO | 2015054811 A1 | 4/2015 |

OTHER PUBLICATIONS

Ismail Marzuki et al. "Modified Deblocking Filter for Intra Block Copy" (JCTV) of ITU-T SG 16 WP and ISO/IEC UTC 1ZSC 29WG 11; 18th meeting : Sapporo JP, Jun. 30-Jul. 9, 2014 pp. 1-5 (Year: 2014).

Li, Bin et al., "Non-SCCE1: Unification of intra BC and inter modes", Joint Collaborative Team on Video Coding (JCT-VC) of ITU-T SG 16 WP 3 and ISO/IEC JTC 1/SC 29/WG 11, 18th Meeting, Sapporo, Japan, Jun. 30-Jul. 9, 2014.

Nilsson, Mike et al., "Proposed Draft Text Modifications to Joint Video Specification (ITU-T Rec. H.264, ISO/IEC 14496-10 AVC), for decoded frame buffering", Joint Team Meeting (JVT) of ISO/IEC MPEG and ITU-T VCEG, 5th Meeting: Geneva, Switzerland, Oct. 9-17, 2002 (227 pages in English).

Rapaka, Krishna et al., "HLS: On intra block copy signaling control", Joint Collaborative Team on Video Coding (JCT-VC) of ITU-T SG 16 WP 3 and ISO/IEC JTC 1/SC 29/WG 11, 21st Meeting, Warsaw, Poland, Jun. 19-26, 2015 (5 pages in English).

Yu, Siu-Leong et al., "New Intra Prediction using Intra-Macroblock Motion Compensation", Joint Video Team (JVT) of ISO/IEC MPEG & ITU-T VCEG (ISO/IEC JTC1/SC29/WG11 and ITU-TSG16 Q.6), 3rd Meeting: Fairfax, Virginia US, May 6-10, 2002 (10 pages in English.

English translation of Chinese Patent Office Action for Application No. 202110678039.9 dated May 26, 2023 (9 pages).

Chinese Patent Office Second Office Action for Application No. 202110678039.9 dated Dec. 27, 2023 (23 pages with translation).

Chinese Patent Office First Office Action for Application No. 202210546225.1 dated Jul. 15, 2024 (14 pages with translation).

Chinese Patent Office First Office Action for Application No. 202210546829.6 dated Jul. 12, 2024 (14 pages with translation).

Chinese Patent Office First Office Action for Application No. 202210546232.1 dated Jul. 15, 2024 (15 pages with translation).

Chinese Patent Office First Office Action for Application No. 202210544344.3 dated Jul. 15, 2024 (15 pages with translation).

Chinese Patent Office First Office Action for Application No. 202210544354.7 dated Jul. 15, 2024 (15 pages with translation).

Chinese Patent Office Notice of Allowance for Application No. 202210546829.6 dated Dec. 4, 2024 (7 pages with translation).

Chinese Patent Office Notice of Allowance for Application No. 202210546225.1 dated Dec. 27, 2024 (7 pages with translation).

Chinese Patent Office Notice of Allowance for Application No. 202210546232.1 dated Dec. 27, 2024 (7 pages with translation).

(56) References Cited

OTHER PUBLICATIONS

Chinese Patent Office Notice of Allowance for Application No. 202210544344.3 dated Dec. 27, 2024 (7 pages with translation).
Chinese Patent Office Notice of Allowance for Application No. 202210544354.7 dated Dec. 27, 2024 (7 pages with translation).

* cited by examiner

```
Coding_unit() {
  if( slice_type != I || curr_pic_BM_enabled_flag == 1 )
    cu_skip_flag
  if( cu_skip_flag )
    prediction_unit()
  else {
    if( slice_type != I || curr_pic_BM_enabled_flag == 1 )
      pred_mode_flag
    if( CuPredMode != MODE_INTRA || log2CbSize == MinCbLog2SizeY)
      part_mode
    if( CuPredMode[ x0 ][ y0 ] == MODE_INTRA ) {
      if( PartMode == PART_2Nx2N && pcm_enabled_flag &&
          log2CbSize   >= Log2MinIpcmCbSizeY &&
          log2CbSize   <= Log2MaxIpcmCbSizeY )
        pcm_flag[ x0 ][ y0]
      if( pcm_flag[ x0 ][ y0 ] )       {
        while(  !byte_aligned( ) )
          pcm_alignment_zero_bit
        pcm_sample( x0, y0, log2CbSize )
      } else {
        pbOffset = ( PartMode == PART_NxN ) ? ( nCbs / 2 )   : nCbs
        for( j = 0; j < nCbs; j = j + pbOffset )
        for( i = 0; i < nCbs; i = i + pbOffset )
          prev_intra_luma_pred_flag[ x0 + i ][ y0 + j ]
        for( j = 0; j < nCbs; j = j + pbOffset )
        for( i = 0; i < nCbs; i = i + pbOffset )
          if( prev_intra_luma_pred_flag[ x0 + i ][ y0 + j ]      )
            mpm_idx[ x0 + i ][ y0 +j]
          else
            rem_intra_luma_pred_mode [x0 + i][ y0 + j ]
        intra_chroma_pred_mode[ x0 ][ y0 ]
      }
    } else {
      if( PartMode == PART_2Nx2N )
        prediction_unit(x0, y0, nCbs, nCbs )
      else  if( PartMode == PART_2Nx2N ) {
        prediction_unit(x0, y0, nCbs, nCbs / 2)
        prediction_unit(x0, y0 + (nCbs / 2), nCbS, nCbS / 2 )
      } else if( PartMode == PART_Nx2N ) {
        prediction_unit(x0, y0, nCbS / 2, nCbS )
        prediction_unit(x0 + ( nCbS / 2), y0, nCbS/ 2, nCbS )
      } else if( PartMode == PART_2NxnU ) {
        prediction_unit(x0, y0, nCbS, nCbS / 4 )
        prediction_unit(x0, y0 + ( nCbS / 4 ), nCbS, nCbS * 3 / 4 )
      } else if( PartMode == PART_2NxnD ) {
        prediction_unit(x0, y0, nCbS, nCbS * 3 / 4 )
        prediction_unit(x0, y0 + ( nCbS * 3 / 4 ), nCbS, nCbS / 4 )
```

FIG. 12

| Intra | Inter | |
|---|---|---|
| | ref_idx = curr | else |
| 2Nx2N, NxN | skip, 2Nx2N, NxN | skip, 2Nx2N, 2NxN, Nx2N, nLx2N, nRx2N, 2NxnU, 2NxnD |

FIG. 15
      
      
   
 
     
     

| p(3,0) | p(2,0) | p(1,0) | p(0,0) | q(0,0) | q(1,0) | q(2,0) | q(3,0) |
|---|---|---|---|---|---|---|---|
| p(3,1) | p(2,1) | p(1,1) | p(0,1) | q(0,1) | q(1,1) | q(2,1) | q(3,1) |
| p(3,2) | p(2,2) | p(1,2) | p(0,2) | q(0,2) | q(1,2) | q(2,2) | q(3,2) |
| p(3,3) | p(2,3) | p(1,3) | p(0,3) | q(0,3) | q(1,3) | q(2,3) | q(3,3) |

B5

FIG. 33
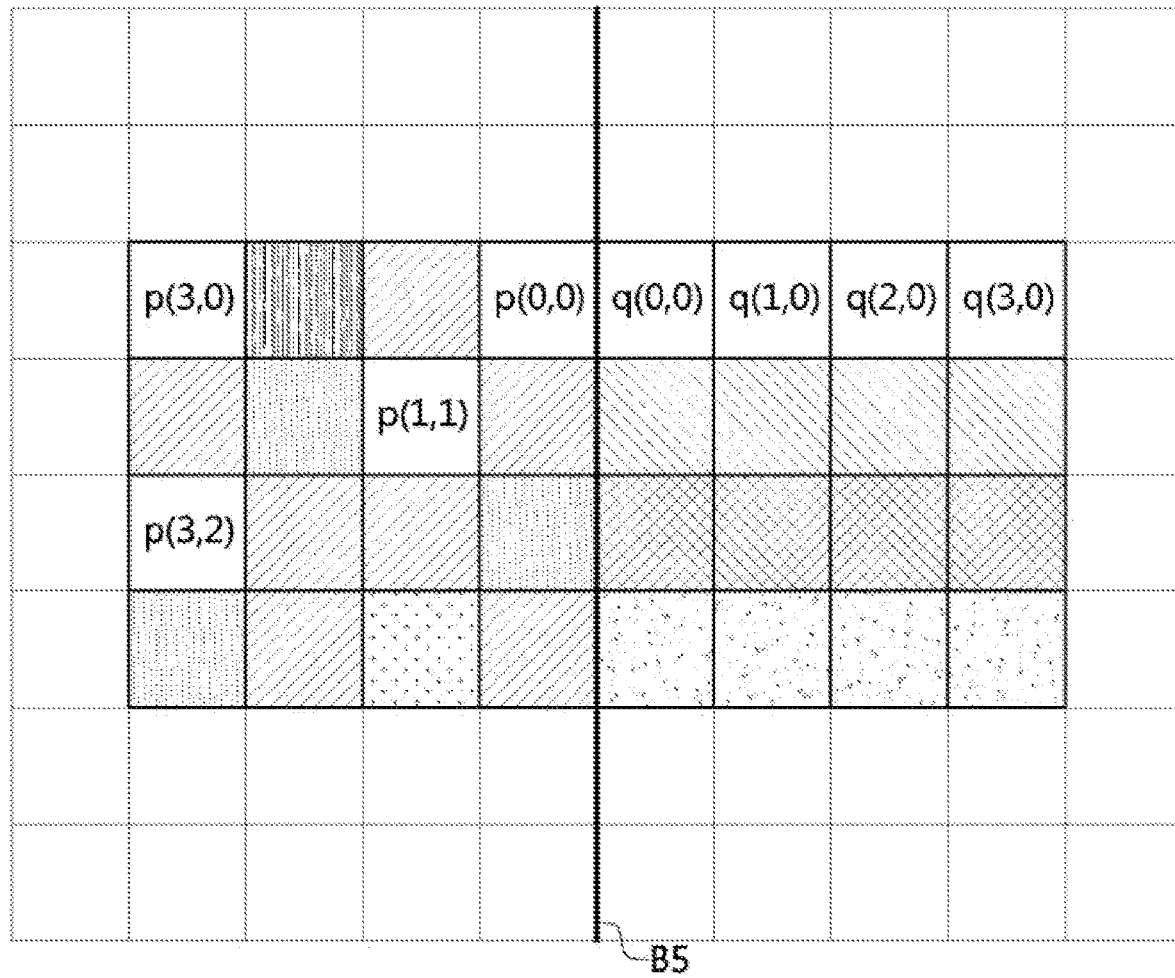
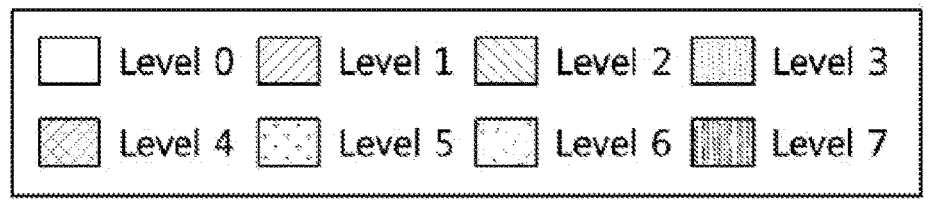

METHOD FOR ENCODING AND DECODING IMAGE USING ADAPTIVE DEBLOCKING FILTERING, AND APPARATUS THEREFOR

CROSS REFERENCE TO RELATED APPLICATIONS

This application is a continuation of U.S. application Ser. No. 18/152,704, filed Jan. 10, 2023, which is a continuation of U.S. application Ser. No. 15/579,909, filed Dec. 5, 2017, now U.S. Pat. No. 11,616,987, which is a U.S. National Stage Application of International Application No. PCT/KR2016/006273, filed on Jun. 13, 2016, which claims the benefit under 35 USC 119(a) and 365(b) of Korean Patent Application No. 10-2015-0082702, filed on Jun. 11, 2015, and Korean Patent Application No. 10-2015-0082714, filed on Jun. 11, 2015 in the Korean Intellectual Property Office, the entire contents of each are hereby incorporated by reference.

TECHNICAL FIELD

The present invention relates to image-encoding and -decoding technology. More particularly, the present invention relates to a method for encoding and decoding an image using adaptive deblocking filtering according to a prediction mode, and an apparatus therefor.

BACKGROUND ART

With the popularization of the Internet and mobile terminals and the development of information and communication technology, the use of multimedia data has increased. Thus, in order to perform various services and operations in various systems through image prediction, the need for improved performance and efficiency of an image-processing system have rapidly increased.

In the meantime, in existing image-encoding/decoding technology, motion information for neighbor blocks of a current block is predicted in at least one reference picture before or after a current picture in an inter-prediction method, or a motion vector for the current block is estimated by obtaining the motion information from the reference block in the current picture in an intra-prediction method.

However, the existing inter-prediction method is problematic in that calculations therefor are complicated since a prediction block is generated by using a temporal prediction mode between pictures. The intra-prediction method is problematic in that encoding is complicated.

Also, image encoding includes prediction, transform, quantization, and entropy coding processes. In the quantization process, blocking artifact and a ringing phenomenon occur in a reconstructed picture due to a quantization error, and thus the subjective definition of a reconstructed image is degraded.

Therefore, in the conventional image-encoding and -decoding technology using quantization, filtering is performed on the reconstructed picture to enhance subjective definition. The conventional technology related to filtering of the reconstructed picture is classified into a post-filter method and an in-loop filter method according to whether a filtered picture is used as a reference picture in an inter-prediction mode.

In the post-filter method, filtering is performed outside of an image decoder just before the reconstructed image is output. In the in-loop filter method, after applying filtering to the reconstructed picture, the filtered picture is inserted into a decoded picture buffer (DPB) and is used as the reference picture in the inter-prediction mode.

In the meantime, in the in-loop filter method, namely, in a deblocking filter method, when performing filtering, reconstructed pixels stored in a memory are loaded, and then filtering is performed. The filtered pixels are stored in the memory, and thus frequent memory access is caused. Also, in the deblocking filter method, a filtering calculation process is complex. Due to calculation complexity and overhead for memory access, a decoder has large complexity of 2030%. Thus, in an image-encoding and -decoding technology, an effective method of filtering the reconstructed picture is required.

DISCLOSURE

Technical Problem

Accordingly, the present invention has been made keeping in mind the above problems, and an object of the present invention is to provide a method for encoding and decoding an image using adaptive deblocking filtering, and an apparatus therefor.

Another object of the present invention is to provide a method for encoding and decoding an image and an apparatus therefor that can enhance a performance and efficiency of an image-processing system.

Technical Solution

According to an aspect in order to accomplish the above object, there is provided an image encoding method performing adaptive filtering in inter-prediction, the method including: searching for a reference block by performing inter-prediction on an encoding target current block; generating a flag indicating whether the found reference block exists within a current picture where a current block is positioned; encoding and reconstructing the current block by using the found reference block; adaptively applying an in-loop filter for the reconstructed current block based on the flag; and storing the current block to which the in-loop filter is or is not applied in a decoded picture buffer (DPB).

Here, the in-loop filter may include at least one of a deblocking filter and a sample adaptive offset (SAO).

Here, at the adaptively applying of the in-loop filter, when the flag indicates that the reference block exists within the current picture, the in-loop filter may not be applied for the reconstructed current block.

Here, at the adaptively applying of the in-loop filter, when the flag indicates that the reference block does not exist within the current picture, the in-loop filter may be applied for the reconstructed current block.

According to another aspect in order to accomplish the above object, there is provided an image encoding method performing inter-prediction, the method including: encoding and reconstructing an image signal including a reference block positioned in a same picture as a current block, the reference block on which block matching is performed in inter-prediction of the current block; storing the reconstructed image signal in a decoded picture buffer (DPB) and a separate temporary memory; and performing inter-prediction for the current block through block matching by using the reference block included in the reconstructed image signal.

Here, at the storing in the temporary memory, the reconstructed image signal may be stored in the temporary memory after passing through an in-loop filter and a separate filter.

Here, the separate filter may perform filtering on left and upper boundaries of the reference block included in the reconstructed image signal.

Here, the separate filter may perform filtering on at least one of a boundary of a transform block, a boundary of a prediction block, and a common block boundary of the transform block and the prediction block in the reconstructed image signal.

According to another aspect in order to accomplish the above object, there is provided an image decoding method performing adaptive filtering in inter-prediction, the method including: reconstructing, from a bitstream, an image signal including a reference block on which block matching is performed in inter-prediction of a current block to be encoded; obtaining, from the bitstream, a flag indicating whether the reference block exists within a current picture where the current block is positioned; reconstructing the current block by using the reference block; adaptively applying an in-loop filter for the reconstructed current block based on the obtained flag; and storing the current block to which the in-loop filter is or is not applied in a decoded picture buffer (DPB).

Here, the in-loop filter may include at least one of a deblocking filter and a sample adaptive offset (SAO).

Here, at the adaptively applying of the in-loop filter, when the flag indicates that the reference block exists within the current picture, the in-loop filter may not be applied for the reconstructed current block.

Here, at the adaptively applying of the in-loop filter, when the flag indicates that the reference block does not exist within the current picture, the in-loop filter may be applied for the reconstructed current block.

According to another aspect in order to accomplish the above object, there is provided an image decoding method performing inter-prediction, the method including: reconstructing, from a bitstream, an image signal including a reference block positioned in a same picture as a current block, the reference block on which block matching is performed in inter-prediction of the current block; storing the reconstructed image signal in a decoded picture buffer (DPB) and a separate temporary memory; and performing inter-prediction for the current block through block matching by using the reconstructed image signal.

Here, at the storing in the temporary memory, the reconstructed image signal may be stored in the temporary memory after passing through an in-loop filter and a separate filter.

Here, the separate filter may perform filtering on left and upper boundaries of the reference block included in the reconstructed image signal.

Here, the separate filter may perform filtering on at least one of a boundary of a transform block, a boundary of a prediction block, and a common block boundary of the transform block and the prediction block in the reconstructed image signal.

According to an aspect in order to accomplish the above object, there is provided an image decoding apparatus performing adaptive filtering in inter-prediction, the apparatus including at least one processor, wherein the processor is configured to: reconstruct, from a bitstream, an image signal including a reference block on which block matching is performed in inter-prediction of a current block to be encoded; obtain, from the bitstream, a flag indicating whether the reference block exists within a current picture where the current block is positioned; reconstruct the current block by using the reference block; adaptively apply an in-loop filter for the reconstructed current block based on the obtained flag; and store the current block to which the in-loop filter is or is not applied in a decoded picture buffer (DPB).

Here, the in-loop filter may include at least one of a deblocking filter and a sample adaptive offset (SAO).

Here, at the adaptively applying of the in-loop filter, when the flag indicates that the reference block exists within the current picture, the in-loop filter may not be applied for the reconstructed current block.

Here, at the adaptively applying of the in-loop filter, when the flag indicates that the reference block does not exist within the current picture, the in-loop filter may be applied for the reconstructed current block.

According to another aspect in order to accomplish the above object, there is provided an image encoding method, method including: generating a reconstruction signal based on a prediction signal referring to a decoded image and a residual signal generated through inverse quantization and inverse transform; determining whether filtering for the reconstruction signal is skipped; and performing deblocking filtering when determining that filtering is not skipped.

According to another aspect in order to accomplish the above object, there is provided an image decoding method, the method including: generating a reconstruction signal based on a prediction signal referring to a decoded image and a residual signal generated through inverse quantization and inverse transform; determining whether filtering for the reconstruction signal is skipped; and performing deblocking filtering when determining that filtering is not skipped.

According to another aspect in order to accomplish the above object, there is provided an image decoding apparatus, the apparatus including an entropy decoder, an inverse quantization unit, an inverse transform unit, an addition and subtraction unit, a prediction unit, a filtering skip confirmation unit, a skip selection circuit, a filter unit, and a decoded picture buffer, wherein the filtering skip confirmation unit is located between the addition and subtraction unit and the filter unit, the skip selection circuit is located in a space between the filtering skip confirmation unit and the filtering unit and a space between the filtering skip confirmation unit and the decoded picture buffer, and the filtering skip confirmation unit controls the skip selection circuit based on selection information from a filtering skip flag.

According to an aspect in order to accomplish the above object, there is provided an image encoding method, the method including: signal referring to a decoded image and a residual signal generated through inverse quantization and inverse transform; determining whether filtering for the reconstruction signal is skipped; and performing deblocking filtering when determining that filtering is not skipped, wherein the performing of deblocking filtering includes a sub-step where a block boundary is confirmed, a sub-step where filtering strength is set, a sub-step where whether filtering is applied is determined, and a sub-step where filtering is applied depending on whether filtering is applied.

According to an aspect in order to accomplish the above object, there is provided an image decoding method, the method including: signal referring to a decoded image and a residual signal generated through inverse quantization and inverse transform; determining whether filtering for the reconstruction signal is skipped; and performing deblocking filtering when determining that filtering is not skipped, wherein the performing of deblocking filtering includes a sub-step where a block boundary is confirmed, a sub-step where filtering strength is set, a sub-step where whether filtering is applied is determined, and a sub-step where filtering is applied depending on whether filtering is applied.

According to an aspect in order to accomplish the above object, there is provided an image decoding apparatus, the apparatus including: a memory storing a decoding program for generating a reconstruction signal based on a prediction signal referring to a decoded image and a residual signal generated through inverse quantization and inverse transform, the memory storing a filtering program for skipping or performing filtering after determining whether filtering for the reconstructed signal is skipped; and a processor coupled to the memory to execute program code of the decoding program or the filtering program, wherein the processor, by the program code, is configured to: generate the reconstruction signal based on the prediction signal referring to the decoded image and the residual signal generated through inverse quantization and inverse transform; determine whether filtering for the reconstruction signal is skipped; and perform deblocking filtering when determining that filtering is not skipped, wherein when performing deblocking filtering, a block boundary is confirmed, filtering strength is set, and whether filtering is applied is determined.

According to an aspect in order to accomplish the above object, there is provided an image encoding method related to configure a reference pixel in intra-prediction, the method including: obtaining a reference pixel of a current block from a neighbor block in intra-prediction of the current block; adaptively performing filtering on the reference pixel; generating a prediction block of the current block by using the reference pixel to which adaptive filtering is applied as an input value depending on a prediction mode of the current block; applying an adaptive post-filter on the prediction block.

Here, at the obtaining of the reference pixel, the reference pixel of the current block may be obtained from the neighbor block.

Here, the obtaining of the reference pixel may be determined depending on availability of the neighbor block.

Here, the availability of the neighbor block may be determined based on a position of the neighbor block and/or a particular flag (constrained_intra_pred_flag). For example, the particular flag may have a value of one, when the neighbor block is available. When the prediction mode of the neighbor block is an inter mode, the reference pixel of the block may be unavailable in prediction of the current block.

Here, the particular flag (constrained_intra_pred_flag) may be determined based on the prediction mode of the neighbor block, and the prediction mode may be an intra-prediction mode or an inter-prediction mode.

Here, when the particular flag (constrained_intra_pred_flag) has a value of zero, regardless of the prediction mode of the neighbor block, availability of the neighbor block may be 'true'. When the particular flag has a value of one and when the prediction mode of the neighbor block is the intra-prediction mode, availability of the neighbor block may be 'true', and when the prediction mode of the neighbor block is the inter-prediction mode, availability of the neighbor block may be 'false'.

Here, in inter-prediction, the prediction block may be generated by referring to at least one reference picture.

Here, the reference picture may be managed through a reference picture list 0 (List 0) and a reference picture list 1 (List 1), and one or more past pictures, future pictures, current pictures may be included in the List 0 and the List 1.

Here, whether the current picture is included the reference picture lists (List 0 and List 1) may be adaptively determined.

Here, information for determining whether the current picture included in the reference picture list may be included in a sequence, a reference picture parameter set, etc.

According to an aspect in order to accomplish the above object, there is provided an image decoding method executed by the computing device, the method including: obtaining, from an input bitstream, a flag indicating availability of a reference pixel of a neighbor block in units of a sequence or a picture; determining availability of the reference pixel of the neighbor block when performing intra-prediction based on the flag; and when the flag has a value of zero, using the reference pixel of the neighbor block in prediction of a current block, regardless of a prediction mode of the neighbor block, and when the flag has a value of one and when the prediction mode of the neighbor bock is an intra-prediction mode, using the reference pixel of the neighbor block in prediction of the current block, and when the prediction mode of the neighbor block is an inter-prediction mode, not using the reference pixel of the neighbor block in prediction of the current block.

Here, in the inter-prediction mode, a prediction block may be generated based on block matching in a reference picture.

Here, the reference picture may be managed through a List 0 in a P-picture, and may be managed through a List 0 and a List 1 in a B-picture.

Here, in the inter-prediction mode, the List 0 may include a current picture.

Here, in the inter-prediction mode, the List 1 may include a current picture.

Here, including the current picture in the List 0 and the List 1 may be determined based on a flag transmitted from a sequence parameter.

Here, including the current picture in the List 0 and the List 1 may be determined based on a flag transmitted from a picture parameter.

Advantageous Effects

When using a method for encoding and decoding an image using adaptive deblocking filtering and an apparatus therefor according to embodiments of the present invention, the performance of deblocking filtering can be improved such that the performance of an image-processing system or an image prediction system can be improved.

Also, according to the present invention, a blocking effect of an intra-prediction block or an inter-prediction block can be reduced such that subjective definition can be enhanced, and coding efficiency can be enhanced.

DESCRIPTION OF DRAWINGS

FIG. 12 is a view illustrating a main procedure of a method for encoding an image according to an embodiment of the present invention as syntax in a coding unit.

FIG. 15 is a view illustrating a process of performing 1-D horizontal filtering on pixels at positions a, b, and c (assuming x) of an image in a method for encoding an image according to an embodiment of the present invention.

FIGS. 21a to 21d are exemplary views illustrating transmission in block units of various sizes in a method for encoding an image according to an embodiment of the present invention.

FIG. 25 is an exemplary view illustrating a boundary for setting filtering strength in the method for encoding an image of FIG. 23.

FIG. 33 is an exemplary view illustrating still another example of a filtering application determination process in the method for encoding an image of FIG. 23.

MODE FOR INVENTION

Figure 1:
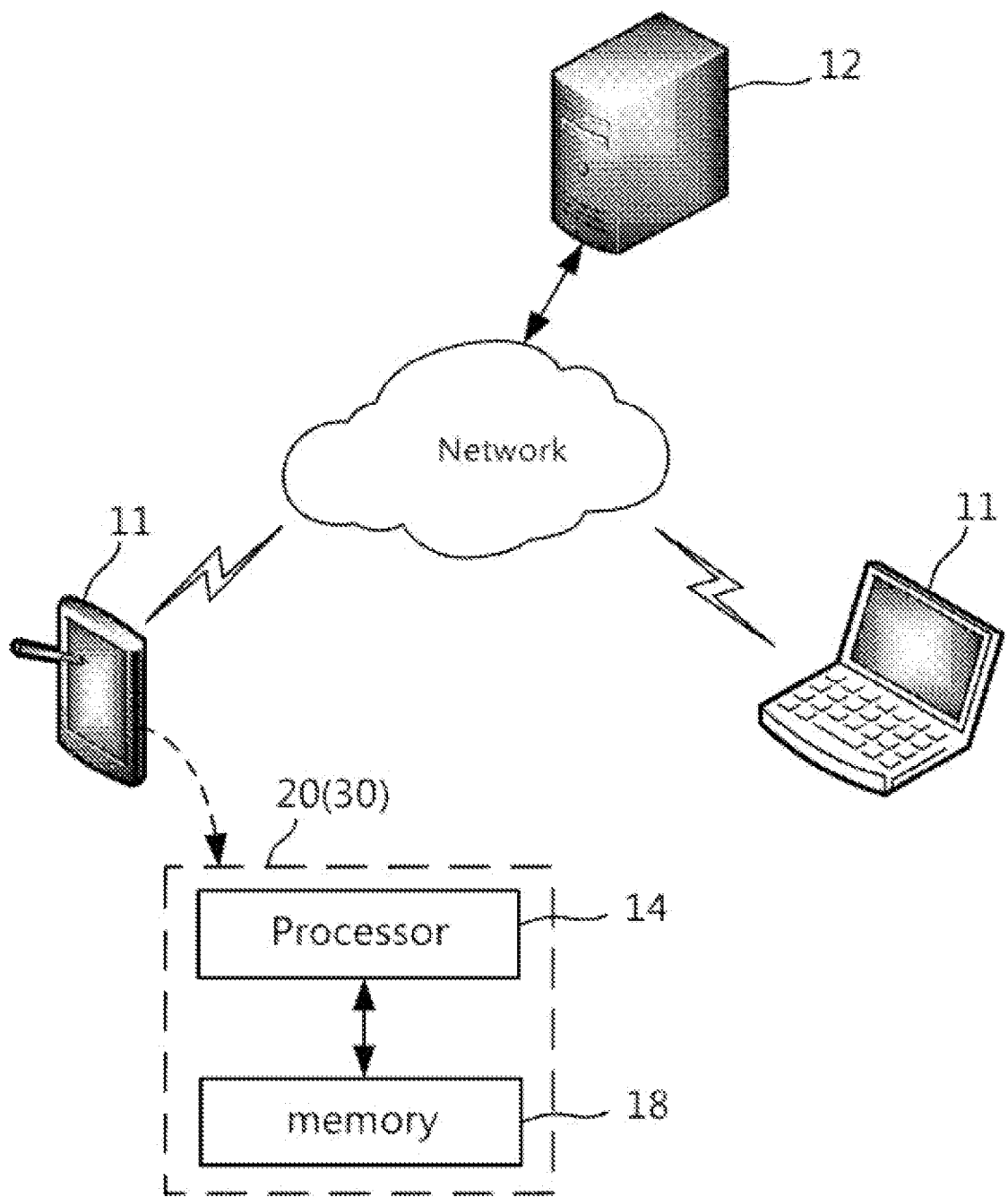
FIG. 1 is a view illustrating a system using an apparatus for encoding an image and/or an apparatus for decoding an image according to the present invention.

A variety of modifications may be made to the present invention, and various embodiments of the present invention are possible, examples of which will now be provided with reference to drawings and described in detail. However, the present invention is not limited thereto, although the exemplary embodiments can be construed as including all modifications, equivalents, or substitutes in the technical concept and technical scope of the present invention.

Terms used in the specification, 'first', 'second', etc. can be used to describe various components, but the components are not to be construed as being limited to the terms. The terms are only used to differentiate one component from other components. For example, a 'first' component may be renamed a 'second' component without departing from the scope of the present invention, and the 'second' component may also be similarly renamed the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element, or may be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by one of ordinary skill in the art to which the present invention belongs. It should be understood that terms defined in the dictionary meanings identical to those within the context of the related art, and should not be ideally or excessively formally defined unless the context clearly dictates otherwise in this specification.

Normally, a video may be composed of a series of pictures, and each picture may be partitioned into predetermined areas such as frames or blocks. Also, the predetermined area may be referred to as a block, a coding tree unit (CTU), a coding unit (CU), a prediction unit (PU), and a transform unit (TU) that have different sizes. Each unit may be composed of one luma block and two chroma blocks, but may be differently composed depending on the a color format. Also, the sizes of the luma block and the chroma block may be determined according to the color format. For example, in the case of 4:2:0, the size of the chroma block may be ½ of the width and length of the luma block. For these units and terms, terms in existing HEVC (high-efficiency video coding) or H.264/AVC (advanced video coding) may be referenced.

Also, a picture, a block, or a pixel being referenced to encode or decode a current block or a current pixel is a reference picture, a reference block, or a reference pixel. Also, it will be understood by those skilled in the art that the term "picture" used below may be substituted by another term having the same meaning, such as "image", "frame", etc.

Hereinafter, preferred embodiments of the present invention will be described in detail with reference to the accompanying drawings. In describing the present invention, to facilitate overall understanding thereof, the same constituent elements in the drawings are denoted by the same reference numerals, and a repeated description of the same elements will be omitted.

FIG. 1 is a view illustrating a system using an apparatus for encoding an image and/or an apparatus for decoding an image according to the present invention.

Referring to FIG. 1, the system using an apparatus for encoding an image and/or an apparatus for decoding an image may be a user terminal 11 such as a personal computer (PC), a notebook computer, a personal digital assistant (PDA), a portable multimedia player (PMP), a PlayStation portable (PSP), a wireless communication terminal, a smart phone, a television (TV), etc. or a server terminal 12 such as an application server, a service server, etc. The system may be referred to as a computing device.

Also, the computing device may include various devices including a communication device such as a communication modem, etc. for communication with various devices or a wired/wireless communication network, a memory 18 storing various programs and data for inter or intra-prediction to encode or decode an image, and a processor 14 executing programs to perform calculation and control.

Also, the computing device transmits images encoded in bitstreams using an apparatus for encoding an image to an apparatus for decoding an image in real-time or not in real-time through a wired/wireless communication network such as the Internet, a wireless local area network, a WiBro network, and a mobile network or through various communication interfaces such as a cable, a universal serial bus (USB), etc. such that the apparatus for decoding an image decodes the images to reconstruct the images. Also, the images encoded in bitstreams by the apparatus for encoding an image may be transmitted to the apparatus for decoding an image through a computer-readable recording medium.

Figure 2:
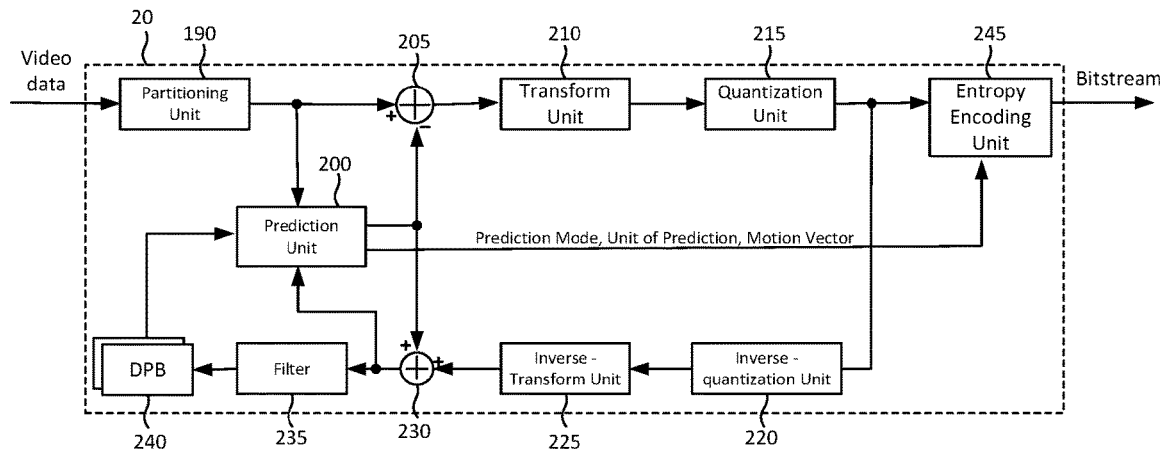
FIG. 2 is a block diagram illustrating an apparatus for encoding an image according to an embodiment of the present invention.
Figure 3:
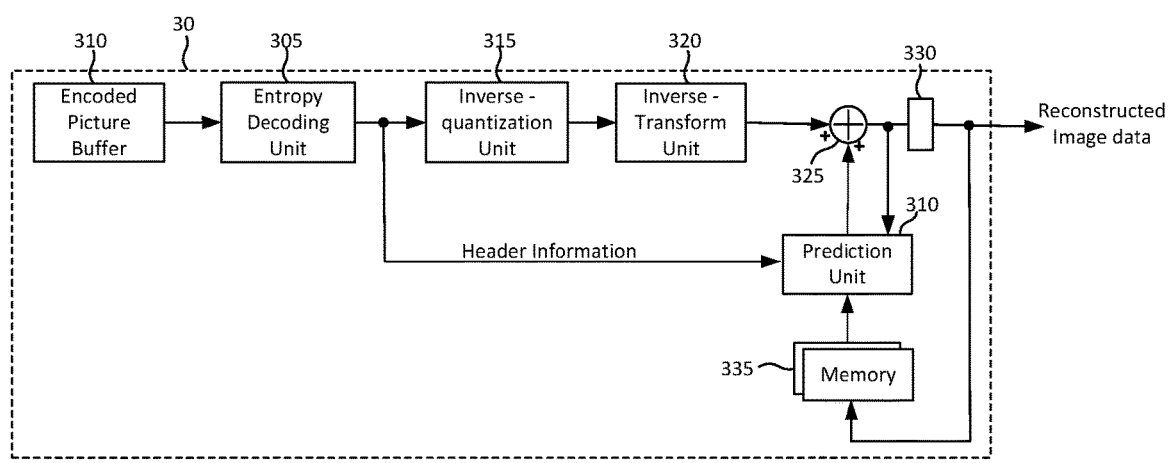
FIG. 3 is a block diagram illustrating an apparatus for decoding an image according to an embodiment of the present invention.

FIG. 2 is a block diagram illustrating an apparatus for encoding an image according to an embodiment of the present invention. FIG. 3 is a block diagram illustrating an apparatus for decoding an image according to an embodiment of the present invention.

An apparatus 20 for encoding an image according to the embodiment, as shown in FIG. 2, may include a prediction unit 200, a subtractor 205, a transform unit 210, a quantization unit 215, an inverse quantization unit 220, an inverse transform unit 225, an adder 230, a filter unit 235, a decoded picture buffer (DPB) 240, and an entropy encoder 245. Also, the apparatus 20 for encoding an image may further include a partitioning unit 190.

Also, an apparatus 30 for encoding an image according to the embodiment, as shown in FIG. 3, may include an entropy decoder 305, a prediction unit 310, an inverse quantization unit 315, an inverse transform unit 320, an adder 325, a filter unit 330, and a decoded picture buffer 335.

The apparatus 20 for encoding an image and the apparatus 30 for decoding an image may be separate apparatuses, or may be provided as a single apparatus for encoding and decoding an image, depending on the implementation. In this case, the prediction unit 200, the inverse quantization unit 220, the inverse transform unit 225, the adder 230, the filter unit 235, and the decoded picture buffer 240 of the apparatus 20 for encoding an image are substantially the same technical elements as the prediction unit 310, the inverse quantization unit 315, the inverse transform unit 320, the adder 325, the filter unit 330, and a memory 335 of the apparatus 30 for decoding an image, respectively. The apparatus 20 for encoding an image and the apparatus 30 for decoding an image may be realized as having at least the same structure or as performing at least the same function. Also, when the entropy encoder 245 inversely performs the function thereof, it is also the entropy decoder 305. Therefore, in the detailed description of the technical elements and operation principles thereof, a description of corresponding technical elements will be omitted.

The apparatus for decoding an image corresponds to a computing device that applies, for decoding, a method of encoding an image performed by the apparatus for encoding an image, and thus the description will be focused on the apparatus for encoding an image in the following description.

The computing device may include a memory storing programs or software modules implementing a method for encoding an image and/or a method for decoding an image and a processor coupled to the memory to execute programs. The apparatus for encoding an image may be referred to as an encoder, and the apparatus for decoding an image may be referred to as a decoder.

Components of the apparatus for encoding an image according to the embodiment will be described in detail as follows.

The partitioning unit 190 partitions an input image into blocks having predetermined size (M×N). Here, M or N is an arbitrary natural number equal to or greater than one.

Specifically, the partitioning unit 190 may be composed of a picture-partitioning unit and a block-partitioning unit. The size or shape of the block may be determined according to characteristics, resolution, etc. of the image. The size or shape of the block supported by the picture-partitioning unit may be a M×N square shape (256×256, 128×128, 64×64, 32×32, 16×16, 8×8, 4×4, etc.) in which the width and length are indicated as an exponent of 2, or a M×N rectangular shape. For example, in the case of a 8k UHD image with high resolution, the input image may be partitioned in a size of 256×256. In the case of a 1080p HD image, the input image may be partitioned in size of 128×128, and in the case of a WVGA image, the input image may be partitioned in a size of 16×16.

Information on the size or shape of the block may be set in units such as a sequence, a picture, a slice, etc., and relevant information may be transmitted to the decoder. That is, it may be set in a sequence parameter set, a picture parameter set, a slice header, or a combination thereof.

Here, "sequence" refers to a unit that consists of several related scenes. The picture is a term for a series of luma (Y) components or luma and chroma (Y, Cb, and Cr) components in one scene or picture. The range of one picture may be one frame or one field depending on the case.

The term "slice" may refer to one independent slice segment and several dependent slice segments that exist in the same access unit. The access unit may mean a set of NAL (network abstraction layer) units related to one coded picture. The NAL unit is a syntax structure where a video compression bitstream is in a network-friendly H.264/AVC and HEVC standard format. One slice unit is generally composed of one NAL unit, and in a system standard, an NAL or an NAL set composing one frame is generally regarded as one access unit.

Continuing the description of the picture-partitioning unit, information on the size or shape of the block (M×N) may consist of an explicit flag. Specifically, the information on the size of the block may include information on one length when the block is a square shape, and may include information on each length, or information on a difference value between the width and the height when the block is a rectangular shape. For example, when M and N are exponentiation of k (assuming k is 2) (M=2m, N=2n), information on m and n may be encoded in various methods such as unary binarization, truncated unary binarization, etc. and relevant information may be transmitted to the decoder.

Also, a minimum partition-available size (Minblksize) supported by the picture-partitioning unit may provide information on I×J (for convenience of explanation, assuming I=J, I=$2^i$, J=$2^j$), m-i, or n-j. As another example, when M is different from N, a difference value between m and n (|m−n|) may be provided. Alternatively, a maximum partition-available size (Maxblksize) supported by the picture-partitioning unit may provide information on I×J (for convenience of explanation, assuming I=J, I=$2^i$, J=$2^j$), i-m, or n-j.

By implication, for example, when there is syntax for the relevant information but is unable to be verified in the encoder/decoder, the encoder or the decoder may follow a preset default setting. For example, when the relevant syntax is unable to be verified at identifying information on the shape of the block, the shape of the block may be set to a square shape which is a default setting. Also, when identifying the information on the size of the block, specifically, at identifying the information on the size of the block through a difference value from the minimum partition-available size (Minblksize), when the difference-value-related syntax is verified but minimum partition-available size (Minblksize)-relate syntax is unable to be verified, it may be obtained from a minimum partition-available size (Minblksize)-related default setting value.

As described above, in the picture-partitioning unit, information related to the size or shape of the block may be explicitly transmitted from the encoder and/or decoder, or the size or shape of the block may be implicitly determined according to the characteristics and resolution of an image.

As described above, the block partitioned and determined through the picture-partitioning unit may be used as a default coding unit. Also, the block partitioned and determined through the picture-partitioning unit may be a minimum unit composing an upper-level unit such as a picture, a slice, a tile, etc., or may be a maximum unit of a coding block, a prediction block, a transform block, a quantization block, an entropy block, an in-loop filtering block, etc. However, some blocks are not limited thereto, and exceptions are possible. For example, some blocks, such as an in-loop filtering block, may be applied as a unit larger than the size of the above-described block.

The block-partitioning unit partitions the coding, prediction, transform, quantization, entropy, and in-loop filtering blocks. The partitioning unit 190 may be included in each component to perform a function. For example, the transform unit 210 may include a transform unit partitioning unit, and the quantization unit 215 may include a quantization block-partitioning unit. The size or shape of an initial block of the block-partitioning unit may be determined based on a partitioning result of a previous stage or an upper-level block.

For example, in the case of the coding block, the block obtained through the picture-partitioning unit in the previous stage may be set as the initial block. Alternatively, in the case of the prediction block, the block obtained through partitioning of the coding block, which is an upper level of the prediction block may be set as the initial block. Alternatively, in the case of the transform block, the block obtained through partitioning of the coding block, which is an upper level of the transform block, may be set as the initial block.

The conditions for determining the size or shape of the initial block are not always fixed, and some of the conditions may be changed, or exceptions may exist. Also, based on a combination of at least one factor among the partition state of the previous stage or the upper-level block (e.g., the size of the coding block, the shape of the coding block, etc.) and the setting condition of the current level (e.g., the size of the transform block, the shape of the transform block supported, etc.), partitioning operation of the current level (partitioning possibility, partitionable block shape, etc.) may be affected.

The block-partitioning unit may support a quad-tree-based partitioning method. That is, the pre-partition block may be partitioned into four blocks having ½ the width and ½ the length thereof. Based on the initial block (dep_0), partitioning may be repeated up to the partition-available depth limit (dep_k, k being the number of times partitioning is available, and the block size at the partition-available depth limit (dep_k) satisfies M>>k, N>>k).

Also, a binary-tree-based partitioning method may be supported. The pre-partition block may be partitioned into two blocks having ½ the width or ½ the length thereof. The quad-tree-based partitioning and the binary-tree-based partitioning may be symmetric partitioning or asymmetric partitioning. Based on setting of the encoder/decoder, which partitioning method is used may be determined. The symmetric partitioning method will be mainly described in the method for encoding an image of the present invention.

The partition flag (div_flag) may indicate whether partitioning of each block is performed. When the value is one, partitioning is performed, and when the value is zero, partitioning is not performed. Alternatively, when the value is one, partitioning is performed and additional partitioning is possible, and when the value is zero, partitioning is not performed and additional partitioning may be not allowed. Depending on conditions such as the minimum partition-available size, the partition-available depth limit, etc., the flag may consider only whether partitioning is performed, and may not consider whether additional partitioning is performed.

The partition flag may be used in quad-tree-based partitioning and binary-tree-based partitioning. In binary-tree-based partitioning, a partitioning direction may be determined based on at least one factor among the partition depth, the coding mode, the prediction mode, the size, the shape, the type (one of coding, prediction, transform, quantization, entropy, in-loop filter, etc. or one of luma and chroma) of the block, the slice type, the partition-available depth limit, the minimum/maximum partition-available size or a combination thereof. Also, according to the partition flag and/or the partitioning direction, only the width of the block may be partitioned by ½ or only the length thereof may be partitioned by ½.

For example, assuming that when the block is M×N (M>N) and M is larger than N, horizontal-direction partitioning is supported, and that the current partition depth (dep_curr) is less than the partition-available depth limit such that additional partitioning is possible, 1 bit is assigned to the partition flag. When the value is one, horizontal-direction partitioning is performed, and when the value is zero, additional partitioning is not performed. One partition depth may be used in quad-tree-based and binary-tree-based partitioning, or the partition depth may be used in each of quad-tree-based and binary-tree-based partitioning. Also, the one partition-available depth limit may be used in quad-tree-based and binary-tree-based partitioning, or the partition-available depth limit may be used in each of quad-tree-based and binary-tree-based partitioning.

As another example, when the block is M×N (M>N) and N is equal to the preset minimum partition-available size such that horizontal-direction partitioning is not supported, 1 bit is assigned to the partition flag. When the value is one, vertical-direction partitioning is performed, and when the value is zero, partitioning is not performed.

Also, flags (div_h_flag, div_v_flag) for horizontal-direction partitioning or vertical-direction partitioning may be supported, and based on the flag, binary partitioning may be supported. A horizontal partition flag (div_h_flag) or a vertical partition flag (div_v_flag) may indicate whether horizontal or vertical-direction partitioning is performed on each block. When the horizontal partition flag (div_h_flag) or the vertical partition flag (div_v_flag) has a value of one, horizontal- or vertical-direction partitioning is performed, and when the value is zero, horizontal or vertical-direction partitioning is not performed.

Also, when the flag has a value of one, horizontal- or vertical-direction partitioning is performed and additional horizontal or vertical-direction partitioning may be performed. When the value is zero, horizontal- or vertical-direction partitioning is not performed, and additional horizontal- or vertical-direction partitioning may not be performed. Depending on conditions such as the minimum partition-available size, the partition-available depth limit, etc., the flag may consider whether partitioning is performed, or may not consider whether additional partitioning is performed.

Also, the flag (div_flag/h_v_flag) for horizontal-direction partitioning or vertical-direction partitioning may be supported, and based on the flag, binary partitioning may be supported. The partition flag (div_flag) may indicate whether or not horizontal or vertical-direction partitioning is performed, and the partitioning direction flag (h_v_flag) may indicate horizontal or vertical-direction partitioning.

When the partition flag (div_flag) has a value of one, partitioning is performed, and horizontal- or vertical-direction partitioning is performed based on the partitioning direction flag (h_v_flag). When the value is zero, horizontal- or vertical-direction partitioning is not performed. Also, when the value is one, horizontal or vertical-direction partitioning is performed based on the partitioning direction flag (h_v_flag), and additional horizontal- or vertical-direction partitioning may be performed. When the value is zero, horizontal- or vertical-direction partitioning is not performed, and additional horizontal- or vertical-direction partitioning may not performed.

Depending on conditions such as the minimum partition-available size, the partition-available depth limit, etc., the flag may consider whether partitioning is performed, or may not consider whether additional partitioning is performed.

The partition flag for each of horizontal- and vertical-direction partitioning may be supported, and based on the flag, binary-tree-based partitioning may be supported. Also, when the partitioning direction is predetermined, as described above, only one of two partition flags may be used or both partition flags may be used.

For example, when all of the flags indicate availability, the shape of the block may be partitioned into one of M×N, M/2×N, M×N/2, and M/2×N/2. In this case, the flags may be encoded as 00, 10, 01, and 11 in the order of the horizontal partition flag or the vertical partition flag (div_h_flag/div_v_flag).

The above case is an example of a setting where the partition flag can be used by being overlapped, but a setting where the partition flag cannot be used by being overlapped is also possible. For example, the shape of the partition block may be partitioned into M×N, M/2×N, and M×N/2. In this case, the flags may be encoded as 00, 01, and 10 in the order of the horizontal or vertical partition flags, or may be encoded as 0, 10, and 11 in the order of the partition flag (div_flag) and the horizontal-vertical flag (h_v_flag, which is a flag indicating that the partitioning direction is horizontal or vertical). Here, overlapping may mean that horizontal-direction partitioning and vertical-direction partitioning are performed simultaneously.

According to setting of the encoder and/or decoder, the quad-tree-based partitioning and the binary-tree-based partitioning may be used alone or in combination. For example, the quad-tree-based or binary-tree-based partitioning may be determined based on the size or shape of the block. That is, when the shape of the block is M×N and M is larger than N, horizontal-direction partitioning is performed. When the shape of the block is M×N and N is larger than M, based on vertical-direction partitioning, binary-tree-based partitioning may be supported. When the shape of the block is M×N and N is equal to M, quad-tree-based partitioning may be supported.

As another example, when the size of the block (M×M) is equal to or greater than a block partition boundary value (thrblksize), binary-tree-based partitioning may be supported. When the size of the block (M×M) is less than the block partition boundary value, quad-tree-based partitioning may be supported.

As another example, when M or N of the block (M×N) is equal to or less than a first maximum partition-available size (Maxblksize1) and is equal to or greater than a first minimum partition-available size (Minblksize1), quad-tree-based partitioning may be supported. When M or N of the block (M×N) is equal to or less than a second maximum partition-available size (Maxblksize2) and is equal to or greater than a second minimum partition-available size (Minblksize2), binary-tree-based partitioning may be supported.

When a first partition support range and a second partition support range that can be defined by the maximum partition-available size and the minimum partition-available size overlap each other, the first or second partitioning method may be given priority according to a setting of the encoder/decoder. In the embodiment, the first partitioning method may be quad-tree-based partitioning, and the second partitioning method may be binary-tree-based partitioning. For example, when the first minimum partition-available size (Minblksize1) is 16 and the second maximum partition-available size (Maxblksize2) is 64 and a pre-partition block is 64×64, which fall within the first partition support range and the second partition support range, and thus quad-tree-based partitioning and binary-tree-based partitioning may be used.

According to a pre-setting, in the case where the first partitioning method (in the embodiment, quad-tree-based partitioning) is given priority, when the partition flag (div_flag) has a value of one, quad-tree-based partitioning may be performed, and additional quad-tree-based partitioning may be performed. When the partition flag has a value of zero, quad-tree-based partitioning may be not performed, and additional quad-tree-based partitioning may be not performed. Alternatively, when the partition flag (div_flag) has a value of one, quad-tree-based partitioning may be performed and additional quad-tree-based or binary-tree-based partitioning may be performed. When the partition flag has a value of zero, quad-tree-based partitioning may not be performed and additional quad-tree-based partitioning may not be performed, but binary-tree-based partitioning may be performed. Depending on conditions such as the minimum partition-available size, the partition-available depth limit, etc., the flag may consider only whether partitioning is performed, and may not consider whether additional partitioning is performed.

When the partition flag (div_flag) has a value of one, partitioning is performed to obtain four 32×32-size blocks. The block is larger than the first minimum partition-available size (Minblksize1), and thus additional quad-tree-based partitioning may be performed. When the partition flag has a value of zero, additional quad-tree-based partitioning may not be performed. The size of the current block (64×64) is in the second partition support range, and thus binary-tree-based partitioning may be performed. When the partition flag (in order of div_flag/h_v_flag) has a value of zero, partitioning may not be performed anymore. When the partition flag has a value of 10 or 11, horizontal-direction partitioning or vertical-direction partitioning may be performed.

When the pre-partition block is 32×32 and additional quad-tree-based partitioning is not performed due to the partition flag (div_flag) value of zero and the second maximum partition-available size (Maxblksize2) is 16, the size of the current block (32×32) may fall within the second partition support range, and thus additional partitioning may not be supported. In the above description, the priority of the partitioning method may be determined according to at least one factor among a slice type, a coding mode, a luma/chroma component, etc. or a combination thereof.

As another example, various settings may be supported based on the luma and chroma components. For example, a quad tree or binary tree partition structure determined in the luma component may be used in the chroma component without encoding/decoding additional information. Alternatively, when supporting independent partitioning of the luma component and the chroma component, a quad tree and a binary tree may be supported in the luma component, and quad-tree-based partitioning may be supported in the chroma component.

Also, in the luma and chroma components, quad-tree-based partitioning and binary-tree-based partitioning may be supported, but the partition support range may or may not be the same for or proportional to the luma and chroma components. For example, when a color format is 4:2:0, the partition support range of the chroma component may be N/2 of the partition support range of the luma component.

As another example, the setting may be different depending on the slice type. For example, in an I-slice, quad-tree-based partitioning may be supported, and in a P-slice, binary-tree-based partitioning may be supported, and in a B-slice, both quad-tree-based partitioning and binary-tree-based partitioning may be supported.

As described above, quad-tree-based partitioning and binary-tree-based partitioning may be set and supported based on various conditions. The examples are not limited thereto, and may include a case where conditions are switched, a case of one or more factors mentioned in the examples or a combination thereof, or may be modified. The partition-available depth limit may be determined according to at least one factor among the partitioning method (quad tree, binary tree), the slice type, the luma/chroma component, the coding mode, etc. or a combination thereof.

Also, the partition support range may be determined according to at least one factor among the partitioning method (quad tree, binary tree), the slice type, the luma/chroma component, the coding mode, etc. or a combination thereof. The relevant information may be indicated as the maximum value and the minimum value of the partition support range. When the information is configured as an explicit flag, length information of the maximum value/the minimum value or information on a difference value between the minimum value and the maximum value may be indicated.

For example, when the maximum value and the minimum value are exponentiation of k (assuming k is two), exponent information of the maximum value and the minimum value may be encoded through various binarization to be provided to the decoding apparatus. Alternatively, a difference value of an exponent between the maximum value and the minimum value may be provided. Here, transmitted information may be exponent information of the minimum value and information on the difference value of the exponent.

According to the above description, information related to the flag may be generated and transmitted in units of a sequence, a picture, a slice, a tile, a block, etc.

The partition flags described above may indicate block partition information through a quad tree or a binary tree or a combination thereof. The partition flags may be encoded in various methods such as unary binarization, truncated unary binarization, etc. such that relevant information may be provided to the decoding apparatus. At least one scanning method may be performed on a bitstream structure of the partition flag for indicating the partition information of the block.

For example, a bitstream of the partition flags may be configured based on the partition depth order (from dep0 to dep_k), or the bitstream of the partition flags may be configured based on whether partitioning is performed. In a method based on the partition depth order, partition information at the depth of a current level is obtained based on the initial block, and then partition information at the depth of the next level is obtained. In a method based on whether partitioning is performed, additional partition information of the block partitioned based on the initial block is preferentially obtained. Other scanning methods not disclosed in the above examples can be selected.

Also, depending on the implementation, the block-partitioning unit may generate and indicate index information for a predefined block candidate group, rather than the above-described partition flags. The shapes of the block candidate group may include, e.g., M×N, M/2×N, M×N/2, M/4×N, 3M/4×N, M×N/4, M×3N/4, M/2×N/2, etc. as the shape of the partition block that the pre-partition block may have.

As described above, when the candidate group of partition blocks is determined, index information on the shape of the partition blocks may be encoded through various methods such as fixed-length binarization, truncated unary binarization, truncated binarization, etc. Like the above-described partition flag, a partition block candidate group may be determined according to at least one factor among the partition depth, the coding mode, the prediction mode, the size, the shape, the type of the block, the slice type, the partition-available depth limit, the minimum/maximum partition-available size, etc. or a combination thereof.

For the following explanation, it is assumed that (M×N, M×N/2) is a candidate list 1 (list1), (M×N, M/2×N, M×N/2, M/2×N/2) is a candidate list 2 (list2), (M×N, M/2×N, M×N/2) is a candidate list 3 (list3), and (M×N, M/2×N, M×N/2, M/4×N, 3M/4×N, M×N/4, M×3N/4, M/2×N/2) is a candidate list 4 (list4). For example, in description based on M×N, in a case of (M=N), the partition block candidate of the candidate list 2 may be supported, and in a case of (M≠N), the partition block candidate of the candidate list 3 may be supported.

As another example, when M or N of M×N is equal to or greater than the boundary value (blk_th), the partition block candidate of the candidate list 2 may be supported. When M or N of M×N is less than the boundary value, the partition block candidate of the candidate list 4 may be supported. Also, when M or N is equal to or greater than the first boundary value (blk_th_1), the partition block candidate of the candidate list 1 may be supported. When M or N is less than the first boundary value (blk_th_1) but is equal to or greater than the second boundary value (blk_th_2), the partition block candidate of the candidate list 2 may be supported. When M or N is less than the second boundary value (blk_th_2), the partition block candidate of the candidate list 4 may be supported.

As another example, when the coding mode is intra-prediction, the partition block candidate of the candidate list 2 may be supported. When the coding mode is inter-prediction, the partition block candidate of the candidate list 4 may be supported.

Even though the same partition block candidate is supported, bit configuration according to binarization in each block may be the same or different. For example, as being applied in the partition flag, when supported partition block candidates are limited depending on the size or shape of the block, bit configuration according to binarization of the relevant block candidate may differ. For example, in a case of (M>N), the block shape in consequence of horizontal-direction partitioning, namely, M×N, M×N/2, and M/2×N/2 may be supported. The binary bits of the index according to M×N/2 of the partition block candidate group (M×N, M/2×N, M×N/2, and M/2×N/2) may be different from the binary bits of the index according to M×N/2 of the current condition.

According to the type of blocks, e.g., coding, prediction, transform, quantization, entropy, in-loop filtering blocks, information on partitioning and shape of the block may be indicated by using one of the partition flag or a partition index. Also, according to the type of blocks, a block size limit for partitioning, the shape of the block, and a partition-available depth limit may differ.

A process of encoding and decoding in block units includes coding block determination, prediction block determination, transform block determination, quantization block determination, entropy block determination, in-loop filter determination, etc. The order of encoding and decoding processes is not always fixed, and some sequences may be changed or excluded. Based on encoding cost for each candidate according to the size and shape of the block, the size and shape of each block is determined, and image data of the determined block and partition-related information on the size and shape of the determined block may be encoded.

The prediction unit 200 may be realized by using the prediction module, which is a software module, and may generate a prediction block for an encoding target block in an intra-prediction method or an inter-prediction method. Here, in terms of pixel difference, the prediction block almost matches an encoding target block, and may be determined in various methods including SAD (sum of absolute differences) and SSD (sum of square differences). Also, here, various syntaxes that can be used in decoding image block may be generated. The prediction block may be classified into an intra block and an inter block according to the coding mode.

Intra-prediction is a prediction technique using spatial correlation, which is a method of prediction a current block by using reference pixels of reconstructed blocks that are previously encoded and decoded in the current picture. That is, a brightness value reconstituted by intra-prediction and reconfiguration may be used as a reference pixel by the encoder and the decoder. Intra-prediction may be effective for a flat area having continuity and a flat area having a constant directionality, and may use spatial correlation to ensure random access and to avoid error diffusion.

In inter-prediction, a compression technique that redundancy of data is removed by using temporal correlation with reference to an encoded image in at least one past and future picture is used. That is, in inter-prediction, a prediction signal with high similarity may be generated by referring to at least one past or future picture. The encoder using inter-prediction may search for a block having high correlation with a block to be currently encoded in the reference picture, and may transmit position information and a residual signal of the selected block to the decoder. The decoder may generate the same prediction block as the encoder by using selection information of the transmitted image, and may configure a reconstructed image by compensating the transmitted residual signal.

Figure 4:
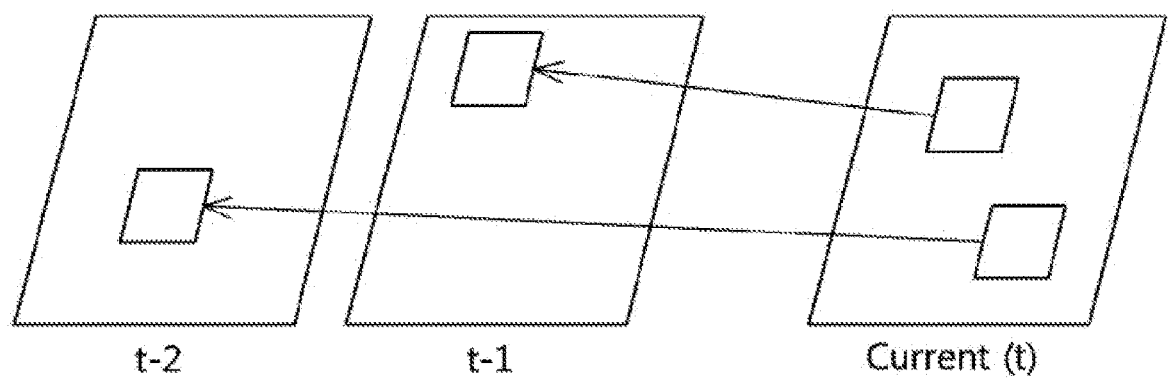
FIG. 4 is an exemplary view illustrating inter-prediction of a P-slice in a method for encoding and decoding an image according to an embodiment of the present invention.
Figure 5:
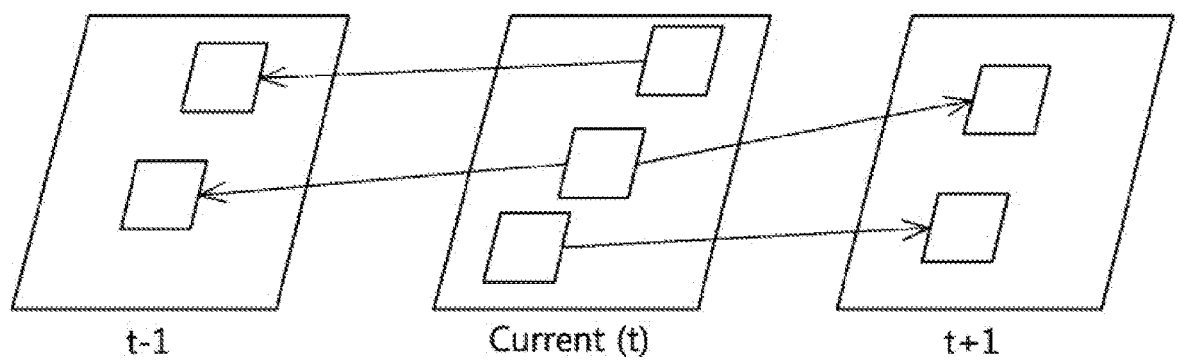
FIG. 5 is an exemplary view illustrating inter-prediction of a B-slice in a method for encoding and decoding an image according to an embodiment of the present invention.

FIG. 4 is an exemplary view illustrating inter-prediction of a P-slice in a method for encoding and decoding an image according to an embodiment of the present invention. FIG. 5 is an exemplary view illustrating inter-prediction of a B-slice in a method for encoding and decoding an image according to an embodiment of the present invention.

In the method for encoding an image in the embodiment, inter-prediction can enhance coding efficiency since a prediction block is generated from a previously encoded picture encoded having high temporal correlation. Current (t) may mean a current picture to be encoded and, based on the temporal flow or POC (picture order count) of the picture, may include a first reference picture having a first temporal distance (t−1) before POC of the current picture and a second reference picture having a second temporal distance (t−2) before the first temporal distance.

That is, as shown in FIG. 4, in inter-prediction that may be applied to the method for encoding an image according to the embodiment, through block matching between the current block of the current picture (current (t)) and reference blocks of reference pictures (t−1, t−2), motion estimation searching for the optimum prediction block from previously encoded reference pictures (t−1, t−2) may be performed. For precise estimation, after performing an interpolation process based on a structure where at least one sub-pixel is arranged between two adjacent pixels, the optimum prediction block is obtained, and then motion compensation is performed, thereby obtaining a definitive prediction block.

Also, as shown in FIG. 5, in inter-prediction that may be applied to the method for encoding an image according to the embodiment, a prediction block may be generated from encoded reference pictures (t−1, t+1) temporally existing in bi-directions based on the current picture (current(t)). Also, two prediction blocks may be generated from at least one reference picture.

When encoding an image through inter-prediction, motion vector information on the optimum prediction block and information on a reference picture may be encoded. In the embodiment, when generating the prediction block in a uni-direction or bi-directions, a reference picture list is differently constituted and the prediction block may be generated from the reference picture list. Basically, a reference picture existing temporally before the current picture may be assigned to a list 0 (L0) to be managed, and a reference picture existing after the current picture may be assigned to a list 1 (L1) to be managed.

When constituting the reference picture list 0, when the reference picture list 0 is not filled up to the allowable number of reference pictures, the reference picture existing after the current picture may be assigned. Similarly, when constituting the reference picture list 1, when the reference picture list 1 is not filled up to the allowable number of reference pictures, the reference picture existing before the current picture may be assigned.

Figure 6:
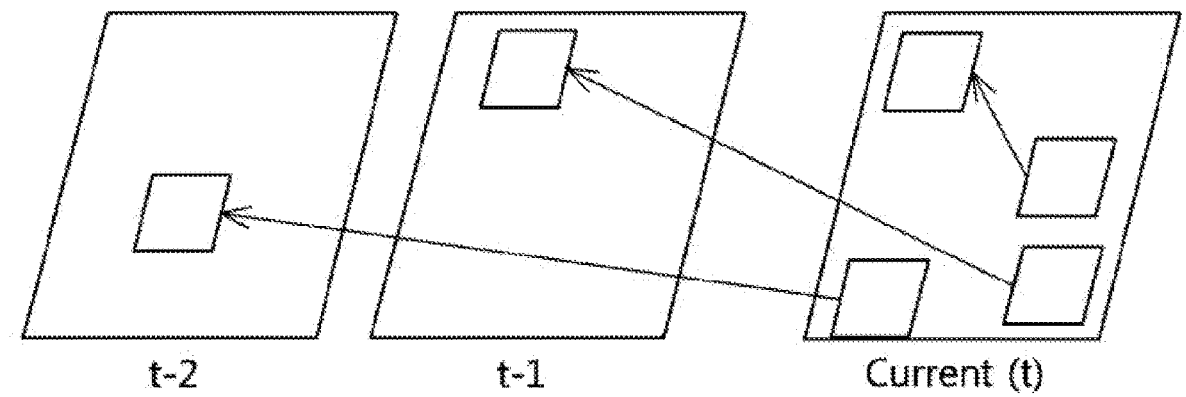
FIG. 6 is an exemplary view illustrating a case where a prediction block is generated in a uni-direction in a method for encoding and decoding an image according to an embodiment of the present invention.

FIG. 6 is an exemplary view illustrating a case where a prediction block is generated in a uni-direction in a method for encoding and decoding an image according to an embodiment of the present invention.

Referring to FIG. 6, in the method for encoding and decoding an image according to the embodiment, like the conventional method, a prediction block may be searched from previously encoded reference pictures (t−1, t−2) and a prediction block may be searched from an area already encoded in the current picture (current(t)).

That is, in the method for encoding and decoding an image according to the embodiment, from previously encoded pictures (t−1, t−2) having temporally high correlation, a prediction block may be generated and a prediction block having spatially high correlation may be searched. Searching for the prediction block having spatially high correlation may correspond to searching for a prediction block in the manner of intra-prediction. In order to perform block matching from the area already encoded in the current picture, the method for encoding an image according to the embodiment may configure syntax for information on a prediction candidate in an intra-prediction mode.

For example, when supporting n (n is an arbitrary natural number) intra-prediction modes, one mode is added to an intra-prediction candidate group to support n+1 modes. M fixed bits satisfying $2^{M-1} \leq n+1 < 2^M$ may be used to encode the prediction mode. Also, like MPM (most probable mode) of HEVC, a prediction mode having high possibility may be selected form the candidate group. Also, the prediction mode may be preferentially encoded at an upper stage of encoding the prediction mode.

When generating a prediction block through block matching in the current picture, the method for encoding an image according to the embodiment may configure syntax for information on the inter-prediction mode. As additional information on the prediction mode, information on motion or displacement may be used. The information on motion or displacement may include information on the optimum candidate of several vector candidates, a difference value between the optimum candidate vector and the actual vector, information on a reference direction, a reference picture, etc.

Figure 7:
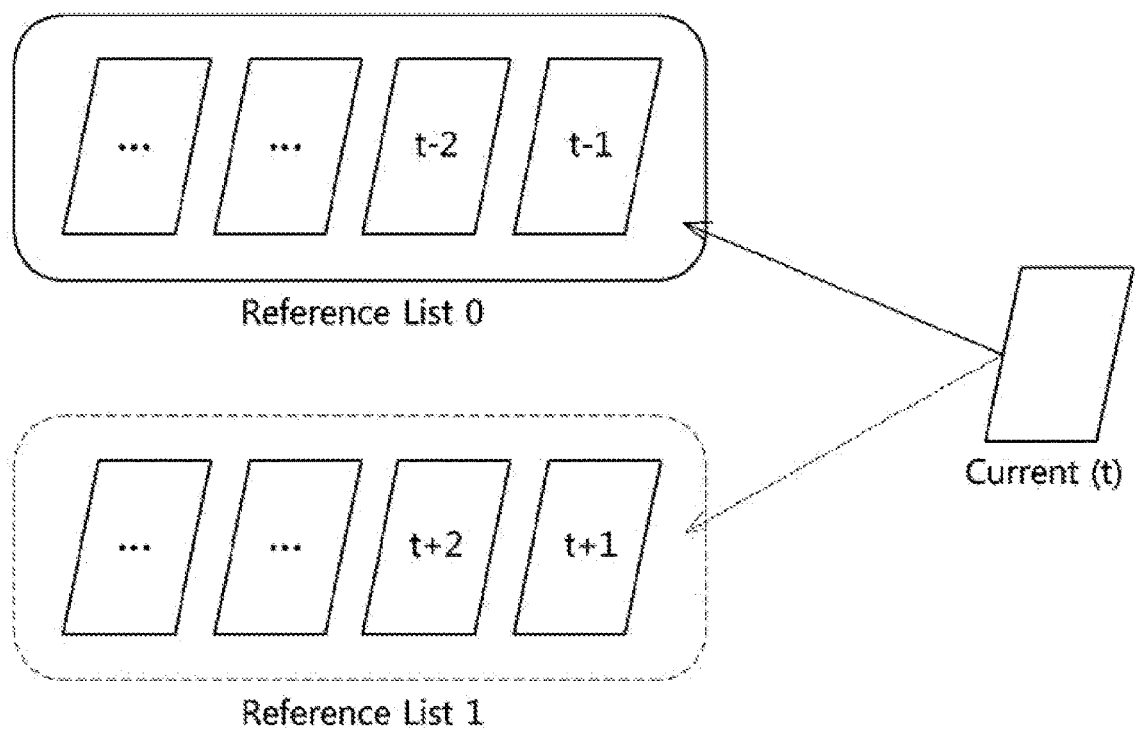
FIG. 7 is an exemplary view illustrating a reference picture list in a method for encoding and decoding an image according to an embodiment of the present invention.
Figure 8:
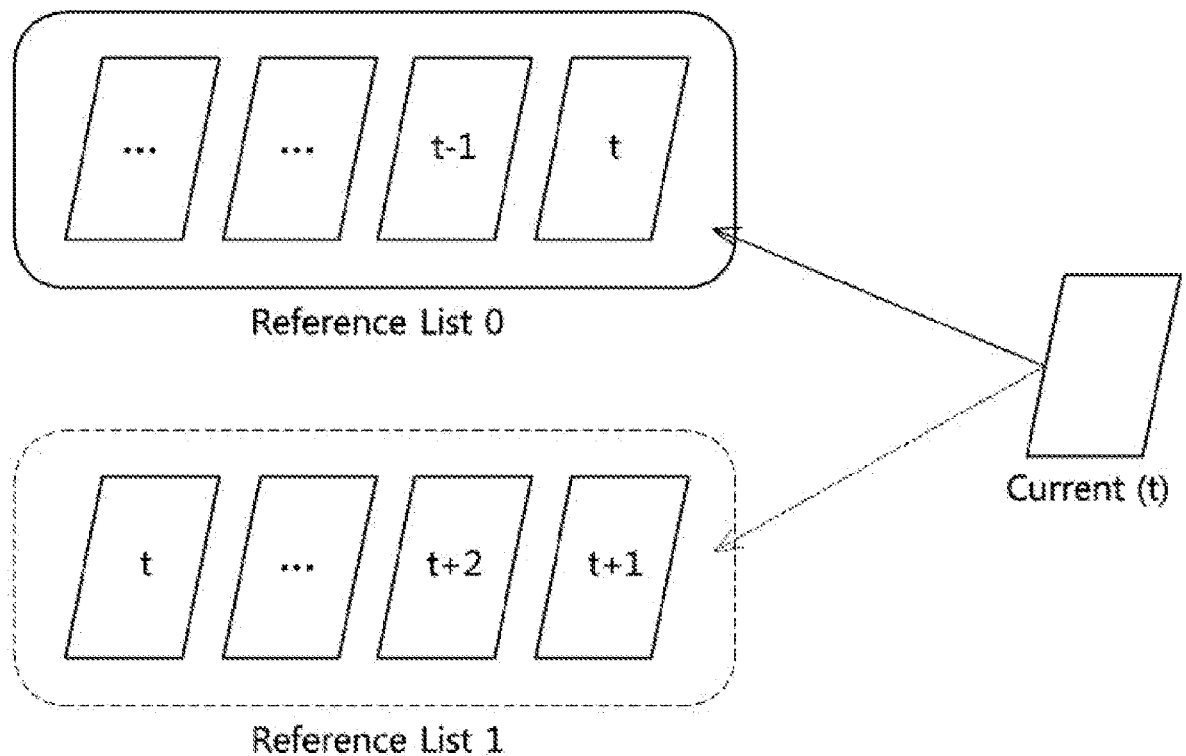
FIG. 8 is an exemplary view illustrating another example of performing inter-prediction from a reference picture list in a method for encoding and decoding an image according to an embodiment of the present invention.

FIG. 7 is an exemplary view illustrating a reference picture list in a method for encoding and decoding an image according to an embodiment of the present invention. FIG. 8 is an exemplary view illustrating another example of performing inter-prediction from a reference picture list in a method for encoding and decoding an image according to an embodiment of the present invention.

Referring to FIG. 7, in the method for encoding an image according to the embodiment, inter-prediction may be performed on the current block of the current picture (current (t)) from a first reference picture list (reference list 0, L0) and a second reference picture list (reference list 1, L1).

Referring to FIGS. 7 and 8, the reference picture list 0 may include a reference picture before the current picture (t). Reference pictures having a first temporal distance (t−1) and a second temporal distance (t−2) before POC of the current picture (t) may be indicated as t−1 and t−2. Also, the reference picture list 1 may include a reference picture after the current picture (t). Reference pictures having a first temporal distance (t+1) and a second temporal distance (t+2) after POC of the current picture (t) may be indicated as t+1 and t+2.

In the above-described example of the reference picture list configuration, the reference picture list is configured with reference pictures having a difference in temporal distance (based on POC in the embodiment) of one, but the difference in temporal distance between reference pictures may be differently configured. That is, an index difference between reference pictures and the temporal distance difference between reference pictures may not be proportional. Also, the list configuration order may not be based on a temporal distance. This will be described in an example of reference picture list configuration described later.

According to the slice type (I, P, or B), prediction may be performed from the reference picture of the list. When generating a prediction block through block matching in the current picture (current (t)), encoding may be performed in the manner of inter-prediction by adding the current picture to the reference picture list (reference list 0 and/or reference list 1).

As shown in FIG. 8, the current picture (t) may be added to the reference picture list 0 (reference list 0) or the current picture (current (t)) may be added to the reference picture list 1 (reference list 1). That is, the reference picture list 0 may be configured by adding a reference picture which is a temporal distance (t) to a reference picture before the current picture (t), and the reference picture list 1 may be configured by adding a reference picture which is a temporal distance (t) to a reference picture after the current picture (t).

For example, when configuring the reference picture list 0, the reference picture before the current picture may be assigned to the reference picture list 0, and then the current picture (t) may be assigned. When configuring the reference picture list 1, the reference picture after the current picture may be assigned to the reference picture list 1, and then the current picture (t) may be assigned. Alternatively, when configuring the reference picture list 0, the current picture (t) may be assigned, and then the reference picture before the current picture may be assigned. When configuring the reference picture list 1, the current picture (t) may be assigned, and then the reference picture after the current picture may be assigned.

Also, when configuring the reference picture list 0, the reference picture before the current picture may be assigned, and then the reference picture after the current picture and the current picture (t) may be assigned. Similarly, when configuring the reference picture list 1, the reference picture after the current picture may be assigned, and then the reference picture before the current picture and the current picture (t) may be assigned. The examples are not limited thereto, and may include a case where conditions are switched, or may be modified.

Whether the current picture is included in each reference picture list (e.g., not added to any list, or only added to the list 0, or only added to the list 1, or added to the lists 0 and 1) may be equally set in the encoder/decoder, and information thereon may be transmitted in units of a sequence, a picture, a slice, etc. Information thereon may be encoded through a method such as fixed-length binarization, truncated unary binarization, truncated binarization, etc.

Unlike the method of FIG. 7, in the method for encoding and decoding an image according to the embodiment, a prediction block is selected by performing block matching in the current picture (t), a reference picture list including information on the prediction block is configured, and the reference picture list is used in encoding and decoding an image.

In configuring the reference picture list, a setting for each list configuration order and rules, and the allowable number of reference pictures of each list may differ, and may be determined according to at least one factor among whether the current picture is included in the list (whether the current picture is included as the reference picture in inter-prediction), the slice type, a list reconfiguration parameter (that may be respectively applied to the lists 0 and 1, or may be applied to the lists 0 and 1 together), the position within GOP (Group of Picture), temporal layer information (temporal id) or a combination thereof. Explicitly, relevant information may be transmitted in units of the sequence, the picture, etc.

For example, in a case of a P-slice, regardless of including the current picture in the list, the reference picture list 0 may follow a list configuration rule A. In a case of a B-slice, the reference picture list 0 including the current picture may follow a list configuration rule B, and the reference picture list 1 may follow a list configuration rule C. The reference picture list 0 that does not include the current picture may follow a list configuration rule D, and the reference picture list 1 may follow a list configuration rule E. Among the list configuration rules, B may be equal to D, and C may be equal to E.

The list configuration rule may be the same as the example of the reference picture list configuration, or may be changed. As another example, when including the current picture in the list, the allowable number of first reference pictures may be set. Otherwise, the allowable number of second reference pictures may be set. The allowable number of first reference pictures may be the same as or different from the allowable number of second reference pictures. The default setting may be that a difference between the allowable number of first reference pictures and the allowable number of second reference pictures is one.

As another example, when the current picture is included in the list and the list reconfiguration parameter is applied, in the slice A, all reference pictures may be included in a list reconfiguration candidate group, and in the slice B, some reference pictures may be included in the list reconfiguration candidate group. Here, the slice A or B may be distinguished based on whether the current picture is included in the list, temporal layer information, the slice type, and the position within GOP. Whether being included in the candidate group may be determined based on POC of the reference picture, or a reference picture index, a reference prediction direction (before/after the current picture), the current picture.

According to the above-described configuration, a reference block encoded in inter-prediction is used in the current picture, and thus inter-prediction is allowed or is used in motion prediction of the I-slice.

Also, when configuring the reference picture list, index assignment or the list configuration order may differ depending on the slice type. In a case of the I-slice, as an example of reference picture list configuration, lower indexes (e.g., idx=0, 1, 2) are used by increasing priority in the current picture (current (t)). Through binarization (fixed-length binarization, truncated unary binarization, truncated binarization, etc.) where the allowable number (C) of reference pictures of the reference picture list is the maximum value, the number of bits used in encoding an image may be reduced.

Also, in a case of a P or B-slice, block matching is performed on the current picture. Probability of selecting the reference picture of the current block as a prediction candidate is lower than probability of selecting another reference picture as a prediction candidate, through various ways of binarization where priority for block matching of the current picture is set low to use a higher index (e.g., idx=C, C-1) and the allowable number of reference pictures of the reference picture list is the maximum value, the number of bits used in encoding an image may be reduced.

Setting the priority of the current picture may be the same as the example of reference picture list configuration or may be configured in a modified manner. Also, according to the slice type (e.g., an I-slice), the reference picture list is not configured, such that information on the reference picture may be omitted. For example, the prediction block is generated through existing inter-prediction, but inter-prediction information may be indicated with motion information of the inter-prediction mode, except for reference picture information.

The method for performing block matching in the current picture may or may not be supported according to the slice type. For example, it is possible to set block matching in the current block to be supported for the I-slice but not the P-slice or the B-slice, without being limited thereto. Also, the method for supporting block matching in the current picture may be determined in units of the picture, the slice, the tile, etc., or the position within GOP, temporal layer information (temporal ID), etc. The setting information may be transmitted in the process of encoding an image, or may be transmitted by the encoder to the decoder in units of a sequence, a picture, a slice, etc.

Also, even though setting information or syntax exists in upper-level units and setting-related operation is on, when the same setting information or syntax exists in lower level units, setting information in lower level units has higher priority than setting information in upper-level units. For example, when the same or similar setting information is processed in the sequence, the picture, and the slice, the picture unit may have priority rather than the sequence unit, and the slice unit may have priority rather than the picture unit. For example, in the sequence parameter, a flag for supporting block matching in the current picture may be sps_curr_pic_BM_enabled_flag. In the picture parameter, a flag for supporting block matching in the current picture may be pps_curr_pic_BM_enabled_flag. When the sps_curr_pic_BM_enabled_flag is on and the pps_curr_pic_BM_enabled_flag is off, block matching in the current picture may not be supported. According to the flag, whether the current picture is included in the reference picture list 0 may be determined, and whether the current picture is included in the reference picture list 1 may be determined.

Figure 9:
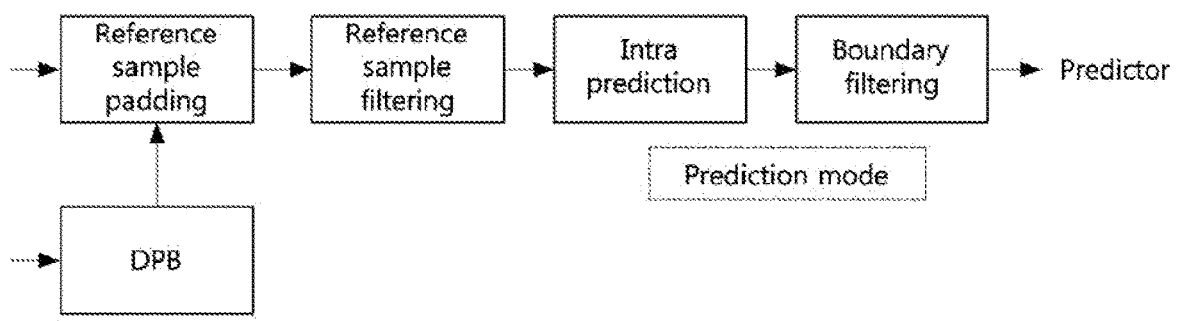
FIG. 9 is an exemplary view illustrating intra-prediction in a method for encoding an image according to an embodiment of the present invention.

FIG. 9 is an exemplary view illustrating intra-prediction in a method for encoding an image according to an embodiment of the present invention.

Referring to FIG. 9, an intra-prediction method according to the embodiment may include a series of reference pixel padding (reference sample padding), reference pixel filtering (reference sample filtering), intra-prediction, and boundary filtering.

The reference pixel padding step may be an example of a reference pixel configuration step, and reference pixel filtering may be executed by the reference pixel filter unit. In intra-prediction, a prediction block generation step and a prediction mode encoding step may be included, and boundary filtering may be an example of a post-filter step.

That is, in intra-prediction executed in the method for encoding an image according to the embodiment, a reference pixel configuration step, a reference pixel filtering step, a prediction block generation step, a prediction mode encoding step, and a post-filtering step may be included. According to various factors, e.g., the size of the block, the shape of the block, the position of the block, the prediction mode, the prediction method, the quantization parameter, etc., one or some of the above-described processes may be omitted, or another process may be added, or the above-described order may be changed.

The reference pixel configuration step, the reference pixel filtering step, the prediction block generation step, the prediction mode encoding step, and the post-filtering step may be executed by a processor coupled to a memory where software modules are stored. Therefore, hereinbelow, for convenience of explanation, as a functional part and/or a component for performing the function of the functional part generated by a combination of a software module implementing the steps and a processor therefor, a reference pixel configuration unit, a reference pixel filter unit, a prediction block generation unit, a prediction mode encoding unit, and a post-filter unit may be referred to as executors of respective steps.

Describing each component in detail, the reference pixel configuration unit configures a reference pixel to be used in prediction of the current block through reference pixel padding. When a reference pixel does not exist or is unavailable, reference pixel padding may be used in the reference pixel through a method of copying values from the adjacent pixel. A reconstructed picture buffer or a decoded picture buffer (DPB) may be used in copying values.

That is, in intra-prediction, prediction is performed by using reference pixels of encoded blocks before the current picture. To this end, at the reference pixel configuration step, adjacent pixels such as neighbor blocks of the current block, i.e., the left, the upper left, the lower left, the upper, the upper right blocks may be used as reference pixels.

However, a candidate group of neighbor blocks for the reference pixel is just an example in consequence of raster scanning or z-scanning as the encoding order of the block. When inverse z-scanning is used as an encoding order scanning method, in addition to the above-described blocks, adjacent pixels such as the right, the lower right, the lower blocks, etc. may be used as reference pixels.

Also, depending on the implementation, additional pixels other than an adjacent pixel may be used in combination of substitute or existing reference pixel according to phased configuration in intra-prediction.

Also, when prediction is performed in an angular mode among intra-prediction modes, reference pixels decimal units may be generated by using reference pixels in integer units through linear interpolation. The mode for performing prediction through a reference pixel existing in the position of integer units may include some modes with vertical, horizontal, 45-degree angle, and 135-degree angle modes. For the above prediction modes, a process of generating reference pixels in decimal units may be unnecessary.

Reference pixels being interpolated in prediction modes having different angularity other than the prediction mode may have interpolation precision of exponentiation of $\frac{1}{2}$ such as $\frac{1}{2}$, $\frac{1}{4}$, $\frac{1}{8}$, $\frac{1}{16}$, $\frac{1}{32}$, and $\frac{1}{64}$, or may have precision of multiples of $\frac{1}{2}$.

Interpolation precision may be determined according to the number of supported prediction modes, the prediction direction of the prediction mode, etc. Fixed interpolation precision may be supported in the picture, the slice, the tile, the block, etc., or adaptive interpolation precision may be supported according to the size of the block, the shape of the block, the prediction direction of the supported mode, etc. Here, based on a particular line (e.g., a positive x-axis on the coordinate plane), the prediction direction of the mode may be indicated as inclination information or angle information of the direction indicated by the mode.

As an interpolation method, linear interpolation may b performed through an adjacent integer pixel, but other interpolation methods may be supported. For interpolation, at least one type of filter and at least one number of taps, e.g., a 6-tap Wiener filter, an 8-tap Kalman filter, etc. may be supported. According to the size of the block, the prediction direction, etc., for which interpolation is performed may be determined. Also, relevant information may be transmitted by the unit of the sequence, the picture, the slice, the block, etc.

The reference pixel filter unit may perform filtering on the reference pixel to enhance prediction efficiency by reducing remaining degradation in the encoding process after configuring the reference pixel. The reference pixel filter unit may implicitly or explicitly determine the type of the filter and whether filtering is applied according to the size of the block, the shape of the block, and the prediction mode. That is, even for filters having the same tap, the filter coefficient may be determined differently depending on the type of the filter. For example, 3-tap filter such as [1,2,1]/4, and [1,6, 1]/8 may be used.

Also, the reference pixel filter unit may determine whether or not an additional bit is transmitted such that whether filtering is applied may be determined. For example, implicitly, the reference pixel filter unit may determine whether filtering is applied according to characteristics (variance, standard deviation, etc.) of pixels in a neighbor reference block.

Also, the reference pixel filter unit may determine whether filtering is applied when a relevant flag satisfies a preset hiding condition of a residual coefficient, an intra-prediction mode, etc. For example, the number of taps of the filter may be set as 3-tap, such as [1,2,1]/4, in a small block (blk), and may be set as 5-tap such as, [2,3,6,3,2]/16, in a large block (blk). The number of applications may be determined based on whether filtering is performed, whether filtering is performed once, whether filtering is performed twice, etc.

Also, the reference pixel filter unit may apply filtering by default to a reference pixel immediately adjacent to the current block. In addition to immediately adjacent reference pixel, additional reference pixels may also be considered in the filtering process. For example, by replacing immediately adjacent reference pixel, filtering may be applied to the additional reference pixels, or filtering may be applied to a combination of immediately adjacent reference pixel and the additional reference pixels.

The filtering may be applied fixedly or adaptively. The filtering may be determined according to at least one factor among the size of the current block, the size of the neighbor block, the coding mode of the current block or the neighbor block, block boundary characteristics of the current block and the neighbor block (e.g., the boundary of the encoding unit or the boundary of the transform unit), the prediction mode or direction of the current block or the neighbor block, the prediction method of the current block or the neighbor block, the quantization parameter, etc. or a combination thereof. The determination may have the same setting of the encoder/decoder (implicit), or may be performed based on encoding costs, etc. (explicit). A default filter is a low pass filter, and the number of filter taps, the filter coefficient, whether a filter flag is encoded, the number of times of filter application, etc. may be determined according to the above-described factors. Information thereon may be set in units of a sequence, a picture, a slice, a block, etc., and the information may be transmitted to the decoder.

In intra-prediction, the prediction block generation unit may generate the prediction block by an extrapolation method through a reference pixel, or by an interpolation method such as DC or planar mode of the reference pixel, or a method of copying the reference pixel.

In the method of copying the reference pixel, one reference pixel may be copied to generate at least one prediction pixel, or at least one reference pixel may be copied to generate at least one prediction pixel. The number of copied reference pixels may be equal to or less than the number of copied prediction pixels.

Also, the prediction method may be classified into a directional prediction method and a non-directional prediction method. Specifically, the directional prediction method may be classified into a linear directional method and a curved directional method. The linear directional method uses an extrapolation method, but a pixel of the prediction block is generated through the reference pixel placed on a prediction direction line. The curved directional method uses an extrapolation method but a pixel of the prediction block is generated through the reference pixel placed on a prediction direction line. Partial prediction direction of pixel units may be changed based on the detailed direction (e.g., edge) of the block.

In the method for encoding and decoding an image according to the embodiment, a linear directional method will be mainly described for a directional prediction mode.

Also, in the directional prediction method, intervals between adjacent prediction modes are equal or unequal, and may be determined according to the size or the shape of the block. For example, when the current block having the size and the shape of M×N is obtained through the block-partitioning unit, intervals between prediction modes may be equal, in a case where M is equal to N. Intervals between prediction modes may be unequal in a case where M is different from N.

As another example, when M is larger than N, modes having vertical directionality may assign dense intervals between prediction modes close to a vertical mode (90°), and may assign wider intervals between prediction modes far from the vertical mode. When N is larger than M, modes having horizontal directionality may assign dense intervals between prediction modes close to a horizontal mode (180°), and may assign wider intervals between prediction modes far from the horizontal mode.

The examples are not limited thereto, and may include a case where conditions are switched, or may be modified. Here, intervals between prediction modes may be calculated based on a numerical value indicating the directionality of each mode, and the directionality of the prediction mode may be numerically expressed by inclination information or angle information of the direction.

Also, in addition to the above-described method, a method of using spatial correlation may be used to generate the prediction block. For example, the reference block may be generated as the prediction block by using the current picture as the reference picture and using an inter-prediction method such as motion search and compensation.

At the prediction block generation step, the prediction block may be generated by using the reference pixel according to the prediction method. That is, according to the prediction method, the prediction block may be generated through a directional prediction method or a non-directional prediction method such as extrapolation, interpolation, copying, and averaging of an existing intra-prediction method. Alternatively, the prediction block may be generated by using an inter-prediction method, or other additional methods.

The intra-prediction method may be supported under the same setting of the encoder/decoder, and may be determined according to the slice type, the size of the block, the shape of the block, etc. The intra-prediction method may be supported according to at least one of the above-mentioned prediction methods or a combination thereof. The intra-prediction mode may be configured according to the supported prediction method. The number of supported intra-prediction modes may be determined according to the prediction method, the slice type, the size of the block, the shape of the block, etc. The relevant information may be set and transmitted in units of a sequence, a picture, a slice, a block, etc.

At the prediction mode encoding step, the mode in which encoding cost according to each prediction mode is optimal may be determined as the prediction mode of the current block in terms of encoding costs.

For example, the prediction mode encoding unit may use a mode of at least one neighbor block to predict the current block mode in order to reduce bits for the prediction mode. The prediction modes may be included in a candidate group of the most probable mode (MPM), which is the same as the candidate block mode, and the modes of adjacent blocks can be included in the candidate group. For example, the candidate group may include prediction modes of blocks that are the upper left, the lower left, the upper, the upper right, etc. of the current block.

The candidate group of the prediction mode may be configured according to at least one factor among the position of the neighbor block, the priority of the neighbor block, the priority of the partition block, the size or shape of the neighbor block, a preset particular mode (in a case of the chroma block), the prediction mode of the luma block, or a combination thereof. Relevant information may be transmitted in units of a sequence, a picture, a slice, a block, etc.

For example, when the current block and the neighbor block are partitioned into at least two blocks, which mode of a block among partitioned blocks is included as a mode prediction candidate of the current block may be determined under the same setting of the encoder/decoder. Also, for example, the block-partitioning unit performs quad-tree-based partitioning on the left block of neighbor blocks of the current block (M×M). When three partition blocks are composed and blocks of M/2×M/2, M/4×M/4, and M/4×M/4 are included from top to bottom direction, a prediction mode of an M/2×M/2 block may be included as a mode prediction candidate of the current block based on the size of the block.

As another example, the block-partitioning unit performs binary-tree-based partitioning on the upper block among the neighbor blocks of the current block (N×N). When three partition blocks are composed and blocks of N/4×N, N/4×N, and N/2×N are included from left to right direction, the prediction mode of the first N/4×N block from the left may be included as a mode prediction candidate of the current block according to a preset order (priority assigned from left to right).

As another example, when the prediction mode of the neighbor block of the current block is a directional prediction mode, the prediction mode adjacent to the prediction direction of the current mode (in terms of inclination information or angle information of mode direction) may be included in a mode prediction candidate group of the current block. Also, the preset mode (planar, DC, vertical, horizontal, etc.) may be preferentially included according to the prediction mode configuration or combination of adjacent blocks.

Also, a prediction mode having a high frequency of occurrence among the prediction modes of adjacent blocks may be preferentially included. The priority means not only a possibility of being included in the mode prediction candidate group of the current block but also a possibility of being allocated a higher priority or index (i.e., higher probability of being allocated with fewer bits in the binarization process) in the candidate group configuration.

As another example, in a case where the maximum number of mode prediction candidate groups of the current block is k, in which the left block is composed of m blocks whose length is smaller than the height of the current block and the upper block is composed of n blocks whose length is shorter than the width of the current block, it is possible to fill the candidate group according to a preset order (left to right, top to bottom) when a sum (m+n) of partition blocks of the neighbor blocks is greater than k. When a sum (m+n) of the partition blocks of the neighbor blocks is greater than the maximum value k of the candidate group, prediction modes of the neighbor blocks (the left block and the upper block) and prediction modes of other neighbor blocks (e.g., the lower left, the upper left, the upper right blocks, etc.) may be included in the mode prediction candidate group of the current block. The examples are not limited thereto, and may include a case where conditions are switched, or may be modified.

As described above, the candidate block for mode prediction of the current block is not limited to a particular block position, and prediction mode information may be utilized from at least one block of blocks positioned on the left, the upper left, the lower left, the upper, and the upper right. As in the above example, the prediction mode candidate group of the current block may be configured in consideration of various factors.

The prediction mode encoding unit may distinguish a candidate group of the most probable mode (MPM) (referred to as a candidate group 1 in the embodiment) from a candidate group of opposite modes (referred to as a candidate group 2 in the embodiment). The process of encoding the prediction mode may differ depending on which candidate group of the candidate groups the prediction mode of the current block belongs to.

The whole prediction modes may be composed of the sum of the prediction modes of the candidate group 1 and the prediction modes of the candidate group 2. The number of prediction modes of the candidate group 1 and the number of prediction modes of the candidate group 2 may be determined according to at least one factor among a total number of prediction modes, the slice type, the size of the block, the shape of the block, or a combination thereof. The same binarization or other binarization may be applied according to the candidate group.

For example, fixed-length binarization may be applied to the candidate group 1, and truncated unary binarization may be applied to the candidate group 2. In the above description, the number of candidate groups is two as an example, but it is possible to extend to a first candidate group of modes having high probability of being the same as the current block mode, a second candidate group of modes having high probability of being the same as the current block mode, and a candidate group of opposite modes, and variations are also allowed.

At the post-filtering step executed by the post-filter unit, considering high correlation between the pixel in the current block and the reference pixel adjacent to the boundary of the current block and the neighbor block, some prediction pixels of the prediction blocks generated in the previous process may be replaced with values generated by filtering at least one prediction pixel and at least one reference pixel adjacent to the boundary. Alternatively, the prediction pixel may be replaced with a value generated by filtering a numerical value of characteristics of reference pixels adjacent to the boundary of the block (e.g., a difference in pixel values, inclination information, etc.). Additional methods other than the above method and having a similar purpose (correcting some prediction pixels of the prediction block through reference pixels) may be added.

In the post-filter unit, the type of the filter and whether filtering is applied may be implicitly or explicitly determined. The encoder/decoder may set a reference pixel used by the post-filter unit, the position and number of current pixels, and the type of the prediction mode. Relevant information may be transmitted in units of a sequence, a picture, a slice, etc.

Also, at the post-filtering step, after generating the prediction block, an additional process such as block boundary filtering may be performed. Also, similar to boundary filtering, considering the characteristics of pixels of neighbor reference blocks, the post-filtering may be performed on the current block reconstructed by acquiring a residual signal and then adding the residual signal obtained through a transform/quantization process, and an inverse process thereof and the prediction signal.

Consequently, the prediction block is selected or obtained through the above-described processes. Information obtained from the processes may include information related to the prediction mode, and may be transmitted to the transform unit 210 for encoding the residual signal after the prediction block is acquired.

Figure 10:
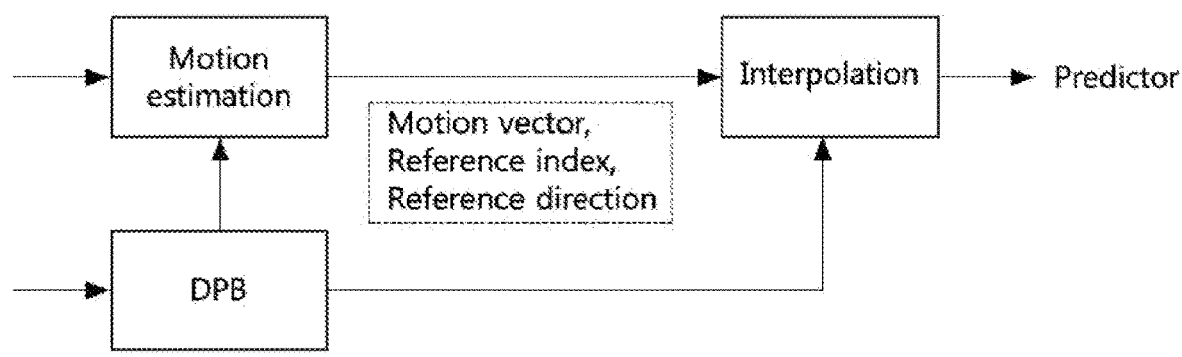
FIG. 10 is an exemplary view illustrating a prediction principle in a P-slice or a B-slice in a method for encoding an image according to an embodiment of the present invention.
Figure 11:
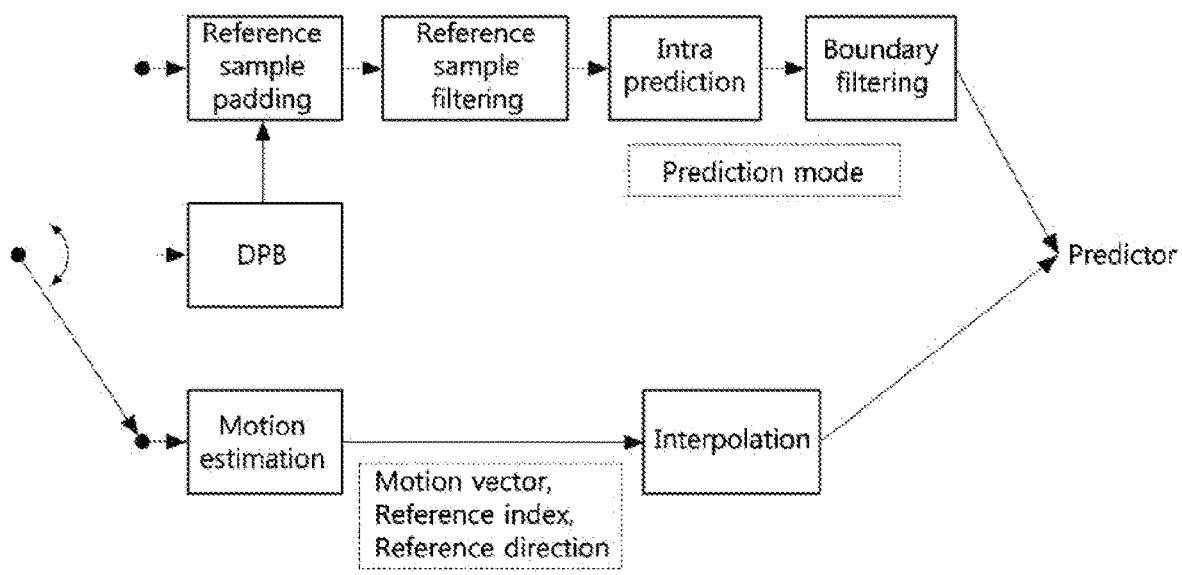
FIG. 11 is an exemplary view illustrating a case of performing interpolation in the method for encoding an image of FIG. 10.

FIG. 10 is an exemplary view illustrating a prediction principle in a P-slice or a B-slice in a method for encoding an image according to an embodiment of the present invention. FIG. 11 is an exemplary view illustrating a case of performing interpolation in the method for encoding an image of FIG. 10.

Referring to FIG. 10, the method for encoding an image according to the embodiment may include motion estimation and interpolation steps. Information on a motion vector, a reference picture index, and a reference direction generated at the motion estimation step may be provided to the interpolation step. At the motion estimation step and the interpolation step, a value stored in the decoded picture buffer (DPB) may be used.

That is, the apparatus for encoding an image may perform motion estimation to find a block similar to the current block in the previous encoded pictures. Also, the apparatus for encoding an image may perform interpolation of the reference picture for precise prediction. Consequently, the apparatus for encoding an image may obtain the prediction block through a predictor, and information on this process may include a motion vector, a reference picture index (a reference picture index or a reference index), a reference direction, etc., and subsequently, residual signal encoding may be performed.

In the embodiment, since intra-prediction is performed on the P-slice or the B-slice, a combination method as shown in FIG. 11 that supports both inter-prediction and intra-prediction may be realized.

As shown in FIG. 11, the method for encoding an image according to the embodiment may include steps of reference pixel padding (reference sample padding), reference pixel filtering (reference sample filtering), intra-prediction, boundary filtering, motion estimation, and interpolation.

When the apparatus for encoding an image supports block matching in the current picture, the prediction method in the I-slice may be realized by the configuration of FIG. 11 not FIG. 9. That is, the apparatus for encoding an image may use the prediction mode in the I-slice as well as information on the motion vector that occurs only in the P-slice or the B-slice, the reference picture index, the reference direction, etc. to generate the prediction block. However, there may be information that can be partially omitted due to the characteristic that the reference picture is current. For example, when the reference picture is the current picture, the reference picture index and the reference direction may be omitted.

Also, in the apparatus for encoding an image, when applying interpolation, since block matching up to the decimal unit may be unnecessary due to characteristics of an artificial image such as a computer graphic, whether or not to perform block matching may be set by the encoder, and may be set in units of a sequence, a picture, a slice, etc.

For example, the apparatus for encoding an image may not perform interpolation on reference pictures used in inter-prediction according to the setting of the encoder, and may not perform interpolation only when block matching is performed in the current picture. That is, the apparatus for encoding an image according to the embodiment may set whether interpolation is performed on reference pictures. Here, whether interpolation is performed on all reference pictures or some reference pictures in the reference picture list may be determined.

For example, the apparatus for encoding an image may not perform interpolation when it is unnecessary to perform block matching in a decimal unit because the characteristic of an image in the reference block is an artificial image, and may perform interpolation when it is necessary to perform block matching in a decimal unit because of an natural image.

Also, the apparatus for encoding an image may set whether block matching is applied to the reference picture on which interpolation is performed in block units. For example, when a natural image and an artificial image are mixed, interpolation may be performed on the reference picture. When an optimal motion vector can be obtained by searching a part of an artificial image, a motion vector can be represented in a predetermined unit (here, an integer unit is assumed). When the optimal motion vector can be obtained by selectively searching a part of a natural image, a motion vector can be expressed in another specific unit (here, ¼ unit is assumed).

FIG. 12 is a view illustrating a main procedure of a method for encoding an image according to an embodiment of the present invention as syntax in a coding unit.

Referring to FIG. 12, curr_pic_BM_enabled_flag means a flag that allows block matching in the current picture, and may be defined and transmitted in units of a sequence and a picture. Here, a process of generating a prediction block by performing block matching on the current picture may mean an operation through inter-prediction. It can be assumed that cu_skip_flag, which is an inter technique that does not encode the residual signal, is a flag that is supported only by the P-slice or the B-slice except for the I-slice. In this case, the I-slice may also support block matching (BM) in the inter-prediction mode when curr_pic_BM_enabled_flag is on.

The method for encoding an image according to the embodiment may support skipping when generating the prediction block through block matching in the current picture, and may support skipping in a case of intra technique other than block matching. Skipping may not be supported in the I-slice depending on conditions. Whether skipping is performed may be determined according to the setting of the encoder.

For example, when skipping is supported in the I-slice, the prediction block can be directly reconstructed as a reconstructed block through block matching without encoding the residual signal by linking with prediction unit( ), which is a prediction unit, through if(cu_skip_flag), which is a particular flag. Also, the apparatus for encoding an image classifies the method of using the prediction block through block matching in the current picture into an inter-prediction technique, and such classification can be processed through a pred_mode_flag, which is a particular flag.

Also, the apparatus for encoding an image according to the embodiment may set the prediction mode as the inter-prediction mode (MODE_INTER) when the pred_mode_f- lag has a value of zero, and may set the prediction mode as the intra-prediction mode (MODE_INTRA) when the pred_mode_flag has a value of one. This is an intra technology similar to the existing one, but it can be classified into an inter technology or an intra technology in the I-slice to be distinguished from the existing structure. That is, the apparatus for encoding an image according to the embodiment may not use temporal correlation in the I-slice, but may use the structure of temporal correlation. The part mode means information on the size and shape of the block being partitioned in the coding unit.

Here, in the sequence parameter, a flag supporting block matching in the current picture may be a sps_curr_pic_BM_enabled_flag, and in the picture parameter, a flag supporting block matching in the current picture may be a pps_curr_pic_BM_enabled_flag. When the sps_curr_pic_BM_enabled_flag is on and the pps_curr_pic_BM_enabled_flag is off, block matching may not be supported in the current picture. According to the flag, whether the current picture is included in the reference picture list 0 may be determined, and whether the current picture is included in the reference picture list 1 may be determined.

Figures 13, 14:
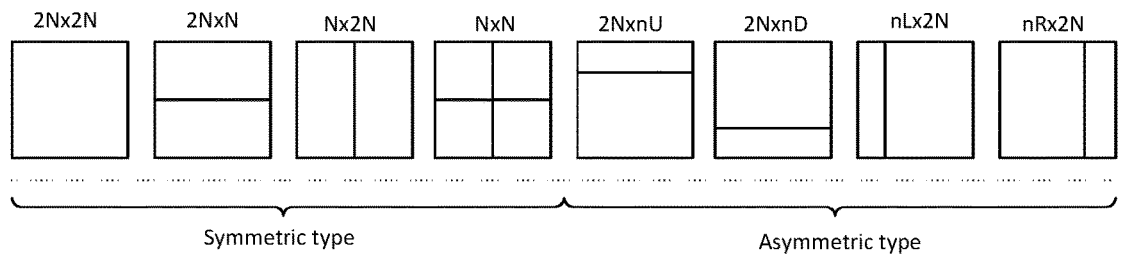
FIG. 13 is an exemplary view illustrating an example of supporting symmetric type-partitioning or asymmetric type-partitioning like in inter-prediction when generating a prediction block through block matching in a current block of FIG. 12.
FIG. 14 is an exemplary view illustrating an example of supporting 2N×2N and N×N in inter-prediction like intra-prediction of FIG. 9.

FIG. 13 is an exemplary view illustrating an example of supporting symmetric type-partitioning or asymmetric-type partitioning like in inter-prediction when generating a prediction block through block matching in a current block of FIG. 12.

Referring to FIG. 13, in the method for encoding an image according to the embodiment, when generating the prediction block through block matching in the current picture, like in inter-prediction, symmetric partitioning, such as 2N×2N, 2N×N, N×2N, and N×N or asymmetric partitioning, such as nL×2N, nR×2N, 2N×nU, and 2N×nD, may be supported.

FIG. 14 is an exemplary view illustrating an example of supporting 2N×2N and N×N in inter-prediction, like intra-prediction of FIG. 9. The size and the shape of the block may be determined according to the partitioning method of the block-partitioning unit.

Referring to FIG. 14, in the method for encoding an image according to the embodiment, 2N×2N and N×N may be supported like the prediction block shape used in an existing intra-prediction. This is an example of supporting a square shape through a quad-tree partitioning method in the block-partitioning unit or a partitioning method of a predefined block candidate group. In intra-prediction, by adding a rectangular shape to a binary-tree partitioning method or a predefined block candidate group, other block shapes may be supported, and setting thereof may be set by the encoder.

Also, in intra-prediction, the encoder may set whether skipping is applied only when performing block matching on the current picture (ref_idx=curr), whether skipping is applied in the existing intra-prediction, and whether skipping is applied in other new intra-prediction. Information thereon may be transmitted in units of a sequence, a picture, a slice, etc.

The subtractor 205 (referring to FIG. 2) subtracts pixel values of the prediction block generated by the prediction unit 200 from a pixel value of the current block to be encoded such that a pixel difference value is derived and a residual block is generated.

The transform unit 210 (referring to FIG. 2) receives from the subtractor 205 the residual block, which is a difference value between the current block and the prediction block generated through intra-prediction or inter-prediction, and transforms the residual block in a frequency domain. Through transform, each pixel of the residual block corresponds to a transform coefficient of the transform block. The size and the shape of the transform block may be equal to or smaller than the coding unit. Also, the size and shape of the transform block may be equal to or less than those of the prediction unit. The apparatus for encoding an image may simultaneously perform transform on several prediction units.

The size or the shape of the transform block may be determined through the block-partitioning unit, and transform of a square shape or a rectangular shape may be supported according to block partitioning. A transform-related setting (supported size, shape, etc. of the transform block) supported in the encoder/decoder may affect block partitioning.

According to the encoding cost for each candidate, the size and the shape of the transform block may be determined, and image data of the determined transform block and partition information on the size and the shape of the determined transform block may be encoded.

Transform may be performed by a one-dimensional transform matrix. For example, each transform matrix may be adaptively used in units of discrete cosine transform (DCT), discrete sine transform (DST), horizontality, and verticality. Adaptive use may be determined based on several factors such as the size of the block, the shape of the block, the type of the block (luma/chroma), the coding mode, prediction mode information, a quantization parameter, coding information of the neighbor block, etc.

For example, in intra-prediction, when the prediction mode is the horizontal mode, a DCT-based transform matrix may be used in a vertical direction and a DST-based transform matrix may be used in a horizontal direction. Also, when the prediction mode is the vertical mode, a DCT-based transform matrix may be used in a horizontal direction and a DST-based transform matrix may be used in a vertical direction.

The transform matrix is not limited to the above description. Information thereon may be determined by using an implicit or explicit method, or may be determined according to at least one factor among the size of the block, the shape of the block, the coding mode, the prediction mode, the quantization parameter, encoding information of the neighbor block, etc. or a combination thereof. Relevant information may be transmitted in units of a sequence, a picture, a slice, a block, etc.

Here, in a case of using the explicit method, when at least two transform matrices for horizontal and vertical directions are the candidate group, information on which transform matrix is used for each direction may be transmitted. Alternatively, which transform matrix is used for horizontal and vertical directions is grouped into a pair, at least two pairs form the candidate group, and information on which transform matrix is used in horizontal and vertical directions may be transmitted.

Also, partial transform or overall transform may be omitted in consideration of the characteristics of an image. For example, one or both of horizontal and vertical components may be omitted. When intra-prediction or inter-prediction is not performed well and the difference between the current block and the prediction block is large, namely, when the residual component is large, encoding loss in transform of the residual component may large. This may be determined according to at least one factor among the coding mode, the prediction mode, the size of the block, the shape of the block, the type of the block (luma/chroma), the quantization parameter, encoding information of the neighbor block, etc. or a combination thereof. It may be indicated by using the implicit or explicit method according to the above condition, and information thereon may be transmitted in units of a sequence, a picture, a slice, etc.

The quantization unit 215 (referring to FIG. 2) may perform quantization on the residual component transformed by the transform unit 210. The quantization parameter may be determined in units of the block, and the quantization parameter may be set in units of a sequence, a picture, a slice, a block, etc.

For example, the quantization unit 215 may predict a current quantization parameter by using one or at least two quantization parameters derived from neighbor blocks such as the left, the upper left, the upper, the upper right, the lower left, etc. of the current block.

Also, when there is no quantization parameter predicted from the neighbor block, namely, when the block is at the boundary of the picture, the slice, etc., the quantization unit 215 may output or transmit a difference value with a default parameter transmitted in units of a sequence, a picture, a slice, etc. When there is a quantization parameter predicted from the neighbor block, a difference value may be transmitted by using the quantization parameter of the block.

The priority of the block for deriving the quantization parameter may be preset, and may be transmitted in units of a sequence, a picture, a slice, etc. The residual block may be quantized through dead zone uniform threshold quantization (DZUTQ), a quantization weighted matrix, or a technique improved therefrom. At least one quantization technique may be set as a candidate, and may be determined based on information on the coding mode, the prediction mode, etc.

For example, the quantization unit 215 may set the quantization weighted matrix to be applied to inter encoding, intra encoding, etc., and may have other weighted matrix based on the intra-prediction mode. The quantization weighted matrix may be configured by having a different quantization coefficient for the position of each frequency component, assuming the size of the block is equal to the size of the quantization block, which is the size of M×N. Also, the quantization unit 215 may select one of several existing quantization methods, or may be used under the same setting of the encoder/decoder. Information thereon may be transmitted in units of a sequence, a picture, a slice, etc.

In the meantime, the inverse quantization units 220 and 315 and the inverse transform units 225 and 320 shown in FIGS. 2 and 3 may be realized by inversely performing the processes of the transform unit 210 and the quantization unit 215. That is, the inverse quantization unit 220 may perform inverse quantization on the quantized transform coefficient generated by the quantization unit 215, and the inverse transform unit 225 may generate a reconstructed residual block by inverse transforming the inversely quantized transform coefficient.

The adders 230 and 324 shown in FIGS. 2 and 3 may add a pixel value of the prediction block generated by the prediction unit to a pixel value of the reconstructed residual block to generate a reconstructed block. The reconstructed block may be stored in the encoded and e decoded picture buffers 240 and 335 to be provided to the prediction unit and the filter unit. The filter unit 235 (referring to FIG. 2) may apply an in-loop filter such as a deblocking filter, a sample adaptive offset (SAO), an adaptive loop filter (ALF), etc. to the reconstructed block. The deblocking filter may perform filtering on the reconstructed block to remove distortion between block boundaries that occurs during encoding and decoding. The SAO is a filter process of reconstructing the difference between an original image and a reconstructed image to offset in pixel units for the residual block. The ALF may perform filtering to minimize the difference between the prediction block and the reconstructed block. The ALF may perform filtering based on a comparison value between the reconstructed block through the deblocking filter and the current block.

The entropy encoder 245 (referring to FIG. 2) may perform entropy encoding on quantized transform coefficients of the quantization unit 215. For example, context-adaptive variable length coding (CAVLC), context-adaptive binary arithmetic coding (CABAC), syntax-based context-adaptive binary arithmetic coding (SBAC), and coding realized by using other coding methods, except probability interval partitioning entropy encoding (PIPE), may be performed.

The entropy encoder 245 may include a bit string where a quantization coefficient is encoded and information required to decode an encoded bit string as encoding data. The encoding data may include the shape of the encoded block, a quantization coefficient, a bit string where the quantization block is encoded, and information required for prediction. In a case of the quantization coefficient, a two-dimensional quantization coefficient may be scanned in one dimension. The distribution of quantization coefficients may differ depending on characteristics of an image. Particularly, in a case of intra-prediction, since the distribution of coefficients may differ depending on the prediction mode, the scanning method may be set differently.

Also, the entropy encoder 245 may be set differently depending on the size of the block to be encoded. A scan pattern may be preset as at least one of various patterns such as zigzag, diagonal, raster, etc., or as a candidate, may be determined according to information on the coding mode, the prediction mode, etc., and may be used with the same settings on the encoder and the decoder. Information thereon may be transmitted in units of a sequence, a picture, a slice, etc.

The size of the quantized block (hereinafter, a quantization block) that is input to the entropy encoder 245 may be equal to or smaller than the size of the transform block. Also, the quantization block may be partitioned into at least two sub-blocks, in which case the scan pattern in the partition block may be set the same as that of the existing quantization block, or may be set differently.

For example, when the scan pattern of the existing quantization block is a zigzag pattern, the zigzag pattern may be applied to all sub-blocks. Alternatively, a zigzag pattern may be applied to a sub-block located at the top left of a block having an average value (DC) component, and a diagonal pattern may be applied the other blocks. This may also be determined according to information on the coding mode, the prediction mode, etc.

Also, the start position of the scan pattern in the entropy encoder 245 basically starts from the top left, but may start from the top right, the bottom right, or the bottom left depending on the characteristics of the image. Information on which of at least two candidate groups is selected may be transmitted in units of a sequence, a picture, a slice, etc. As an encoding technique, an entropy-encoding technique may be used, without being limited thereto.

In the meantime, inverse quantization of the inverse quantization unit 220 and inverse transform of the inverse transform unit 225 shown in FIGS. 2 and 3 may be realized by inversely configuring quantization of the quantization unit 215 and transform of the transform unit 210 and by combining basic filter units 235 and 330 therewith.

Next, interpolation that may be applied to the apparatus for encoding an image according to the present invention will be described as follows.

In order to improve the accuracy of prediction through block matching, interpolation is performed in resolution of decimal units rather than integer units. As the interpolation method, there is DCT-IF (discrete cosine transform-based interpolation filter), etc. DCT-IF technology is used as the interpolation method in HEVC (high-efficiency video coding). For example, a pixel is generated in units of ½ and ¼ between integers, and interpolation is performed on the reference picture. Block matching is performed with reference thereto to generate the prediction block.

TABLE 1

| pixel position | filter coefficients (fi) |
|---|---|
| 0 | 0, 0, 0, 64, 0, 0, 0, 0 |
| ¼ | −1, 4, −10, 58, 17, −5, 1, 0 |
| ½ | −1, 4, −11, 40, 40, −11, 4, −1 |
| ¾ | 0, 1, −5, 17, 58, −10, 4, −1 |

TABLE 2

| pixel position | filter coefficients (fi) |
|---|---|
| 0 | 0, 64, 0, 0 |
| ⅛ | −2, 58, 10, −2 |
| ¼ | −4, 54, 16, −2 |
| ⅜ | −6, 46, 28, −4 |
| ½ | −4, 36, 36−4 |
| ⅝ | −4, 28, 46, −6 |
| ¾ | −2, 16, 54, −4 |
| ⅞ | −2, 10, 58, −2 |

Table 1 and Table 2 respectively show filter coefficients used in the luma component and the chroma component. For the luma component, 8-tap is used, and for the chroma component, DCT-IF of 4-tap is used. For the chroma component, a filter may be applied differently depending on the color format. In a case of 4:2:0 of YCbCr, the filter shown in Table 2 may be applied. In a case of 4:4:4, the filter shown in Table 1 or other filters may be applied rather than shown in Table 2. In a case of 4:2:2, a horizontal 1-D 4-tap filter as shown in Table 2 and a vertical 1-D 8-tap filter as shown in Table 1 may be applied.

FIG. 15 is a view illustrating a process of performing 1-D horizontal filtering on pixels at positions a, b, and c (assuming x) of an image in a method for encoding an image according to an embodiment of the present invention.

As shown in FIG. 15, 1-D horizontal filtering may be applied to sub-pixels at positions a, b, and c (assuming x) between a first pixel (G) and a second pixel (H) adjacent thereto. This is indicated in the following equation.

$$x=(f1*E+f2*F+f3*G+f4*H+f5*I+f6*J+32)/64$$

Next, 1-D vertical filtering may be applied to sub-pixels at positions d, h, and n (assuming y). This is indicated in the following equation.

$$y=(f1*A+f2*C+f3*G+f4*M+f5*R+f6*T+32)/64$$

2D separable filtering may be applied to sub-pixels e, f, g, i, j, k, p, q, and r at the center. For example, in a case of a sub-pixel e, interpolation is performed on the sub-pixel a and on pixels in the vertical direction, and next, interpolation is performed by using the pixels. 1-D horizontal filtering is performed as interpolating the sub-pixel a between G and H, and 1-D vertical filtering is performed on sub-pixels obtained therefrom, whereby the sub-pixel e can be obtained. Similar operation may be performed on the chroma signal.

The above description is only a partial description of interpolation. In addition to the DCT-IF, other filters may also be used, and filter types and the number of taps may differ depending on the decimal units. For example, an 8-tap Kalman filter is applied for ½, a 6-tap Wiener filter is applied for ¼, and a 2-tap linear filter is applied for ⅛ such that a fixed coefficient or a filter coefficient is calculated like the DCT-IF and the filter coefficient may be encoded. As described above, one interpolation filter may be used for a picture, or different interpolation filters may be used for areas depending on characteristics of the image. Alternatively, at least two reference pictures to which several interpolation filters are applied are generated, and one of the at least two reference pictures may be selected.

According to encoding information such as the type of the reference picture, a temporal layer, the state of the reference picture (e.g., whether or not it is the current picture), etc., different filters may be applied. The above-mentioned information may be set and may be transmitted in units of a sequence, a picture, a slice, etc.

Next, before a detailed description of enhanced technology about motion estimation, motion compensation, and motion prediction that may be applied to the method for encoding an image according to the embodiment, the basic meaning of these terms will be defined below.

In motion prediction of the current block to be encoded, motion estimation is a process of partitioning the image frame into small blocks and estimating displacement from which block on an encoded frame (a reference frame) temporally before or after. That is, motion estimation is a process of finding the block most similar to a target block when encoding the current block. Block-based motion estimation is a process of estimating the position to which a video object or a block of a screen processing unit (a macro block, etc.) has temporally moved.

In motion compensation, at least a partial area of a previously encoded reference image is used to encode the current image, and the prediction block of the current block is generated based on motion information (motion vector, reference picture index) for the optimum prediction block obtained in motion estimation to predict the current image. That is, motion compensation is a process of generating an error block as the difference between the current block to be encoded and the reference block identified as the most similar block.

"Motion prediction" means finding a motion vector for motion compensation in encoding. As main techniques for motion prediction, there are skipping, temporal prediction, spatial prediction, etc. Skipping means skipping encoding of the image block, when the motion of the screen is constant and the size of the motion vector predicted by the encoder is zero or the residual is small enough to be ignored. Temporal prediction may be mainly used for inter-prediction, and spatial prediction may be mainly used for intra-prediction.

Information obtained through inter-prediction may include information for identifying the direction of the reference picture list (uni-direction (L0, L1) and bi-directions), an index identifying the reference picture in the reference picture list, a motion vector, etc. Since temporal correlation is used, when characteristics in which the current block and the neighbor block have the same or similar motion vector are utilized, motion information can be effectively encoded.

Figure 16:
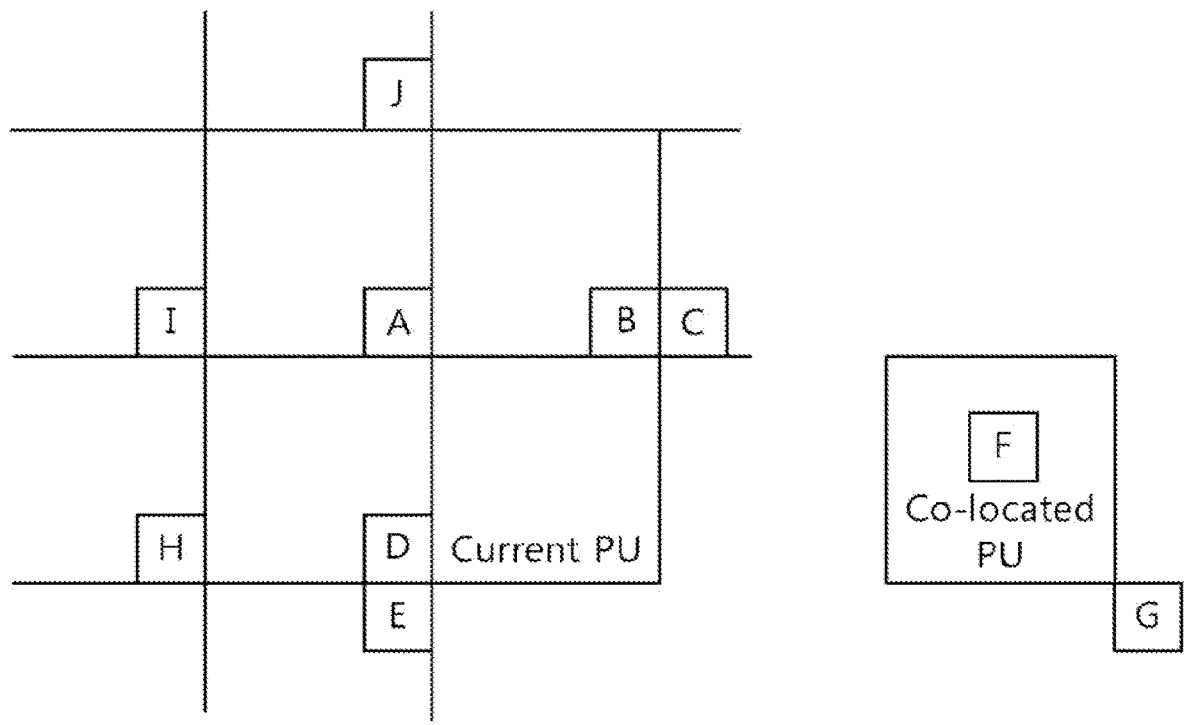
FIG. 16 is an exemplary view illustrating a current block and a neighbor block that may be applied to a method for encoding an image according to an embodiment of the present invention.

FIG. 16 is an exemplary view illustrating a current block and a neighbor block that may be applied to a method for encoding an image according to an embodiment of the present invention.

As shown in FIG. 16, setting of whether or not the candidate group for the neighbor block of the current block is referenced may be determined according to information on the type of the current picture, a temporal identifier (temporal id), etc. and information thereon may be fixed or may be transmitted in units of a sequence, a picture, a slice, etc.

Here, setting of whether or not the candidate group is referenced may include setting where only spatially adjacent blocks (A, B, C, D, E) are used, or spatially adjacent blocks (A, B, C, D, E) and temporally adjacent blocks (H, I, J) are used, or spatially adjacent blocks (A, B, C, D, E) and spatially distant blocks (F, G) are used.

Next, setting that "block matching may be applied to the current picture" will be described as follows.

First, in a case of the I picture, for example, a spatially adjacent block has priority and remaining blocks may be set as a candidate group. For example, availability of reference blocks may be verified in the order of E→D→C→B→A→H→I→J. Availability may be compared to a preset reference value, or may be compared in relation to other availability-checked values. Availability may be determined based on a coding mode of a candidate block, motion information, a position of a candidate block, etc. The motion information may include a motion vector, a reference direction, a reference picture index, etc.

Since the current picture is the I picture, motion information exits only in an embodiment in which the coding mode is inter-prediction (herein, INTER). Therefore, whether it is INTER is checked first, in order of priority. For example, when n is three and E is encoded in INTER, E is excluded from the candidate group and D is checked. When D is encoded in INTER, motion information exists because block matching is performed in the current picture. Based on the motion information, D is added to the candidate group. Then, n is two. Next, the apparatus for encoding an image may check priority again. Consequently, when three final candidates are obtained, searching for the candidate group is stopped.

Availability may be determined based on the coding mode as well as the boundary of the picture, the slice, the tile, etc. In a case of the boundary, availability is checked as unavailable. When determining that the block is the same as or similar to the already filled candidate, the block is excluded from the candidate, and reference pixel configuration unit may check the availability of a subsequent candidate.

Here, INTER is different from existing inter-prediction (inter). That is, the INTER mode of the embodiment uses the structure of inter-prediction (inter) but the prediction block is generated in the current picture, and thus the INTER mode of the embodiment is different from inter-prediction where the prediction block is generated in the reference picture. That is, in the coding mode of the embodiment, a method of block matching in the current picture may be classified into the INTER mode and the intra mode (the same as existing intra).

Hereinafter, motion vector copying (MVC) and motion vector prediction (MVP) will be separately described, since a scaling process may or may not be included.

First, motion vector prediction (MVP) will be described. Case of P-Picture or B-Picture In addition to the above-mentioned candidates (A, B, C, D, E, F, G, H, I, J), temporal candidates (F, G) will be described. In the embodiment, candidates are spatially searched for, are temporally searched for, are searched for by configuring a mixed list, and then a constant candidate is found.

First, the priority of candidates is determined, and availability is checked according to priority. The candidate number (n) of the motion vectors may be set to two, and the priority may be the same as described in the parentheses.

For example, when spatially searching, blocks may be classified as the following groups.

Group 1_1={A, B, C, I, J}, (C→B→A→I→J)
Group 1_2={D, E, H}, (D→E→H)

In the embodiment, the group 1_1 of two groups includes, based on the current block, an immediately upper block, an upper left block, and an upper right block. The group 1_2 includes, based on the current block, a left block adjacent thereto, a left block not adjacent thereto, and a lower left block.

In another embodiment, candidate blocks of motion vectors may be spatially searched for by classifying into three groups. The three groups may be categorized as follows.

Group 1_1={A, B, C}, (C→B→A)
Group 1_2={D, E}, (D→E)
Group 1_3={H, I, J}, (J→I→H)

Among the three groups of the embodiment, the group 1_1 may include, based on the current block, an immediately left block adjacent thereto, a left block adjacent thereto, and an upper right block adjacent thereto. The group 1_2 may include, based on the current block, an immediately left block adjacent thereto, and a block under the immediately left block. The group 1_3 may include blocks not adjacent to the current block, with at least one block interval therebetween.

In another embodiment, candidate blocks of motion vectors may be spatially searched for by classifying into three groups. The three groups may be categorized as follows.

Group 1_1={B}
Group 1_2={D}
Group 1_3={A, C, E}, (E→C→A)

Among the three groups of the embodiment, the group 1_1 may include, based on the current block, a block positioned in a vertical direction. The group 1_2 may include, based on the current block, an adjacent block positioned in a horizontal direction. The group 1_3 may include, based on the current block, remaining adjacent blocks.

As described above, the P-picture or the B-picture has referenceable information such as a reference direction, a reference picture, etc., and thus the candidate group may be set according to the information. Based on the current block, a candidate block having a different reference picture from that of the current block may be included in the candidate group. Alternatively, considering the temporal distance (picture of count (POC)) between the reference picture of the current block and the reference picture of the candidate block, a vector of the block may be scaled and added to the candidate group. Also, a scaled candidate group may be added depending on which picture of the reference picture of the current block. Also, when the temporal distance between the reference picture of the current block and the reference picture of the candidate block exceeds a preset distance, the scaled block may be excluded from the candidate group, and otherwise, the scaled block may be included in the candidate group.

The above-described similarity check is a process of comparing and determining similarity between a motion vector already included in a prediction candidate group and a motion vector to be newly added thereto. By definition, 'true' may be set when x and y components are perfectly matched, or when the difference is in a range of a preset threshold value.

In the embodiment, the condition where the reference picture is the current picture is used as an example, but the condition where the reference picture is not the current picture may also be used. For example, setting such as 'excluding blocks that use pictures farther than the picture indicated by the current block' may be used. In the embodiment, even though the current block is different from the reference picture, the block may be added to the candidate group through scaling.

Mixed List

When bidirectional prediction of the current block is performed and motion information exists in each reference picture of the reference picture lists (L0, L1), availability may be checked according to the preset priority of the candidate group. In this case, depending on the priority, the block encoded in bidirectional prediction is checked first.

When reference pictures are different, scaling is performed. When spatially or temporally searching for candidates, when adding only the bidirectionally predicted blocks to the candidate group, and when the maximum number of candidates is not exceeded, blocks encoded in unidirectional prediction among candidate blocks are added to a preliminary candidate group, and candidates for bidirectional prediction may be generated with a combination of the candidates.

TABLE 3

| Candidiate Index | L0 | L1 | Candidiate Index | L0 | L1 |
|---|---|---|---|---|---|
| 0 | mvA$_1$, ref1 | mvA$_2$, ref0 | 0 | mvA$_1$, ref1 | mvA$_2$, ref0 |
| 1 | mvB$_1$', ref1 | mvB$_2$', ref0 | 1 | mvB$_1$', ref1 | mvB$_2$', ref0 |
| 2 | (mvC, ref0) | | 2 | mvC', ref1 | mvD, ref0 |
| 3 | | (mvD, ref0) | 3 | mvC', ref1 | mvE', ref0 |
| 4 | | (mvE, ref1) | 4 | | |
| (a) | | | (b) | | |

Above all, it is supposed that motion information of bidirectional prediction of the current block is referenced in reference pictures of number 1 in L0 and number 0 in L1. In Table 3(a), motion information of the first candidate block is (mvA$_1$, ref1) and (mvA$_2$, ref0), and motion information of the second candidate block is (mvB$_1$', ref1) and (mvB$_2$', ref0). Here, the apostrophe (') means a scaled vector. After spatial and temporal searching, when the number of candidates is two and n is five, unidirectionally predicted blocks in a previous step may be added to the preliminary candidate group according to the preset priority.

In Table 3(a), the maximum number of candidates has not been found yet, and thus a new candidate may be added by combining scaled unidirectional candidates using remaining motion vectors mvC, mvD, and mvE.

In Table 3(b), motion information of a unidirectionally predicted block is scaled according to the reference picture of the current block. Here, an example of generating a new combination by using unidirectional candidates has been described, but a combination of new candidates may be possible by using motion information of bidirectional reference pictures (L0 and L1). This part is not performed in situations such as unidirectional prediction, etc. Also, when the reference picture of the current block is the current picture, it may not be performed.

Constant Candidate

Through the above process, when the maximum number n (two in the embodiment) of candidates blocks cannot be configured, a constant candidate having preset fixed coordinates may be added. Constant candidates having fixed coordinates such as (0,0), (−a,0), (2*a,0), and (0,−b) may be used, and the number of constant candidates may be set to the maximum number of candidates.

The above-described fixed coordinates may be set, or an average value, a weighted average value, a median value, etc. of at least two motion vectors included in the candidate group up to that point in time may be used to add the constant candidate. When n is 5 and three candidates {(mvA_x, mvA_y), (mvB_x, mvB_y), (mvC_x, mvC_y)} are obtained up to that point in time, in order to find the remaining two candidates, a candidate group including constant candidates having preset priority is generated and a constant candidate may be added according to the priority. The constant candidate group may include constant candidates, e.g., {(mvA_x+mvB_x)/2, (mvA_y+mvB_y)/2), ((mvA_x+mvB_x+mvC_x)/3, (mvA_y+mvB_y+mvC_y)/3), (median (mvA_x, mvB_x, mvC_x), median(mvA_y, mvB_y, mvC_y)), etc.

Also, the constant candidate may be set differently depending on the reference picture of the current block. For example, when the current picture is the reference picture, constant candidates such as (−a, 0), (0, −b), and (−2*a, 0) may be set. When the current picture is not the reference picture, constant candidates such as (0,0), (−a, 0), (average (mvA_x, . . . ), average(mvA_y, . . . )) may be set. Information thereon may be preset in the encoder or the decoder, or may be transmitted in units of a sequence, a picture, a slice, etc.

Hereinbelow, motion vector copying (MVC) will be described in detail.

Explanation for P-Picture or B-Picture

In the embodiment, temporal candidates (F and G) are included. The candidate group may include A, B, C, D, E, F, G, H, I, and J. The search order is not preset, but here, MVC candidates are spatially searched, are temporally searched, and are searched by configuring a mixed list, and then a constant candidate is added.

That is, the above-described part also uses an arbitrarily set search order, but does not use the preset order. Priority is determined and availability is checked according to priority. It is assumed that n is 5 and that the priority is the same as in the parentheses.

Hereinbelow, only differences from the above-described motion vector prediction (MVP) will be described. MVP may provide the following steps without scaling. For spatial candidates, availability may be checked without a scaling process. However, similar to MVC, the type of the reference picture, the distance to the reference picture of the current picture of the current block, etc. may be excluded from the candidate group.

When there is a mixed list, candidates for bidirectional prediction may be generated from a combination of candidates added up to that point in time as shown in Table 4.

TABLE 4

| Candidate Index | L0 | L1 | Candidate Index | L0 | L1 |
|---|---|---|---|---|---|
| 0 | mvA, ref0 | | 0 | mvA, ref0 | |
| 1 | mvB, ref1 | | 1 | mvB, ref1 | |
| 2 | | mvC, ref0 | 2 | | mvC, ref0 |
| 3 | | | 3 | mvA, ref0 | mvC, ref0 |
| 4 | | | 4 | mvB, ref1 | mvC, ref0 |
| (a) | | | (b) | | |

As shown in Table 4(a), a new candidate may be added to a motion vector candidate group by combining a candidate using a reference list L0 and a candidate using a reference list L1. When the preset number of motion vectors, namely five, cannot be found, as shown in Table 4(b), a new candidate may be added by combining a subsequent candidate of the L0 and a candidate using the L1.

Encoding may be performed according to modes such as MVP, MVC, etc. for finding optimal motion information candidates.

In a skip mode, MVC may be used in performing encoding. That is, after processing a skip flag, information on the optimum motion vector candidate may be encoded. When there is one candidate, this process may be omitted. Without encoding a motion vector difference value, encoding may be performed through transform, quantization, etc. on a residual component, which is a difference value between the current block and the prediction block.

When not in the skip mode, whether motion information is processed through MVC with priority is determined. When determining motion information is processed through MVC, information on a candidate group of optimum motion vectors may be encoded. When determining motion information is not processed through MVC, motion information may be processed through MVP. In a case of MVP, information on the optimum motion vector candidate may be encoded. Here, when there is one candidate, processing of the motion information may be omitted. Information on a difference value with the motion vector of the current block, the reference direction, the reference picture index, etc. may be encoded, and a residual component may be obtained, and then transform and quantization may be performed thereon.

Description of codec such as subsequent entropy and post-filtering, etc. will be omitted in order to avoid redundancy.

In the meantime, in the method for encoding or decoding image data, data-level parallelization is a method of partitioning data to be processed in a parallelizing program into several units and allocating the data to different cores or threads so as to perform the same operations in parallel. Theoretically, parallelism is one of important factors for performance because the image-processing speed becomes faster when parallelism is configured, given the performance limits of core or thread.

The data unit of parallel processing may be a frame, a slice, or a block. Hereinbelow, inter-prediction is performed via parallel processing.

Figure 17:
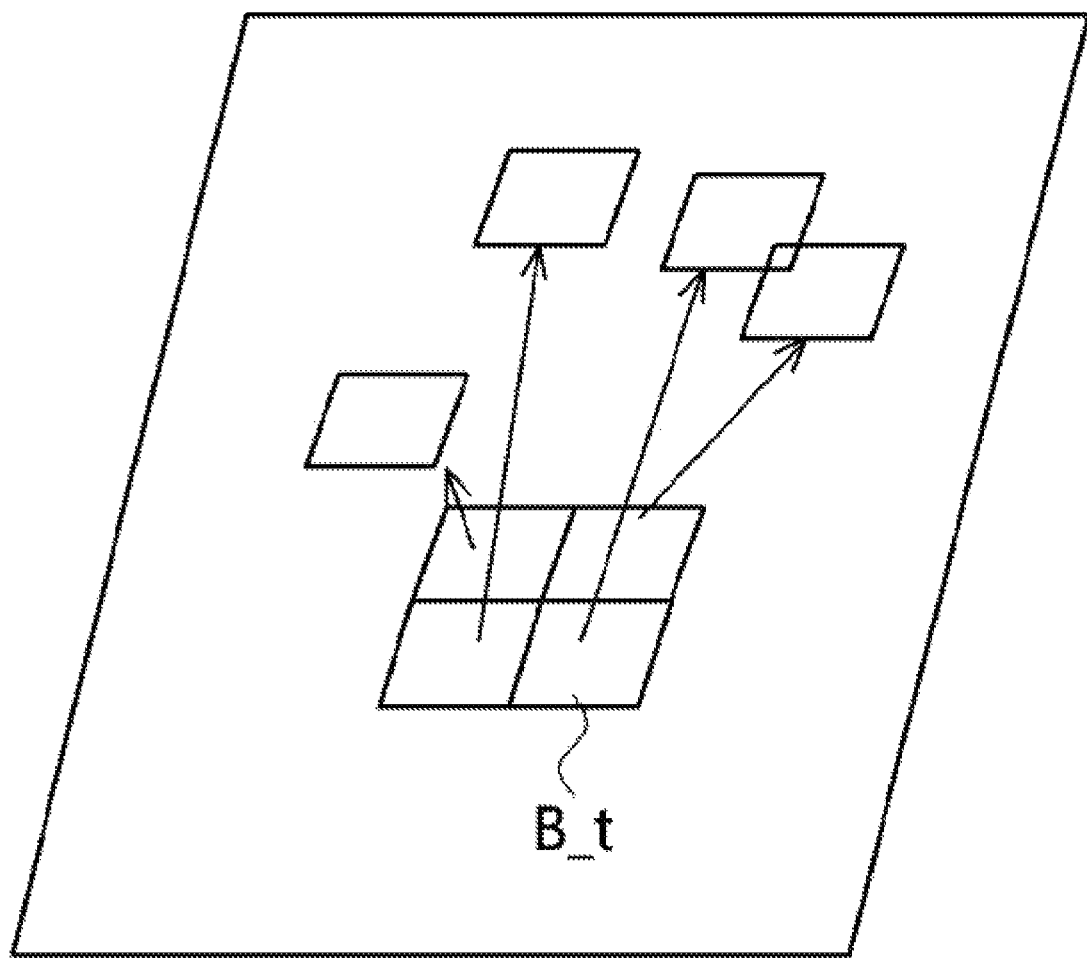
FIG. 17 is an exemplary view illustrating generation of a prediction block through block matching in a current block in a method for encoding an image according to an embodiment of the present invention.
Figure 18:
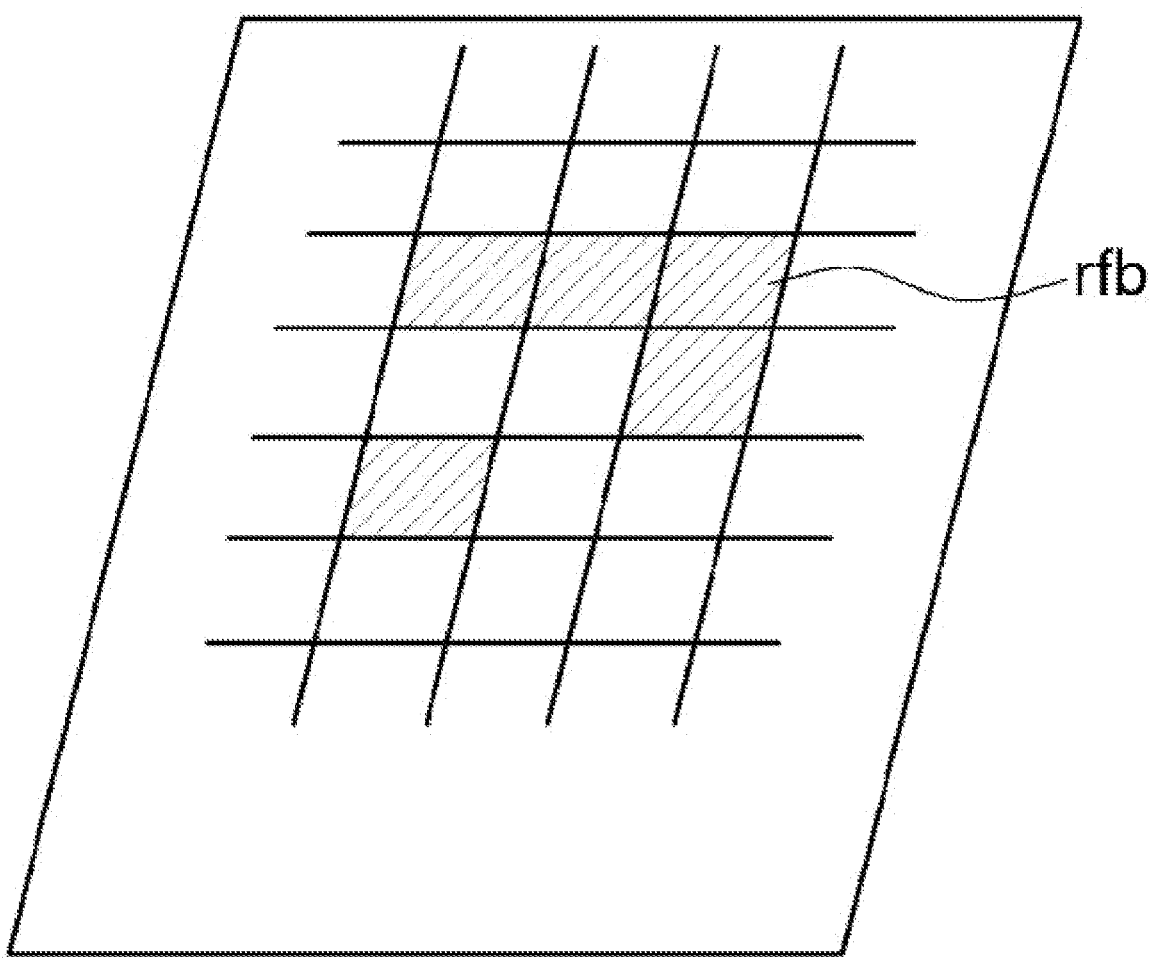
FIG. 18 is an exemplary view illustrating a reference block in an encoded area used as a prediction block through at least one block matching in a method for encoding an image according to an embodiment of the present invention.

FIG. 17 is an exemplary view illustrating the generation of a prediction block through block matching in a current block in a method for encoding an image according to an embodiment of the present invention. FIG. 18 is an exemplary view illustrating a reference block in an encoded area used as a prediction block through at least one block matching in a method for encoding an image according to an embodiment of the present invention.

The embodiment may be applied to a case where encoding is performed through an inter-encoding structure when performing block matching in the current block.

Referring to FIG. 17, four blocks including the block (B_t) at the center are encoding target current blocks, and the arrows indicate reference blocks and indicate a case where reference blocks exist in the current picture.

In FIG. 18, the block (rfb) means a reference block in an encoded area used as a prediction block through at least one block matching.

In a case of an area already encoded before the current block, since it is still before applying an in-loop filter such as a deblocking filter and sample adaptive offset (SAO), block matching in the current picture may cause a problem in terms of parallel processing. Therefore, before applying filtering for block matching, an additional memory may be required. Also, in a case of an already encoded area, since the area is encoded before the in-loop filter is applied, it may be difficult to generate the optimum prediction block due to deterioration between blocks.

According to the embodiment, additional memory may be required when referencing a memory for the current picture in the decoded picture buffer (DPB) and other block in the current picture. Here, the additional memory may be the current picture memory that is different from the existing memory for the current picture, or may be a temporary current picture memory used in an encoding or decoding process. Also, an additional memory with a large capacity may be required for parallel processing.

Also, when the in-loop filter such as the deblocking filter and the SAO is applied, the memory for the current picture may be used, and when the in-loop filter is not applied, an additional memory may be used. Also, the additional memory may not be required in units of the sequence parameter set, the picture parameter set, the slice header, etc. depending on the in-loop filter operation setting. For example, in the in-loop filter operation setting where the deblocking filter is off, the SAO is off, and the ALF is off, the additional memory may not be required, and the in-loop filter may be configured as including some of the above configurations or another configuration.

As described above, the reference block referenced in another block in the current block may be stored in an additional memory. This additionally reduces the amount of available memory and thus, it is necessary to avoid such a reduction. Hereinafter, unnecessary memory consumption prevention through adaptive filtering will be described.

Figure 19:
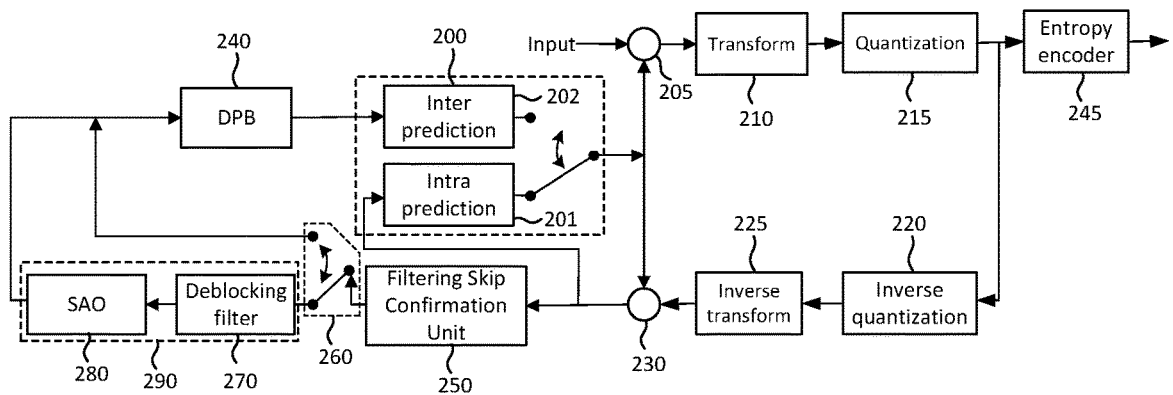
FIG. 19 is a block diagram illustrating an apparatus for encoding an image according to an embodiment of the present invention.

FIG. 19 is a block diagram illustrating an apparatus for encoding an image according to an embodiment of the present invention.

Referring to FIG. 19, the apparatus for encoding an image according to the embodiment may include a prediction unit 200, an adder 205, a transform unit 210, a quantization unit 215, an inverse quantization unit 220, an inverse transform unit 225, a subtractor 230, a decoded picture buffer (DPB) 240, an entropy encoder 245, a filtering skip confirmation unit 250, a skip selection circuit 260, and a filter unit 290.

Here, the prediction unit 200 may include a first prediction means 201 for intra-prediction and a second prediction means 202 for inter-prediction. The first prediction means may be referred to as an intra-prediction unit, and the second prediction means may be referred to as an inter-prediction unit. Also, the adder 205 and the subtractor 230 may be respectively referred to as a first addition and subtraction unit and a second addition and subtraction unit.

Also, the filtering skip confirmation unit 250 is located between the second addition and subtraction unit 230 and the filter unit 290, and the skip selection circuit 260 is located in a space between the filtering skip confirmation unit 250 and the filter unit 290 and a space between the filtering skip confirmation unit 250 and the decoded picture buffer 240. The filtering skip confirmation unit 250 controls the skip selection circuit 260 based on selection information from a filtering skip flag, thereby adaptively performing deblocking filtering.

Also, the filter unit 290 may be referred to as an in-loop filter unit, and may include at least one of a deblocking filter 270, sample adaptive offset (SAO) 280, and an adaptive loop filter (ALF). The filter unit 290 may perform filtering on a reconstructed image.

The deblocking filter 270 will be described in detail as follows. That is, during prediction, transform, quantization, and entropy-encoding processes, quantization error may occur at the quantization step. This is adjusted using a quantization parameter value. When the quantization parameter value is small, densed quantization is performed on a transform coefficient and thus quantization error may be relatively small. When the quantization parameter value is large, quantization error may be relatively large. In order to solve this problem, filtering is performed on a reconstructed picture, and thus image quality deterioration can be reduced. To this end, in the method for encoding an image and the apparatus therefor according to the embodiment, post-filtering or in-loop filtering using the deblocking filter may be applied. The in-loop filter may serve as a basic codec of HEVC.

Referring to FIG. 19, the filtering skip confirmation unit 250 is added. The filtering skip confirmation unit 250 may control the skip selection circuit 260 to apply the filter unit 290 and to select a skip mode based on a flag indicating utilization of a reference block. Accordingly, without additional memory, parallel processing may be performed by using one decoded picture buffer (DPB) 240.

Setting information therefor may be the same in the encoder and the decoder, and may be transmitted in units of a sequence, a picture, a slice, etc. between the encoder and the decoder.

Figure 20:
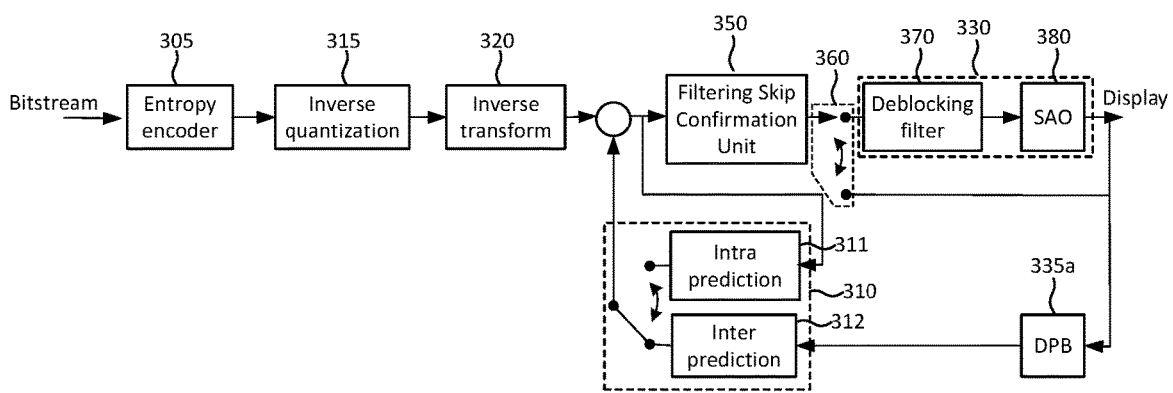
FIG. 20 is a block diagram illustrating an apparatus for decoding an image according to an embodiment of the present invention.

FIG. 20 is a block diagram illustrating an apparatus for decoding an image according to an embodiment of the present invention.

Referring to FIG. 20, the apparatus for decoding an image according to the embodiment may include: an entropy decoder 305, an inverse quantization unit 315, an inverse transform unit 320, the second addition and subtraction unit, a prediction unit 310, a filter unit 330, a decoded picture buffer (DPB) 335a, a filtering skip confirmation unit 350, and a skip selection circuit 360.

Here, the prediction unit 310 may include an intra-prediction unit 311 for intra-prediction and an inter-prediction unit 312 for inter-prediction. The filter unit 330 may include a deblocking filter 370 and a sample adaptive offset (SAO) 380.

The filtering skip confirmation unit 350 is located between the second addition and subtraction unit and the filter unit 330. The skip selection circuit 360 is located in a space between the filtering skip confirmation unit 350 and the filter unit 330 and in a space between the filtering skip confirmation unit 350 and the decoded picture buffer 335a. The filtering skip confirmation unit 350 controls the skip selection circuit 360 based on selection information from a filtering skip flag, there by adaptively performing deblocking filtering on a coding block, a prediction block, or a transform block.

That is, the decoder of the embodiment may indicate, based on the flag transmitted from the encoder, switching operation indicating whether filtering is skipped. When filtering is skipped, data is stored in the DPB 335a, and otherwise, filtering is performed on data and the data is output on a display device, etc. or the data is stored in the DPB 335a. That is, after obtaining a reconstructed picture and filtering the reconstructed picture, the apparatus for decoding an image can output the reconstructed picture to a display device and can store the reconstructed picture in the DPB 335a for use as a reference picture in inter-prediction.

FIGS. 21a to 21d are exemplary views illustrating transmission in block units of various sizes in a method for encoding an image according to an embodiment of the present invention.

Figure 21A:
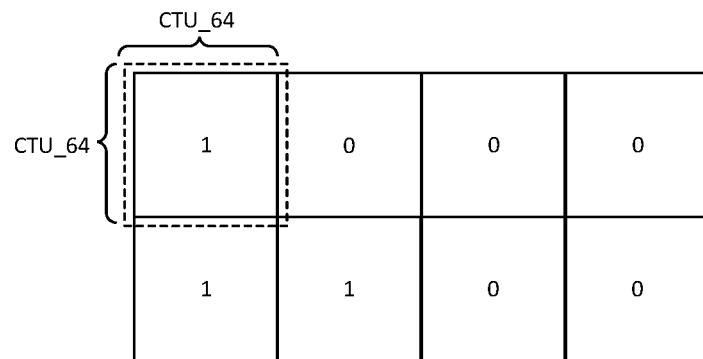

A flag for the above-described filtering may be transmitted in units of variously-sized blocks. For example, as shown in FIG. 21a, when the maximum coding unit is 64×64, the flag may be transmitted to the maximum coding unit. The maximum coding unit may correspond to a coding tree unit (CTU).

Figure 21B:
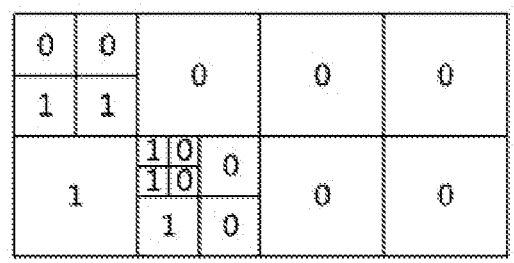

Also, as shown in FIG. 21b, the maximum coding unit may be transmitted in the partitioned coding unit. When generating a flag in partitioned units, tree-based partitioning may be possible. In the embodiment, the maximum coding unit may be partitioned into four sub-coding units, or at least one of the four sub-coding units may be further partitioned into four sub-coding units.

Figure 21C:
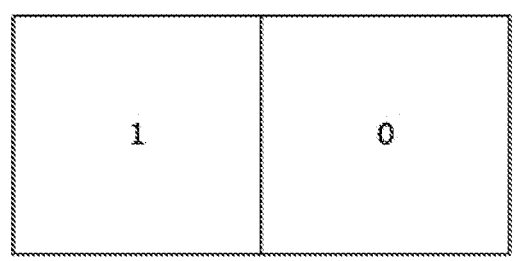

Also, as shown in FIG. 21c, at least one maximum coding unit may be transmitted in bundle units. In the embodiment, four maximum coding units may be transmitted in one bundle unit.

Figure 21D:
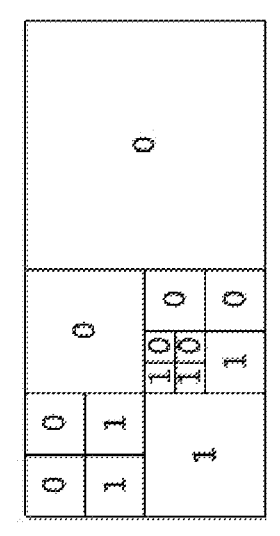

Also, as shown in FIG. 21d, a combination of transmitting at least one maximum coding unit in bundle units and transmitting the maximum coding unit in several sub-coding units may be possible.

In the above case, the partitioning method is quad-tree-based partitioning as an example, but partitioning may be performed in various sizes and shapes of blocks according to the partitioning method for the partitioning unit.

Information on the maximum size of the block and the minimum size of the block may be equally set in the encoder and the decoder, and information thereon may be transmitted in units of a sequence, a picture, a slice, etc.

Figure 22:
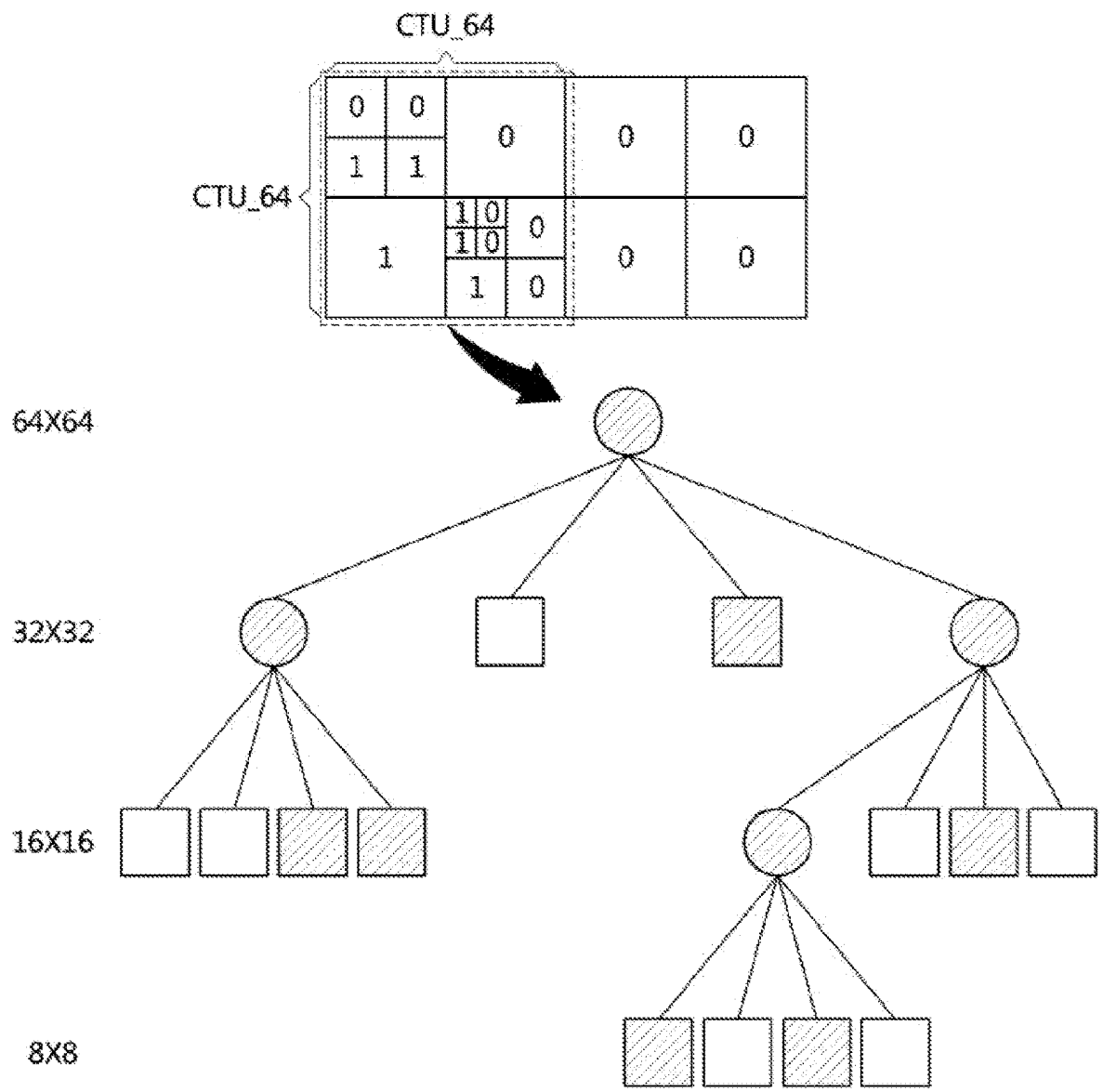
FIG. 22 is an exemplary view illustrating transmission of a flag in a method for encoding an image according to an embodiment of the present invention.

FIG. 22 is an exemplary view illustrating transmission of a flag in a method for encoding an image according to an embodiment of the present invention.

Referring to FIG. 22, in the method for encoding or decoding an image according to the embodiment, a flag for adaptive filtering may be transmitted.

For example, when at least one partition block is referenced, namely, when there is any block to which an in-loop filter is not applied, partitioning is performed. When additional partitioning cannot be performed, an on/off flag for adaptive application of the in-loop filter may be transmitted. The depth for partitioning the block may be determined according to the maximum size of the block, the picture type, etc. However, when the supported depth is zero, partitioning may not be performed. Information thereon may be transmitted in units of a sequence, a picture, a slice, etc. In the embodiment, the maximum size of the block is 64×64, and the depth is supported up to three (8×8). Here, in a case where partition information of the block is transmitted, when the relevant flag has a value of one, it means that the block is partitioned, and when the relevant flag has a value of zero, it means that the block is not partitioned. The partition information may be generated according to a Z scan direction.

First, a flag 1 (64×64 partition) that means partitioning for a 64×64 block (the top of the tree structure) is transmitted, a flag 1 (32×32 partition) for the top left block (32×32) is transmitted, and partition information of four sub-blocks (16×16), which is a flag 0 (16×16 determination), a flag 0 (16×16 determination), a flag 0 (16×16 determination), and a flag 0 (16×16 determination), may be transmitted. Next, a flag 0 (32×32 determination) for the top right block is transmitted, meaning that additional partitioning is not performed, and a flag 0 (32×32 determination) for the bottom left block may be transmitted. A flag 1 (32×32 partition) for the bottom right block (32×32) is transmitted, and a flag 1 for the top left block (16×16) inside is transmitted. In a case of the top left block (16×16), the size (8×8) of a sub-block thereof is equal to the supported depth (8×8), and thus a partition flag is not transmitted for the sub-block (8×8). A flag 0 (16×16 determination), a flag 0 (16×16 determination), and a flag 0 (16×16 determination) for remaining blocks (16×16) may be transmitted. That is, as data indicating whether partitioning is performed, 1100000011000 may be transmitted.

Through the above process, information indicating whether partitioning is performed may be generated, and then information on whether filtering is applied may be generated. Through the above process, flags 0, 0, 1, 1, 0, 1, 1, 0, 1, 0, 0, 1, and 0 for whether filtering is applied to 13 blocks may be transmitted in a Z-scan direction.

A bitstream structure of the partition flag to indicate a flag on partition information of the block may select one of one or more scanning methods. As described above, additional partition information on the block partitioned based on an initial block with Z scanning may be preferentially obtained. Alternatively, there is a Z-scanning-based method following the depth order, in which partition information at the current level depth based on the initial block is obtained, and then partition information at the subsequent level depth is obtained. When using the above method, a flag 1 (64×64 partition), a flag 1 (32×32 partition), a flag 0 (32×32 determination), a flag 0 (32×32 determination), a flag 1 (32×32 partition), a flag 0 (16×16 determination), a flag 0 (16×16 determination), a flag 0 (16×16 determination), a flag 0 (16×16 determination), a flag 1 (16×16 partition), a flag 0 (16×16 determination), a flag 0 (16×16 determination), and a flag 0 (16×16 determination) may be transmitted. That is, as data indicating whether partitioning is performed, 1100100001000 may be transmitted. Other scanning methods not shown in the above examples may be used.

In FIG. 22, the circle may mean the partition flag, the square may mean a filtering application flag, the slash may mean partitioning or filtering is applied, and the colorless may mean partitioning or filtering is not applied.

In the embodiment, deterioration between blocks exists in data of the encoded current picture because the in-loop filter is not applied. The memory for storing the data may be a temporary memory for encoding or decoding the current picture. When deteriorated data is referenced through block matching, accuracy of prediction may decrease due to deterioration between blocks. In this case, before encoding of the block is completed and before proceeding to the subsequent block, filtering for reducing block deterioration is applied at the boundary between the left and the upper of the current block, thereby reducing block deterioration.

Also, the boundary between the right and the lower may be processed in the subsequent block to be encoded. The block boundary to which filtering is to be applied may be determined according to a preset condition such as the type of the block boundary, the minimum size of the block, etc. Filtering may be performed on the boundary of the transform block, may be performed on the boundary of the prediction block, or may be performed on the common block boundary of the transform block and the prediction block. The minimum size of the block where filtering is performed may be set, and information thereon may be generated or transmitted in units of a sequence, a picture, a slice, etc.

Also, by analyzing the characteristics of the block at the block boundary, e.g., the coding mode, block boundary characteristics, prediction information, encoding coefficient, etc., whether filtering is applied, a filtering application pixel, filter type, etc. may be set. Setting information related thereto may be equally set in the encoder and the decoder, and may be transmitted in units of a sequence, a picture, a slice, etc. Filtering used in the above embodiment may use the same configuration as the existing deblocking filter or some other configuration.

Figure 23:
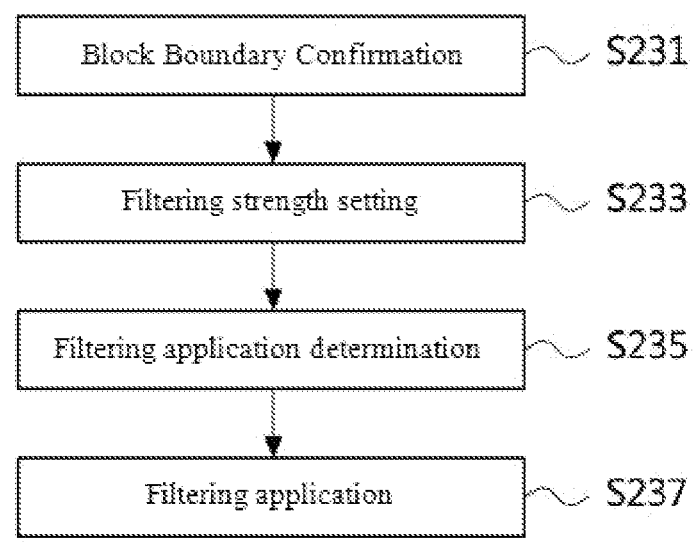
FIG. 23 is a flowchart illustrating a process of filtering in a method for encoding an image and a method for decoding an image according to an embodiment of the present invention.

FIG. 23 is a flowchart illustrating a process of filtering in a method for encoding an image and a method for decoding an image according to an embodiment of the present invention.

Referring to FIG. 23, the method for encoding or decoding an image according to the embodiment may include filtering steps.

That is, filtering steps of the embodiment may include a block boundary confirmation step at S231, a filtering strength set step at S233, a filtering application determination step at S235, and a filtering application step at S237.

The block boundary confirmation step at S231, the filtering strength set step at S233, the filtering application determination step at S235, and the filtering application step at S237 may realized by a memory (referring to reference numeral 18 of FIG. 1) or a processor (referring to reference numeral 14 of FIG. 1). The memory stores programs thereof, program code, or a software module, and the processor coupled to the memory to execute programs.

That is, in the apparatus for encoding or decoding an image according to the embodiment, a filtering controller, which is a processor executing program code stored in an adjacent memory or transmitted from a remote memory or which is a functional or structural part of the processor, may include: a block boundary confirmation unit implementing the block boundary confirmation step at S231; a filtering strength setting unit implementing the filtering strength set step at S233; a filtering application determination unit implementing the filtering application determination step at S235; and a filtering application unit implementing the filtering application step at S237.

Hereinbelow, the above-described filtering steps will be described in detail.

Figure 24:
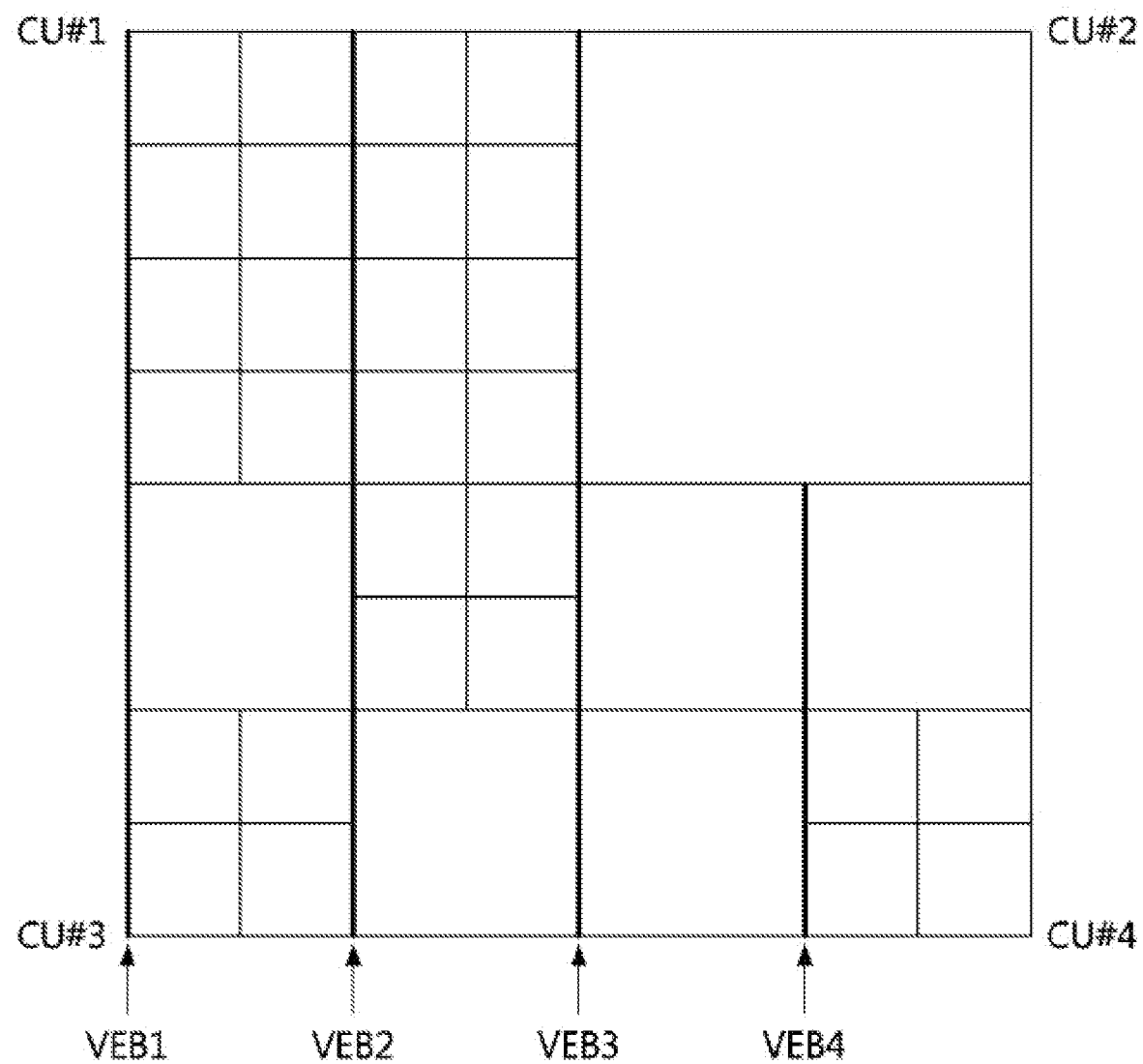
FIG. 24 is an exemplary view illustrating a prediction block or a transform block that may be applied to the method for encoding an image of FIG. 23.

FIG. 24 is an exemplary view illustrating a prediction block or a transform block that may be applied to the method for encoding an image of FIG. 23.

Referring to FIG. 24, in the apparatus for encoding/decoding an image according to the embodiment, the block boundary confirmation unit implementing the block boundary confirmation step at S231 compares a preset condition with the block boundary where filtering is to be applied. When the preset condition is satisfied, filtering may be applied to the boundary, and otherwise, filtering may not be applied. The preset condition may include setting information, such as which block boundary, the minimum size of the block, etc.

Also, the block boundary confirmation unit may perform filtering on the boundary between the blocks where transform is performed or on the boundary between the blocks where prediction is performed. Setting information about whether filtering is performed on the transform block boundary or on the prediction block boundary, or both in parallel, may be set and transmitted in units of a sequence, a picture, a slice, etc.

Also, at the block boundary confirmation step S231, the minimum size of the block (M×N) where filtering is performed may be set. The setting may be transmitted in units of a sequence, a picture, a slice, etc. Through the block-partitioning unit, the block size and shape of the in-loop filter (the deblocking filter in the embodiment) may be determined. Alternatively, the determination may be made depending on the size and shape of another type block. For example, the minimum size of the block may be equal to or greater than the minimum size of the prediction unit or the transform unit. The prediction block or the transform block is provided in a size of 64×64, 32×32, 16×16, 8×8, 4×4, etc., and may be provided in a rectangular shape of M×N.

In FIG. 24, block boundaries (VEB1, VEB2, VEB3, VEB4) indicate vertical-edge boundaries to which filtering is applied. In FIG. 24, block boundaries may further include horizontal-edge boundaries to which filtering is applied. In FIG. 24, when the maximum size of the block is 64×64, the minimum size of the block to which to apply filtering may be 16×16. In this case, the minimum size of the block may be set depending on a color format of the chroma component or the luma component, or for each chroma component.

In FIG. 24, when filtering is applied only to the block boundaries of vertical-edge boundaries, a first coding unit (CU #1) may be a 64×64-size CU (coding unit) partitioned into two 32×64-size prediction units (PUs), a second coding unit (CU #2) may be a 64×64-size CU as one 64×64-size prediction unit (PU), a third coding unit (CU #3) may be a 64×64-size CU partitioned into two 32×64-size prediction units (PUs), and a fourth coding unit (CU #4) may be a 64×64-size CU partitioned into two 32×64-size prediction units (PUs). When filtering is applied to horizontal-edge boundaries, each coding unit may be partitioned into a greater number of prediction units, except for the second coding unit.

FIG. 25 is an exemplary view illustrating a boundary for setting a filtering strength in the method for encoding an image of FIG. 23.

Referring to FIG. 25, in the apparatus for encoding/decoding an image according to the embodiment, the filtering strength setting unit implementing the filtering strength set step at S233 may set which filter is used by analyzing the characteristics of blocks positioned on opposite sides of the block boundary. That is, the filtering strength setting unit may determine filtering strength based on which filter is used.

That is, the filtering strength setting unit may use information used for setting filtering strength, such as the coding mode of the block, block boundary characteristics, prediction information, the encoding coefficient, etc. The block boundary characteristics may include information on whether a boundary between blocks is in the coding unit or the transform unit, and the prediction information may include information on the intra-prediction mode, the motion vector, the reference picture, etc.

Based on the above information, the filtering strength setting unit may determine whether which strength of filtering is applied to the block boundary or filtering is not applied. That is, the filtering strength setting unit may determine filtering strength based on a pixel value, but this is not limiting, and filtering strength may be determined based on information of the block.

When determining filtering strength based on the pixel value, the pixel unit of the boundary at which filtering strength is set may be at least one row or column. Due to block boundary characteristics, it may be determined in proportion to the width and the height of the minimum block to which to apply filtering. Depending on the implementation picture, filtering strength may be set in fixed pixel units in the slice. Information related thereto may be equally set in the encoder and the decoder, and may be transmitted in units of a sequence, a picture, a slice, etc.

In a case of the chroma component, as shown in FIG. 25, boundary strength (BS) or filtering strength may be determined by using encoding information of two opposite blocks (e.g., the P-block and the Q-block) having an intervening block boundary (B5) therebetween. For example, it is possible to reference luma components of pixels of the P-block, i.e., filtering strength at pixels corresponding to elements of a set {p(3,0), p(2,0), p(1,0), p(0,0), p(3,1), p(2,1), p(1,1), p(0,1), p(3,2), p(2,2), p(1,2), p(0,2), p(3,3), p(2,3), p(1,3), and p(0,3)}. Also, it is possible to reference luma components of pixels of the Q-block, i.e., filtering strength at pixels corresponding to elements of a set {q(3,0), q(2,0), q(1,0), q(0,0), q(3,1), q(2,1), q(1,1), q(3,2), q(2,2), q(1,2), q(0,2), q(3,3), q(2,3), q(1,3), and q(0,3)}.

For example, when the sizes of two blocks are equal to or greater than a preset size, the luma component is referenced, and otherwise, the chroma component is referenced to set filtering strength. In a case of the chroma component, the type and the number of supported filtering may be the same as or different from those of the luma component. For example, in the luma component, filtering is applied with strength of zero, one, and two, and in the chroma component, filtering is applied with strength of zero and one.

Figure 26:
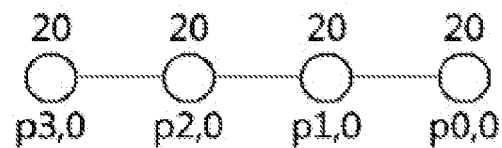
FIGS. 26a to 26c are exemplary views illustrating patterns of pixel values within an image in the method for encoding an image of FIG. 25.
Figure 26:
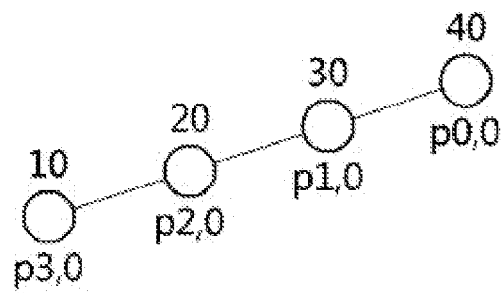
Figure 26:
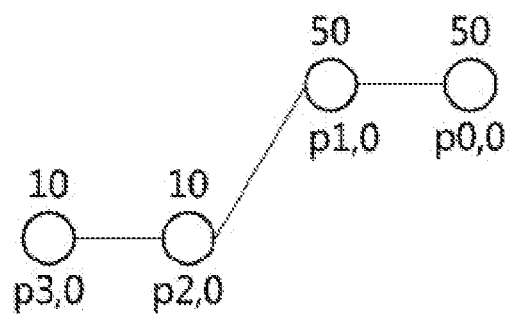

FIGS. 26a to 26c are exemplary views illustrating patterns of pixel values within an image in the method for encoding an image of FIG. 25.

In the apparatus for encoding/decoding an image according to the embodiment, after determining primary filtering strength based on information of two blocks (referring to blocks on opposite sides of the block boundary B5 of FIG. 25) by the filtering strength setting unit, the filtering application determination unit may determine, based on a reconstructed pixel at the block boundary, whether filtering strength obtained by the filtering strength setting unit is applied.

As shown in FIGS. 26a and 26b, when there is change or no change between adjacent pixels, change between adjacent pixels is linear, and thus filtering is applied to reduce quantization error.

In the meantime, as shown in FIG. 26c, in the case of a step edge shape between adjacent pixels (p2, 0 and p1, 0), filtering may distort the actual edge, and thus filtering may hinder coding efficiency. Therefore, in the embodiment, whether filtering is applied or filtering application pixel may be determined by checking a change amount with respect to the pixels at the boundary of two blocks.

Figure 27:
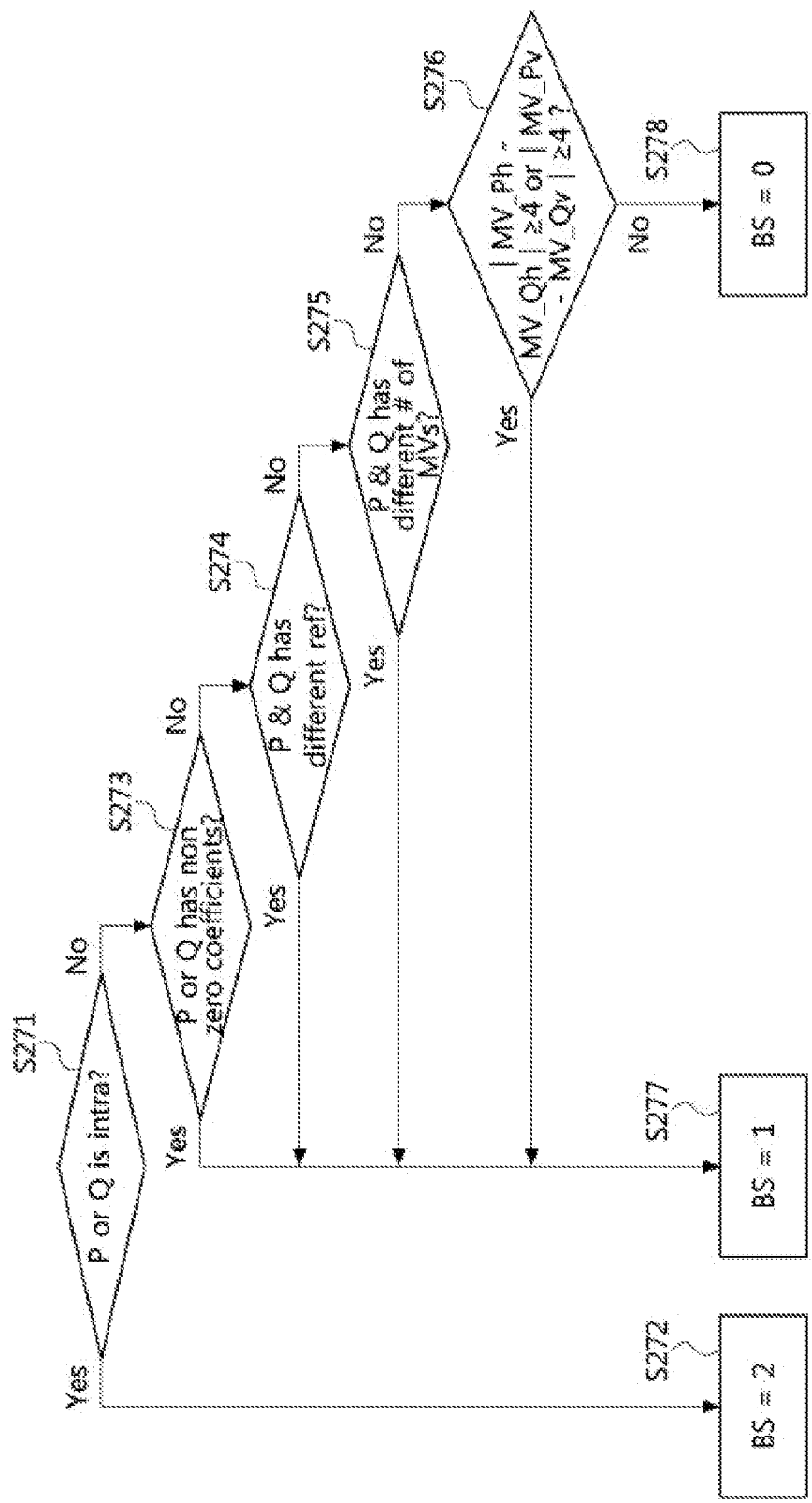
FIG. 27 is a flowchart illustrating a filtering strength setting process in the method for encoding an image of FIG. 23.

FIG. 27 is a flowchart illustrating a filtering strength setting process in the method for encoding/decoding an image of FIG. 23.

In the method for encoding/decoding an image according to the embodiment, it is assumed that filtering strength is set for the vertical boundary. Filtering strength is assumed to range from zero to two.

Referring to FIG. 27, in the apparatus for encoding/decoding an image implementing the method for encoding/decoding an image according to the embodiment, the filtering controller may determine whether either of two blocks is intra-encoded at step S271. When the result of the determination is 'yes', boundary strength (BS) or filtering strength may be set to two at step S272. Here, when filtering strength has high number, it means strong filtering strength.

As the result of the determination at step S271, when two blocks are inter-encoded, the filtering controller compares encoding coefficients of two blocks to determine filtering strength. That is, the filtering controller may determine whether one block (P or Q) has at least one non-zero coefficients to be encoded at step S273. When the result of the determination is 'yes', the filtering controller may set boundary strength (BS), i.e., filtering strength to one at step S277.

In the meantime, as the result of the determination at step S273, when two blocks do not have coefficients to be encoded, the filtering controller may determine whether reference pictures (reference or ref) are the same or different from each other at step S274. When the result of the determination is 'yes', the filtering controller may set boundary strength (BS), i.e., filtering strength to one at step S277.

In the meantime, as the result of the determination at step S274, when two blocks do not have different reference pictures, the filtering controller may determine whether the numbers of motion vectors of the two blocks are different from each other at step S275. When the result of the determination is 'yes', the filtering controller may set boundary strength (BS), i.e., filtering strength to one at step S277.

In the meantime, as the result of the determination at step S275, when the numbers of motion vectors of the two blocks are the same, the filtering controller may determine whether or not a difference in x and y components between motion vectors is equal to greater than a preset level at step S276. When the result of the determination is 'yes', the filtering controller may set boundary strength (BS), i.e., filtering strength to one at step S277. Assuming motion vector precision is ¼, number 4 in units of ¼ may correspond to 1 in integer units. Accordingly, depending on precision of the motion vector, boundary strength or boundary value may differ. For example, when motion vector precision of one of two blocks is integer and motion vector precision of the other block is ¼, the step S276 may be performed by changing precision of the motion vector of the block having integer units to ¼. Alternatively, when motion vector precision of one of two blocks is ¼ and motion vector precision of the other block is ⅛, a difference value setting of x and y components at the step S276 may be changed from four to eight. Alternatively, when motion vector precision of two blocks is integer, the step S276 may be performed by changing motion vector precision of two blocks into ¼.

In the meantime, when the result of the determination at step S276 is 'no', the filtering controller may determine two blocks have high similarity and may set boundary strength (BS) or filtering strength to zero. Here, filtering strength of 0 may mean that filtering is not performed.

In the embodiment, a series of steps S271 to S278 may be modified. For example, determining whether another reference picture is used at step S274 may be omitted by performing scaling according to a distance of the reference picture. The determination of the difference between the numbers of motion vectors at step S275 may be modified according to image characteristics. Also, different from the step S273, even though encoding coefficients of two blocks have non-zero coefficient, the comparison or determination can be made under the same condition as a case where a frequency coefficient is located in a particular portion of a frequency band and is equal or less than a preset level. Here, the case of being located in the particular portion of the frequency band may include: a case of being located at the upper left of a low-frequency component including a DC (direct current) component in an N×N frequency block; and a case where non-zero coefficients occur at locations such as <0,0>, <1,0>, and <0,1> and do not occur at other locations, and modification thereof is also possible.

Figure 28:
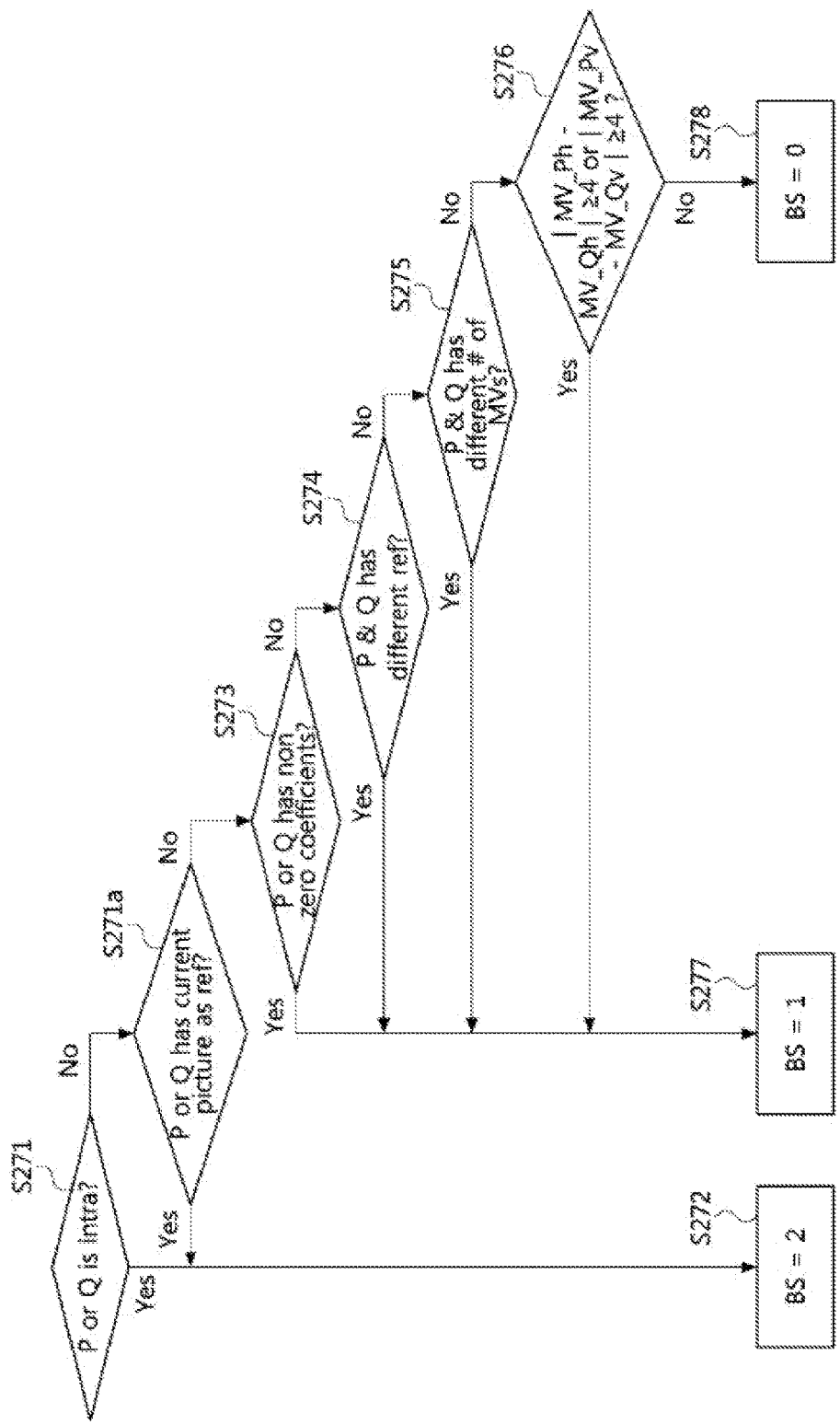
FIG. 28 is a flowchart illustrating another example of a filtering strength setting process in the method for encoding an image of FIG. 23.

FIG. 28 is a flowchart illustrating another example of a filtering strength setting process in the method for encoding an image of FIG. 23.

The embodiment is an example where a current picture is included as a reference picture and an inter-encoding method is used, compared to the embodiment of FIG. 27. A description of parts overlapping the embodiment of FIG. 27 will be omitted.

Referring to FIG. 28, the filtering controller may determine whether any one of two blocks (P and Q) is intra-encoded at step S271. When the result of the determination is 'yes', boundary strength (BS) or filtering strength nay be set to two. When the result is 'no', whether or not any one of two blocks uses the reference picture as the current picture may be determined at step S271a.

When the result of the determination at step S271a is 'yes', the filtering controller may set boundary strength (BS) to two. In the meantime, when the result is 'no', the filtering controller may determine whether one block (P or Q) has at least one non-zero coefficients to be encoded at step S273. When the result of the determination at step S273 is 'yes', the filtering controller may set boundary strength (BS) to two. When the result of the determination at step S273 is 'no', the filtering controller may execute the steps S274 to S278 of FIG. 27 in that order.

As described above, in the method for encoding/decoding an image according to the embodiment, filtering strength may differ according to that the reference picture of the block is which picture. In the meantime, in the embodiment, when two blocks are inter-encoded, whether one block uses the current picture as the reference picture may be determined, but the present invention is not limited thereto and modifications are possible.

Figure 29:
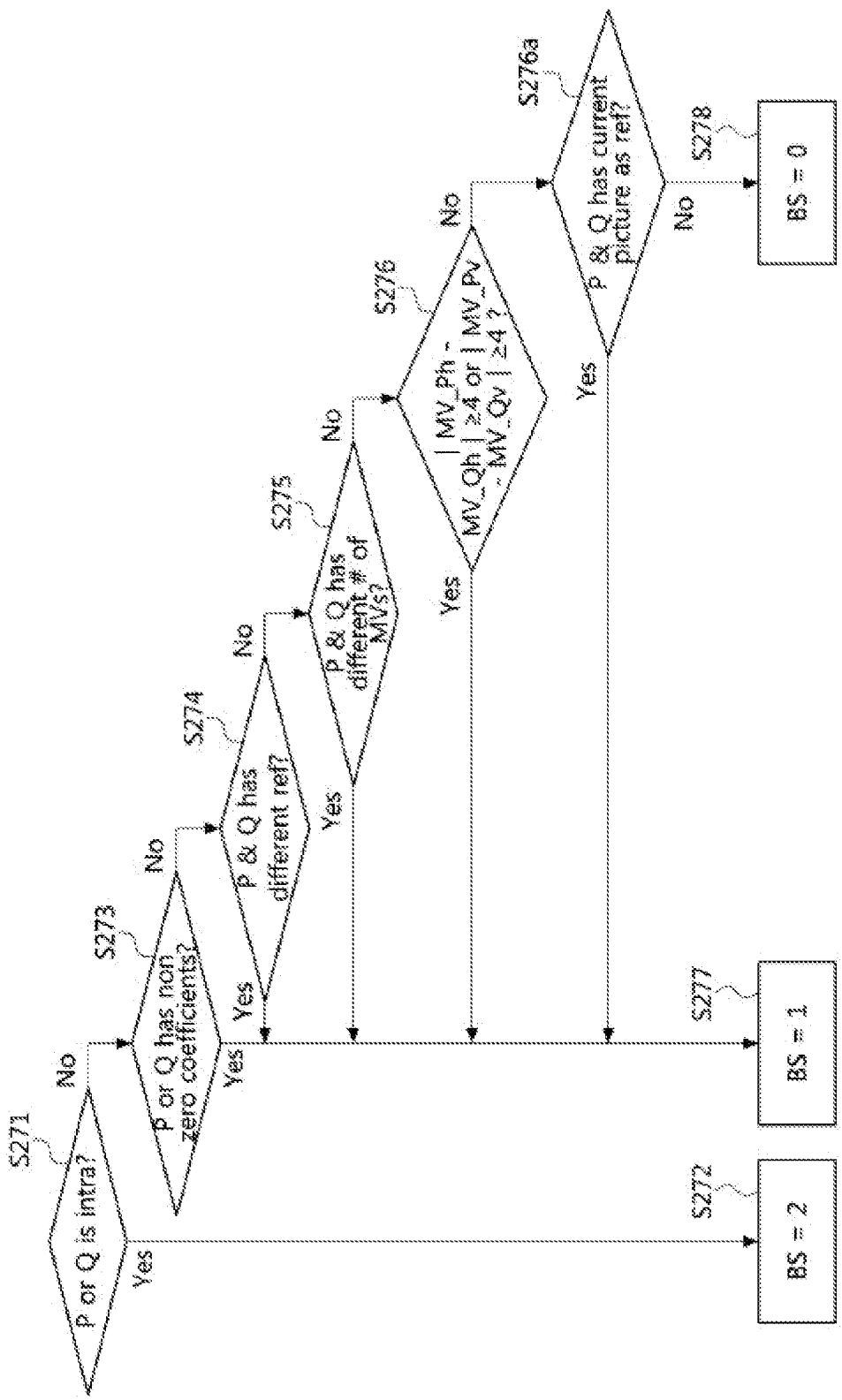
FIG. 29 is a flowchart illustrating still another example of a filtering strength setting process in the method for encoding an image of FIG. 23.

FIG. 29 is a flowchart illustrating still another example of a filtering strength setting process in the method for encoding/decoding an image of FIG. 23.

Referring to FIG. 29, in the apparatus for encoding/decoding an image implementing the method for encoding/decoding an image according to the embodiment, when two blocks have current pictures as reference pictures, the filtering controller may set boundary strength (BS) or filtering strength to one at step S276a.

The filtering process of the embodiment may be substantially equal to the embodiment of FIG. 27, except that determining whether two blocks (P and Q) uses current pictures as reference picture (ref) at step S276a is performed, after whether the difference in x and y components between motion vectors is equal to or greater than a preset level in at least one of two blocks is determined at step S276 and the result thereof is 'no'.

Figure 30:
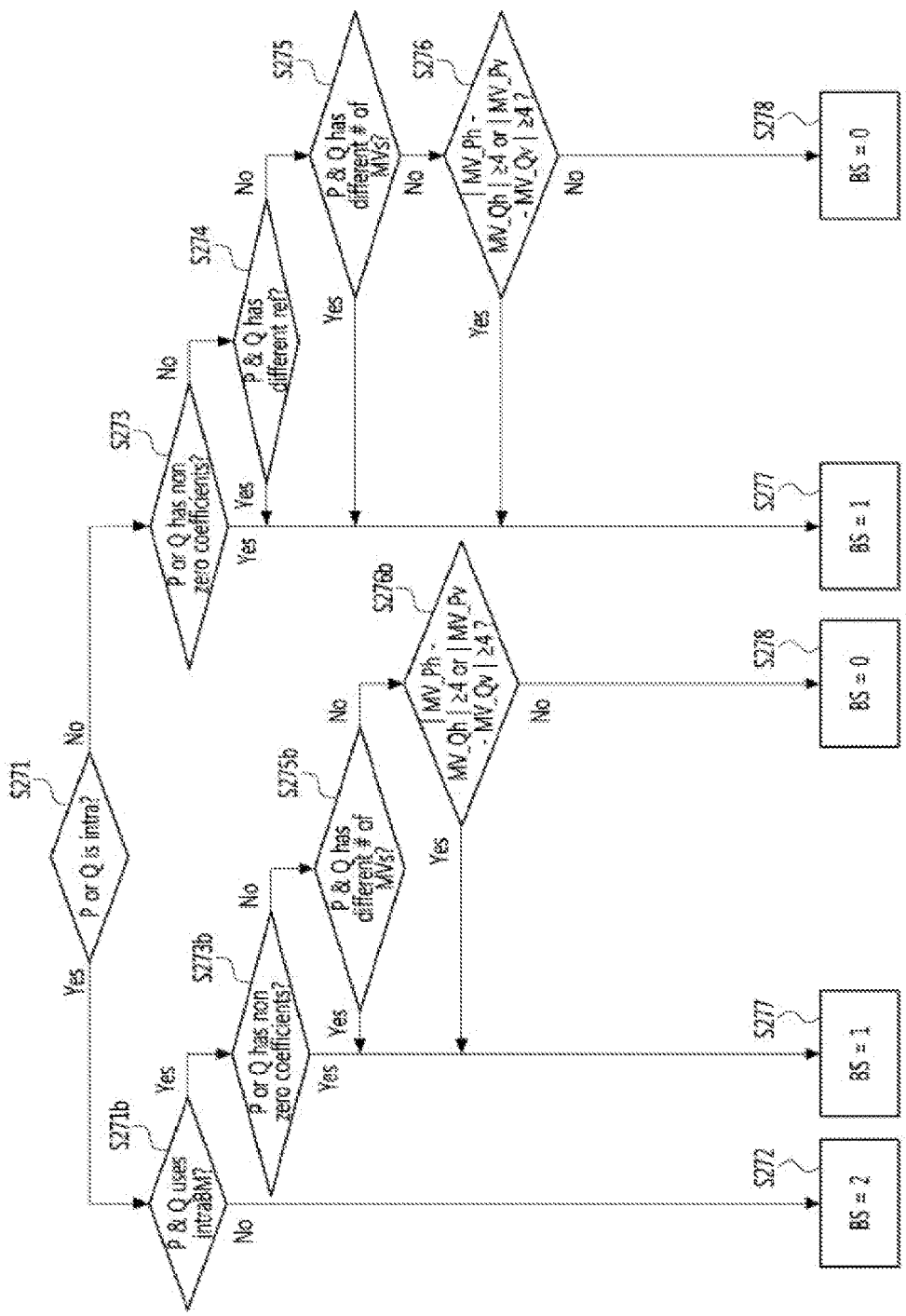
FIG. 30 is a flowchart illustrating yet still another example of a filtering strength setting process in the method for encoding an image of FIG. 23.

FIG. 30 is a flowchart illustrating yet still another example of a filtering strength setting process in the method for encoding/decoding an image of FIG. 23.

The embodiment is an example where a current picture is included as a reference picture and an intra-encoding method is used.

Referring to FIG. 30, in the apparatus for encoding/decoding an image implementing the method for encoding/decoding an image according to the embodiment, the filtering controller may determine whether either of two blocks is intra-encoded at step S271.

When the result of the determination at step S271 is 'no', the filtering controller may determine whether one block (P or Q) has at least one non-zero coefficient at step S273. When the result of the determination at step S273 is 'no', the filtering controller may determine whether reference pictures (reference or ref) are the same or different from each other at step S274. When the result of the determination at step S274 is 'no', the filtering controller may determine whether the numbers of motion vectors of the two blocks are different from each other at step S275. When the result of the determination at step S275 is 'no', the filtering controller may determine whether or not a difference in x and y components between motion vectors is equal to greater than a preset level at step S276. When the result of the determination at step S276 is 'no', the filtering controller may determine that two blocks have high similarity and may set boundary strength (BS) or filtering strength to zero at step S278. In the meantime, when the results of the determination at steps S273, S274, S275, and S276 are 'yes', the filtering controller may set boundary strength (BS), i.e., filtering strength to one at step S277.

In the meantime, when the result of the determination at step S271 is 'yes', the filtering controller may determine whether two blocks (P and Q) perform intra-block matching (intraMB) at step S271b. When the result of the determination at step S271b is 'no', the filtering controller may set boundary strength (BS) or filtering strength to two at step S272.

In the meantime, when the result of the determination at step S271b is 'yes', the filtering controller may determine whether one block (P or Q) has at least one non-zero coefficient to be encoded at step S273b. When the result of the determination at step S273b is 'no', the filtering controller may determine whether the numbers of motion vectors of the two blocks are different from each other at step S275b. When the result of the determination at step S275b is 'no', the filtering controller may determine whether or not a difference in x and y components between motion vectors is equal to greater than a preset level at step S276b. When the result of the determination at step S276b is 'no', the filtering controller may determine that the two blocks have high similarity and may set boundary strength (BS) or filtering strength to zero at step S278. When results of the determination of the steps S273b, S275b, and S276b are 'yes', the filtering controller may set boundary strength (BS), i.e., filtering strength to one at step S277.

According to the embodiment, when any one of two blocks is intra-encoded and two blocks are not encoded through block matching in the current picture, filtering strength may be set to two. Also, when two blocks are encoded through block matching in the current picture and any one of two blocks has a non-zero coefficient to be encoded, filtering strength is set to one. Also, when two blocks do not have a coefficient to be encoded and the number of motion vectors of the two blocks are different from each other, filtering strength may be set to one. Also, when the numbers of motion vectors of the two blocks are the same and the difference in x and y components of each motion vector is equal to or greater than a preset level, filtering strength may be set to one. When the difference is less than the preset level, the similarity between the two blocks is high and filtering strength is set to zero. That is, in the embodiment, filtering strength may be set differently depending on which reference picture is used.

Figure 31:
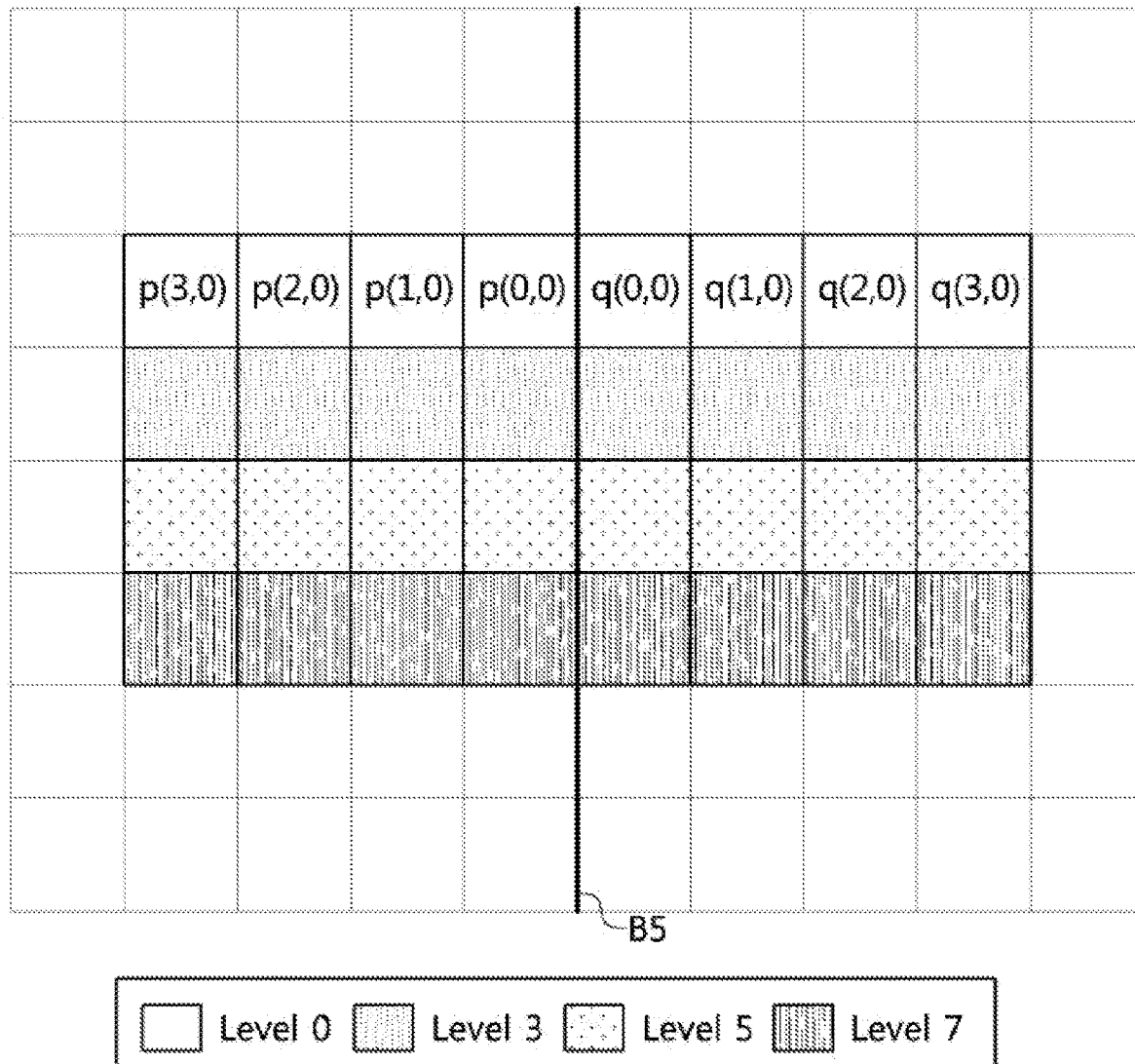
FIG. 31 is an exemplary view illustrating a filtering application determination process in the method for encoding an image of FIG. 23.
Figure 32:
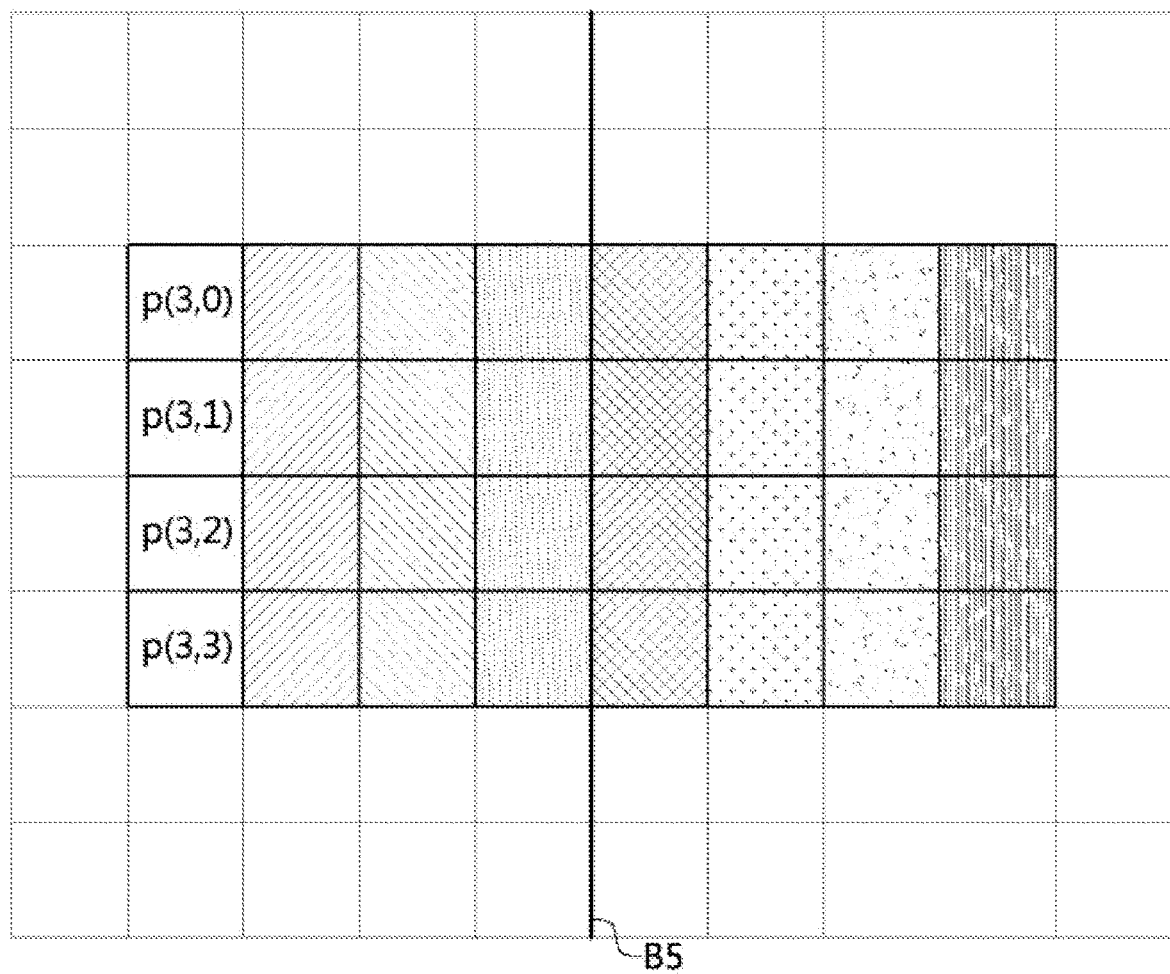
FIG. 32 is an exemplary view illustrating another example of a filtering application determination process in the method for encoding an image of FIG. 23.

FIGS. 31 to 33 are exemplary views illustrating a filtering application determination process in the method for encoding an image of FIG. 23.

Referring to FIGS. 31 to 33, the filtering controller may calculate the change amount in each block and at the boundary of two blocks to determine filtering application. The left block of two blocks at opposite sides of the block boundary (B5) is referred to as a P-block, and the right block is referred to as a Q-block.

The change amount in the P-block is shown as follows.

$$dp0=|p(0,0)-p(1,0)\times 2+p(2,0)|$$

$$dp1=|p(0,1)-p(1,1)\times 2+p(2,1)|$$

$$dp2=|p(0,2)-p(1,2)\times 2+p(2,2)|$$

$$dp3=|p(0,3)-p(1,3)\times 2+p(2,3)$$

In the change amount, dpx (x includes 0, 1, 2, or 3) indicates a change amount in the corresponding pixel.

The change amount in the Q-block is shown as follows.

$$dq0=|q(0,0)-q(1,1)\times 2+q(2,0)|$$

$$dq1=|q(0,1)-q(1,1)\times 2+q(2,1)|$$

$$dq2=|q(0,2)-q(1,2)\times 2+q(2,2)|$$

$$dq3=|q(0,3)-q(1,3)\times 2+q(2,3)|$$

In the above change amount, dqx (x includes 0, 1, 2, or 3) indicates a change amount in the corresponding pixel.

The change amount in the block boundary (B5) of P- and Q-blocks is shown as follows.

$$dpq0=|p(0,0)-q(0,0)|$$

$$dpq1=|p(0,1)-q(0,1)|$$

$$dpq2=|p(0,2)-q(0,2)|$$

$$dpq3=|p(0,5)-q(0,3)|$$

In the above change amount, dpqx (x includes 0, 1, 2, or 3) indicates a change amount in the corresponding pixel.

As described above, the change amount may be measured in units of each pixel line, or the change amount may be measured in units of at least two pixel lines. In a case whether filtering is applied in units of bundled pixel lines, at the subsequent step, filtering strength, a filtering application pixel, a filter coefficient, etc. may be determined.

At least one change amount may be considered, and depending on the implementation, additional change amount may be considered in addition to the above three change amounts. When considering the above three change amounts, whether filtering is applied may be determined by comparing the change amounts and respective boundary values.

For example, in limiting the first line for explanation, the change amount in the P-block, the change amount in the Q-block, and the change amount at the PQ-block boundary (B5) are less than boundary values (threshold_P, threshold_Q, and threshold_PQ), filtering is applied, and when larger than the boundary values, filtering may not be applied.

As another example, when the change amount in the block boundary is greater than the boundary value and the change amount of at least one of blocks is less than the boundary value, filtering may not be applied.

As another example, when the change amount of the P-block is greater than the boundary value and the change amount of the Q-block and the change amount of the PQ-block boundary are less than the boundary values, a step edge portion where the change amount of the P-block occurs is detected, and thus filtering is performed only on the portion where the step edge in the Q-block and the P-block is detected.

As described above, limited filtering may be applied in the filtering application unit. In this case, the boundary value may be set by the quantization parameter, the bit depth, etc. When quantization parameters of two blocks are different, one of quantization parameters of two blocks may be selected or an average value may be used. When setting the boundary value by the average value, one of rounding up, rounding down, and rounding half up may be used to process decimal units.

Also, whether filtering is applied may be determined based on a pixel value. In this case, it may be determined by utilizing encoding information of two blocks. In this case, as shown in FIG. 31, the coding mode of two blocks may be an intra mode, and prediction mode information of two blocks may be the same. The boundary to which filtering is applied may be a horizontal edge boundary, or may be a boundary obtained because two blocks are included in one prediction unit but have different transform units.

Also, as shown in FIG. 32, the filtering controller may determine, through mode of two blocks, that two blocks are likely to be blocks in which continuous correlation in the horizontal direction is present. In this case, different from the explanation of FIG. 31, the filtering controller may determine that filtering is applied without measuring the change amount.

Also, as shown in FIG. 33, when the coding mode of two blocks is the intra-mode and prediction mode information of two blocks is the same, the filtering controller may measure the above-described change amount and determine filtering application in pixel units due to a high probability of a step edge occurring.

According to the embodiment, the filtering controller or the apparatus for encoding/decoding an image including the filtering controller may determine whether filtering is applied by considering a correlation between two blocks based on the coding mode, prediction mode information, etc. of two blocks. Since the encoding coefficient may affect filtering application, the filtering controller may consider the encoding coefficient.

Also, when the coding mode of two blocks is the intra mode, and in the prediction mode of two blocks, the left block is a DC mode and the right block is a horizontal mode, and when the left block has at least one non-zero coefficient and the right block does not have a non-zero coefficient, the left block may be determined as a complex area and the change amount of the block may be equal to or greater than the boundary value set above. However, in this case, the change amount may be high since the image characteristics indicate a complex area, rather than an edge area. Therefore, even when the change amount exceeds the boundary value, filtering may be applied. As described above, in addition to measuring the change amount, the prediction mode information, the encoding coefficient, etc. may be checked to determine whether filtering is applied.

In the meantime, in the above embodiment, a case where filtering strength is 0, 1, and 2 is used as an example, but lesser or greater strength may also be supported. This may be modified according to the setting of the encoder/decoder, and may be transmitted in units of a sequence, a picture, a slice, etc.

Referring to FIG. 23 again, the filtering application unit implementing the filtering application step at S237 may apply filtering depending on the determined filtering strength and the result of applying filtering. The filtering application unit may determine a filter and a pixel to be applied to filtering depending on the determined filtering strength, and through a pixel-based analysis in addition thereto. The determination may be performed after the progression based on the pixel line applied in the previous stage.

Also, the filtering application unit may apply filtering through analysis of a change amount for a pixel at the block boundary. For example, filtering strength and application pixel may be determined based on the change amount of the pixels (the change amount at the P- and Q-blocks, and the change amount at the PQ-boundary) in the following 1) to 3). Depending on the result of whether the change amount is greater or less than the boundary value, at least one filter is selected for application of filtering. Here, different boundary values may be applied to respective cases. Here, the boundary value may be determined according to quantization parameters of two blocks, the bit depth, etc. The filter may include, e.g., a strong filter, a weak filter, etc.

$$|p(0,0)-p(1,0)\times2+p(2,0)|+|q(0,0)-q(1,0)\times2+q(2,0)| \quad\quad 1)$$

$$|p(0,0)-p(3,0)|+|q(0,0)-q(3,0)| \quad\quad 2)$$

$$|p(0,0)-q(0,0)| \quad\quad 3)$$

Here, the filtering application unit may be determined based on the number of pixels applied in filtering or the results of the above. That is, the filtering application unit may apply filtering to preset candidate pixels, or may set a pixel where filtering is not performed based on the results of the above. A filter may have the characteristics of a low-pass filter in the form of FIR (Finite Impulse Response). An input pixel of the filter may be adaptively determined according to filter strength and/or the position of the pixel.

Also, the filtering application unit may determine an application pixel of the filter according to the coding mode of two blocks. Generally, at the horizontal boundary of the block, filtering is applied to pixels in a vertical direction, and at the vertical boundary, filtering is applied to pixels in a horizontal direction. However, in the embodiment, when the coding mode of two blocks is the intra mode and the prediction mode of two blocks is the vertical mode, and when the boundary of the current block is the vertical boundary, filtering may be performed on horizontal pixels at the horizontal boundary in order to reduce quantization error.

Also, since the vertical correlation between pixels in both blocks is high, when performing filtering on pixels in the vertical direction, quantization error may be effectively reduced compared to the case in which filtering is performed in the horizontal direction. In this case, the change amount of the pixel may be obtained for pixels in the vertical direction of the vertical boundary as shown in the following 1) and 2). Depending on the result of whether the change amount is greater or less than the boundary value, at least one filter is selected and applied. Also, the number of pixels applied in filtering may be determined based on the result of the above.

$$|p(0,0)-p(0,1)|+-p(0,1)-p(0,2)|+|p(0,2)-p(0,3)| \quad\quad 1)$$

$$|q(0,0)-q(0,1)|+|q(0,1)-q(0,2)|+|q(0,2)-q(0,3)| \quad\quad 2)$$

Also, in order to reduce block deterioration between two blocks, the filtering application unit may apply filtering by measuring the change amount between pixels at the block boundary.

According to the embodiments, when generating the prediction block by block matching the current picture, strength of the deblocking filter may be determined depending on whether it is processed in the existing intra-prediction mode or an inter-prediction mode. When processing in the inter-prediction mode, filtering strength may be determined based on the reference picture index in addition to a condition such as the coding mode of two blocks, whether the same reference picture exist, the size of the motion vector, etc. that affects determination of strength of the deblocking filter.

In the embodiment, the method for encoding an image may be replaced with the method for decoding an image when adaptive deblocking filtering is used in the process of decoding an encoded image. Also, the method for encoding/decoding an image may be executed by an image processing apparatus or an apparatus for encoding and decoding an image, the apparatus having at least one means for encoding and decoding or a component for performing a function corresponding to the means.

According to the embodiment, provided is a high-performance and high-efficiency image encoding/decoding technology that is generally available in international codecs, such as MPEG-2, MPEG-4, H.264, etc. using an intra-prediction technology, other codecs, a medium using these codecs, and the image industry. Also, in the future, the present invention is expected to be applied in an image processing field using standard codecs, such as existing high-efficiency video coding technology (HEVC), and H.264/AVC and intra-prediction.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An image decoding method performing adaptive filtering, the method comprising:
   obtaining a flag indicating whether a reference block for prediction exists within a current picture where a current block is positioned;
   generating a prediction block for the current block by using the reference block;
   reconstructing the current block by using the prediction block; and
   adaptively applying a deblocking filter on a first pixel of the reconstructed current block and a second pixel of a neighboring block adjacent to the reconstructed current block based on a filter strength,
   wherein the adaptively applying the deblocking filter comprises:
   identifying a block boundary between the first pixel and the second pixel; and
   determining the filter strength of the deblocking filter,
   wherein, the filter strength of the deblocking filter is determined depending on whether the current block or the neighboring block is predicted with intra prediction,
   wherein, when the current block and the neighboring block is not predicted with intra prediction, the filter strength of the deblocking filter is determined depending on whether the block boundary between the first pixel and the second pixel is a block boundary of a transform block and whether a block containing the first pixel or a block containing the second pixel has a non-zero coefficient,
   wherein, when the block containing the first pixel and the block containing the second pixel do not have the non-zero coefficient, the filter strength of the deblocking filter is determined depending on a color component of the current block, whether the block containing the first pixel is predicted with a first reference block within the current picture, and whether the block containing the second pixel is predicted with a second reference block within the current picture,
   wherein the filter strength of the deblocking filter is determined to be 1 when the block containing the first pixel is predicted with the first reference block within the current picture and the block containing the second pixel is predicted with the second reference block within the current picture, and
   wherein, among a luma component and a chroma component of the current block, the filter strength for any one component of the current block is determined separately without considering a filter strength for the other one component of the current block.

2. The method of claim 1, wherein the filter strength of the deblocking filter is determined to be 2 when the current block or the neighboring block is predicted with intra prediction.

3. The method of claim 1, wherein the filter strength of the deblocking filter is determined to be 1 when the block containing the first pixel or the block containing the second pixel has the non-zero coefficient.

4. An image encoding method performing adaptive filtering, the method comprising:
   determining whether a reference block for prediction exists in the current picture where a current block is positioned;
   generating a prediction block for the current block by using the reference block;
   reconstructing the current block by using the prediction block; and
   adaptively applying a deblocking filter on a first pixel of the reconstructed current block and a second pixel of a neighboring block adjacent to the reconstructed current block based on a filter strength,
   wherein the adaptively applying the deblocking filter comprises:
   identifying a block boundary between the first pixel and the second pixel; and
   determining the filter strength of the deblocking filter,
   wherein, the filter strength of the deblocking filter is determined depending on whether the current block or the neighboring block is predicted with intra prediction,
   wherein, when the current block and the neighboring block is not predicted with intra prediction, the filter strength of the deblocking filter is determined depending on whether the block boundary between the first pixel and the second pixel is a block boundary of a transform block and whether a block containing the first pixel or a block containing the second pixel has a non-zero coefficient,
   wherein, when the block containing the first pixel and the block containing the second pixel do not have the non-zero coefficient, the filter strength of the deblocking filter is determined depending on a color component of the current block, whether the block containing the first pixel is predicted with a first reference block within the current picture, and whether the block containing the second pixel is predicted with a second reference block within the current picture, wherein the filter strength of the deblocking filter is determined to be 1 when the block containing the first pixel is predicted with the first reference block within the current picture and the block containing the second pixel is predicted with the second reference block within the current picture, and wherein, among a luma component and a chroma component of the current block, the filter strength for any one component of the current block is determined separately without considering a filter strength for the other one component of the current block.

5. The method of claim 4, wherein the filter strength of the deblocking filter is determined to be 2 when the current block or the neighboring block is predicted with intra prediction.

6. The method of claim 4, wherein the filter strength of the deblocking filter is determined to be 1 when the block containing the first pixel or the block containing the second pixel has the non-zero coefficient.

7. A method of transmitting a bitstream, the method comprising:
    determining whether a reference block for prediction exists in the current picture where a current block is positioned;
    generating a prediction block for the current block by using the reference block;
    reconstructing the current block by using the prediction block;
    adaptively applying a deblocking filter on a first pixel of the reconstructed current block and a second pixel of a neighboring block adjacent to the reconstructed current block based on a filter strength;
    encoding, into the bitstream, a flag indicating whether the reference block for prediction exists in the current picture where the current block is positioned; and
    transmitting the bitstream, wherein the adaptively applying the deblocking filter comprises:

identifying a block boundary between the first pixel and the second pixel; and determining the filter strength of the deblocking filter, wherein, the filter strength of the deblocking filter is determined depending on whether the current block or the neighboring block is predicted with intra prediction, wherein, when the current block and the neighboring block is not predicted with intra prediction, the filter strength of the deblocking filter is determined depending on whether the block boundary between the first pixel and the second pixel is a block boundary of a transform block and whether a block containing the first pixel or a block containing the second pixel has a non-zero coefficient, wherein, when the block containing the first pixel and the block containing the second pixel do not have the non-zero coefficient, the filter strength of the deblocking filter is determined depending on a color component of the current block, whether the block containing the first pixel is predicted with a first reference block within the current picture, and whether the block containing the second pixel is predicted with a second reference block within the current picture, wherein the filter strength of the deblocking filter is determined to be 1 when the block containing the first pixel is predicted with the first reference block within the current picture and the block containing the second pixel is predicted with the second reference block within the current picture, and wherein, among a luma component and a chroma component of the current block, the filter strength for any one component of the current block is determined separately without considering a filter strength for the other one component of the current block.

* * * * *